United States Patent
Kim et al.

(10) Patent No.: US 10,149,295 B2
(45) Date of Patent: Dec. 4, 2018

(54) METHOD AND APPARATUS FOR TRANSMITTING/RECEIVING DATA USING MULTIPLE CARRIERS IN MOBILE COMMUNICATION SYSTEM

(71) Applicant: Samsung Electronics Co., Ltd, Suwon-si, Gyeonggi-do (KR)

(72) Inventors: Soenghun Kim, Suwon-si (KR); Kyeongin Jeong, Yongin-si (KR); Youngbum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/996,240

(22) Filed: Jun. 1, 2018

(65) Prior Publication Data
US 2018/0279308 A1 Sep. 27, 2018

Related U.S. Application Data

(63) Continuation of application No. 14/912,386, filed as application No. PCT/KR2014/007538 on Aug. 13, 2014, now Pat. No. 9,992,773.

(30) Foreign Application Priority Data

Aug. 14, 2013 (KR) .................. 10-2013-0096293
Aug. 19, 2013 (KR) .................. 10-2013-0097941
(Continued)

(51) Int. Cl.
*H04W 72/04* (2009.01)
*H04L 5/00* (2006.01)
(Continued)

(52) U.S. Cl.
CPC ...... *H04W 72/0446* (2013.01); *H04B 7/2656* (2013.01); *H04L 5/001* (2013.01);
(Continued)

(58) Field of Classification Search
CPC ............ H04W 72/0446; H04W 76/10; H04W 72/0413; H04W 52/367; H04W 40/24;
(Continued)

(56) References Cited

U.S. PATENT DOCUMENTS 8,848,556 B2  9/2014 Wu et al.
8,954,106 B2  2/2015 Kim et al.
(Continued)

FOREIGN PATENT DOCUMENTS

KR  10-2012-0092014 A  8/2012
KR  10-2012-0094496 A  8/2012
(Continued)

OTHER PUBLICATIONS

NSN, Nokia Corporation, "PHR for Dual Connectivity", 3GPP TSG-RAN2 Meeting #85, R2-140139, Prague, Czech Republic, Feb. 10-14, 2014, 7 pages (Year: 2014).*
(Continued)

*Primary Examiner* — Brian T O Connor

(57) ABSTRACT

The present invention relates to a method and an apparatus for transmitting/receiving using multiple carriers in a mobile communication system. A method for transmitting/receiving data by a terminal using multiple carriers in a mobile communication system according to the present invention comprises the steps of: receiving a serving cell addition control message including uplink subframe pattern information on a master serving cell group or a slave serving cell group from a base station; establishing synchronization with a serving cell included in the serving cell addition control message; and, when a command for activating the serving cell with which the synchronization is established is received, transmitting/receiving data to/from the base station through the added serving cell.

20 Claims, 32 Drawing Sheets

(30) Foreign Application Priority Data

| Sep. 27, 2013 | (KR) | ........................ 10-2013-0115454 |
| Mar. 21, 2014 | (KR) | ........................ 10-2014-0033679 |
| Aug. 8, 2014 | (KR) | ........................ 10-2014-0102548 |

(51) Int. Cl.

| *H04B 7/26* | (2006.01) |
| *H04W 76/10* | (2018.01) |
| *H04W 52/02* | (2009.01) |
| *H04W 72/12* | (2009.01) |
| *H04L 5/14* | (2006.01) |
| *H04W 52/32* | (2009.01) |
| *H04W 52/24* | (2009.01) |
| *H04W 52/34* | (2009.01) |
| *H04W 52/36* | (2009.01) |
| *H04W 56/00* | (2009.01) |
| *H04W 24/10* | (2009.01) |
| *H04W 24/02* | (2009.01) |
| *H04W 40/24* | (2009.01) |

(52) U.S. Cl.
CPC ....... *H04W 72/0413* (2013.01); *H04W 76/10* (2018.02); *H04L 5/0098* (2013.01); *H04L 5/143* (2013.01); *H04W 24/02* (2013.01); *H04W 24/10* (2013.01); *H04W 40/24* (2013.01); *H04W 52/0216* (2013.01); *H04W 52/242* (2013.01); *H04W 52/327* (2013.01); *H04W 52/34* (2013.01); *H04W 52/36* (2013.01); *H04W 52/365* (2013.01); *H04W 52/367* (2013.01); *H04W 56/00* (2013.01); *H04W 72/0493* (2013.01); *H04W 72/12* (2013.01); *Y02D 70/126* (2018.01)

(58) Field of Classification Search
CPC ..... H04W 52/36; H04W 24/02; H04W 24/10; H04W 56/00; H04W 52/327; H04W 72/12; H04W 72/0493; H04W 52/0216; H04W 52/365; H04W 52/34; H04W 52/242; H04B 7/2656; H04L 5/001; H04L 5/143; H04L 5/0098; Y02D 70/126
See application file for complete search history.

(56) References Cited

U.S. PATENT DOCUMENTS

| 9,008,050 | B2 | 4/2015 | Feuersanger et al. |
| 9,144,038 | B2 | 9/2015 | Kim et al. |
| 9,215,678 | B2 | 12/2015 | Dinan |
| 9,357,446 | B2 | 5/2016 | Kim et al. |
| 9,544,896 | B2 | 1/2017 | Kim et al. |
| 9,655,066 | B2* | 5/2017 | Lee ............ H04W 24/10 |
| 9,883,467 | B2* | 1/2018 | Uemura ............ H04W 52/34 |
| 9,992,755 | B2* | 6/2018 | Yi ............ H04W 72/0413 |
| 10,051,500 | B2* | 8/2018 | Kim ............ H04W 24/08 |
| 2011/0134774 | A1 | 6/2011 | Pelletier et al. |
| 2012/0269180 | A1 | 10/2012 | Li et al. |
| 2013/0100938 | A1 | 4/2013 | Kwon et al. |
| 2013/0258958 | A1 | 10/2013 | Dinan |
| 2013/0265972 | A1 | 10/2013 | Shirani-Mehr et al. |
| 2013/0315114 | A1 | 11/2013 | Seo et al. |
| 2014/0105191 | A1 | 4/2014 | Yang et al. |
| 2014/0211738 | A1 | 7/2014 | Park et al. |
| 2015/0063275 | A1 | 3/2015 | Yi et al. |
| 2015/0195796 | A1* | 7/2015 | Sivanesan ............ H04W 52/365 370/329 |
| 2015/0334669 | A1 | 11/2015 | Zhang et al. |
| 2016/0066284 | A1* | 3/2016 | Kwon ............ H04W 52/365 370/329 |
| 2016/0150485 | A1* | 5/2016 | Yi ............ H04W 72/0413 370/311 |
| 2016/0157223 | A1* | 6/2016 | Nogami ............ H04W 16/32 370/329 |
| 2016/0309423 | A1* | 10/2016 | Lee ............ H04W 52/365 |
| 2016/0309425 | A1* | 10/2016 | Yi ............ H04W 72/0413 |
| 2017/0078984 | A1* | 3/2017 | Uemura ............ H04W 52/34 |
| 2018/0160376 | A1* | 6/2018 | Hwang ............ H04W 52/146 |

FOREIGN PATENT DOCUMENTS

| KR | 10-2012-0120024 A | 11/2012 |
| WO | 2012108718 A2 | 8/2012 |
| WO | 2012173433 A2 | 12/2012 |
| WO | 2013025237 A1 | 2/2013 |
| WO | 2013151651 A1 | 10/2013 |

OTHER PUBLICATIONS

Samsung, "Power Headroom Report for Dual Connectivity", 3GPP TSG-RAN2 Meeting #85b, R2-141478, Valencia, Spain, Mar. 31 to Apr. 4, 2014, 8 pages (Year: 2014).*
Samsung, "Text Proposal for PHR in Dual Connectivity", 3GPP TSG-RAN2 Meeting #86, R2-142275, Seoul, Korea, May 19-23, 2014, 7 pages (Year: 2014).*
International Search Report dated Dec. 2, 2014 in connection with International Patent Application No. PCT/KR2014/007538, 7 pages.
Written Opinion of the International Searching Authority dated Dec. 2, 2014 in connection with International Patent Application No. PCT/KR2014/007538, 5 pages.
Supplementary European Search Report dated Mar. 6, 2017 in connection with European Patent Application No. 14 83 6612.

* cited by examiner

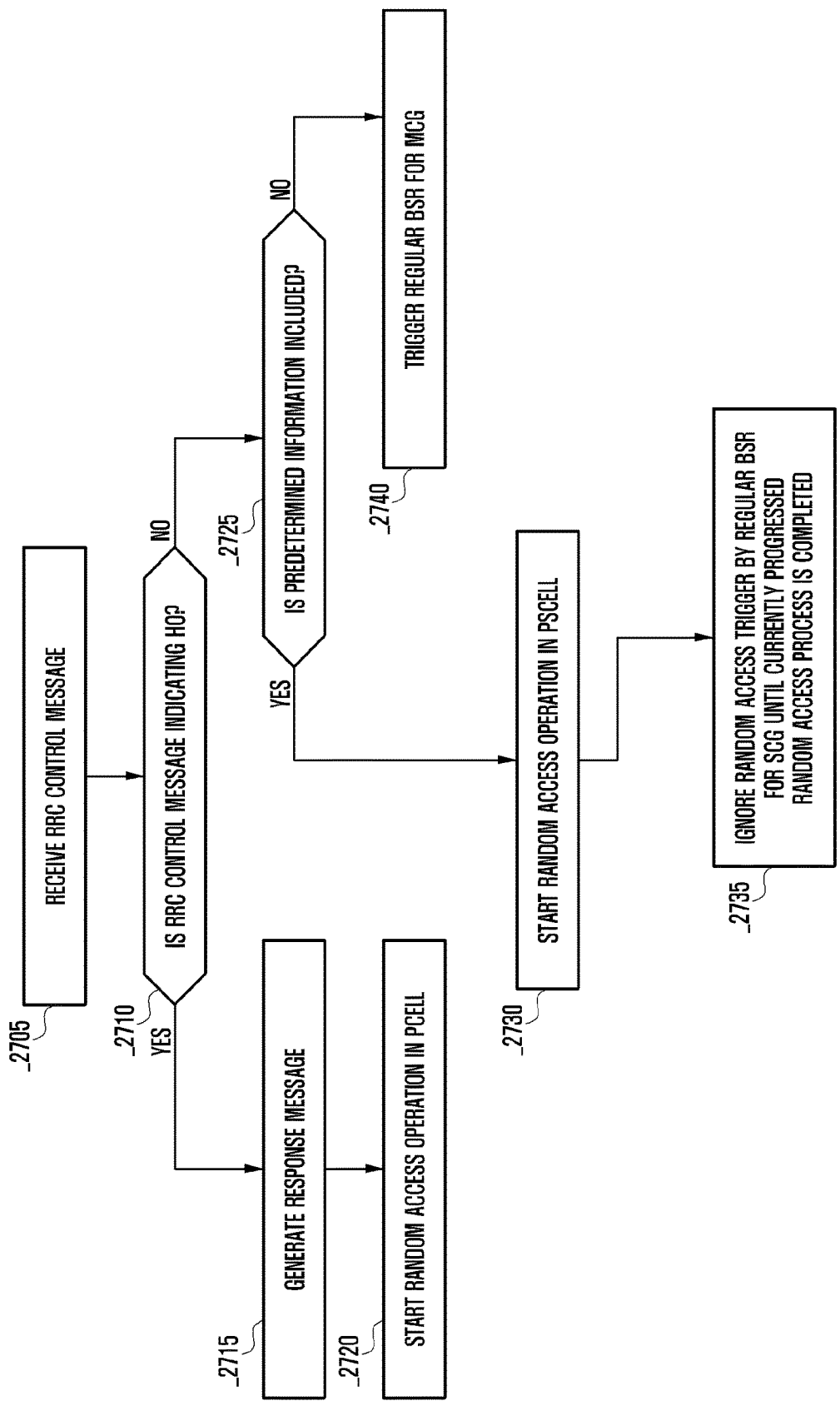

METHOD AND APPARATUS FOR TRANSMITTING/RECEIVING DATA USING MULTIPLE CARRIERS IN MOBILE COMMUNICATION SYSTEM

CROSS REFERENCE TO RELATED APPLICATIONS AND CLAIM OF PRIORITY

This application is a continuation of application Ser. No. 14/912,386, filed Feb. 16, 2016, which is the National Stage of International Application No. PCT/KR2014/007538, filed Aug. 13, 2014, which claims priority to Korean Patent Application No. KR 10-2013-0097941 filed Aug. 19, 2013, Korean Patent Application KR 10-2013-0115454 filed Sep. 27, 2013, Korean Patent Application KR 10-2014-0033679 filed Mar. 21, 2014, Korean Patent Application KR 10-2014-0102548 filed Aug. 8, 2014, and Korean Patent Application KR 10-2013-0096293 filed Aug. 14, 2013, the disclosures of which are herein incorporated by reference in their entireties.

BACKGROUND

1. Field

The present specification relates to a mobile communication system. More specifically, the present invention relates to a method and an apparatus for transmitting/receiving data using multiple carriers in a mobile communication system.

2. Description of Related Art

In general, mobile communication systems have been developed to provide communication while securing the mobility of users. With the rapid development of technologies, mobile communication systems have reached a stage of providing high-speed data communication services as well as voice communication.

Currently, a standardization operation from a 3rd Generation Partnership Project (3GPP) system to a Long Term Evolution (LTE) system is progressing as one of the next generation mobile communication systems. The LTE system is a technology for implementing a high-speed packet based communication having a transmission speed up to 100 Mbps, which is higher than a currently provided data transmission rate, and currently, a standardization of the LTE system is almost finished.

Recently, a discussion for an LTE-Advanced (LTE-A) which improves a transmission speed by combining various new technologies in the LTE communication system is progressing. As a representative technology among newly employed technologies, there is a carrier aggregation. In the carrier aggregation, one terminal uses multiple forward carriers and multiple backward carriers, differently in the prior art in which a terminal transmits/receives data using one forward carrier and one backward carrier.

Currently, only an inter-ENB carrier aggregation is defined in the LTE-A. This causes the application possibility of the carrier aggregation capability to decrease, and thus may cause a problem in which a macro cell and a pico cell cannot be aggregated in a scenario wherein multiple pico cells and one macro cell are overlapped and operated.

SUMMARY

An embodiment of the present specification is invented to at least some of the above-mentioned problems, and is to provide a method and an apparatus for different inter-ENB carrier aggregation.

A method of transmitting/receiving data by a terminal using multiple carriers in a mobile communication system of the present invention for solving the above-mentioned problems comprises: receiving a serving cell addition control message including uplink subframe pattern information on a master serving cell group or a slave serving cell group from a base station; establishing synchronization with a serving cell included in the serving cell addition control message; and transmitting/receiving data to/from the base station through the added serving cell when a command for activating the serving cell with which the synchronization is established is received.

In this case, the uplink subframe pattern information may include at least one of information on a subframe to which an uplink transmission for the master serving cell group is admitted, information on a subframe to which an uplink transmission for the slave serving cell group is admitted, and information on a subframe to which an uplink transmission is not admitted.

In addition, the length of the uplink subframe pattern may be determined based on a Hybrid Automatic ReQuest (HARQ) Round Trip Time (RTT).

According to an embodiment of the present invention, the uplink subframe pattern information may include at least one of bit information indicating a subframe to which an uplink transmission for the master serving cell group is admitted, bit information on a subframe to which an uplink transmission for the slave serving cell group is admitted, and offset information indicating a start of a subframe pattern.

According to another embodiment of the present invention, the uplink subframe pattern information may be pattern index information indicating one pattern among multiple subframe patterns having a predetermined length.

Meanwhile, a terminal for transmitting/receiving data using multiple carriers in a mobile communication system comprises: a transmitting/receiving unit that transmits/receives a signal to/from a base station; and a control unit that controls to receive a serving cell addition control message including uplink subframe pattern information on a master serving cell group or a slave serving cell group from a base station, to establish synchronization with a serving cell included in the serving cell addition control message, and to transmit/receive data to/from the base station through the added serving cell when a command for activating the serving cell with which the synchronization is established is received.

According to an embodiment of the present specification, a carrier is aggregated between different base stations, and thus the transmission/reception speed of a terminal can be improved.

BRIEF DESCRIPTION OF THE DRAWINGS

FIG. 27 illustrates an operation of a UE receiving an RRC control message;

DETAILED DESCRIPTION

In the following description, a detailed description of known configurations or functions incorporated herein will be omitted when it is determined that the detailed description makes the subject matter of the present disclosure unclear. Hereinafter, embodiments of the present disclosure will be described with reference to the accompanying drawings. Hereinafter, before describing the present specification, an LTE system and a carrier aggregation is schematically described.

Figure 1:
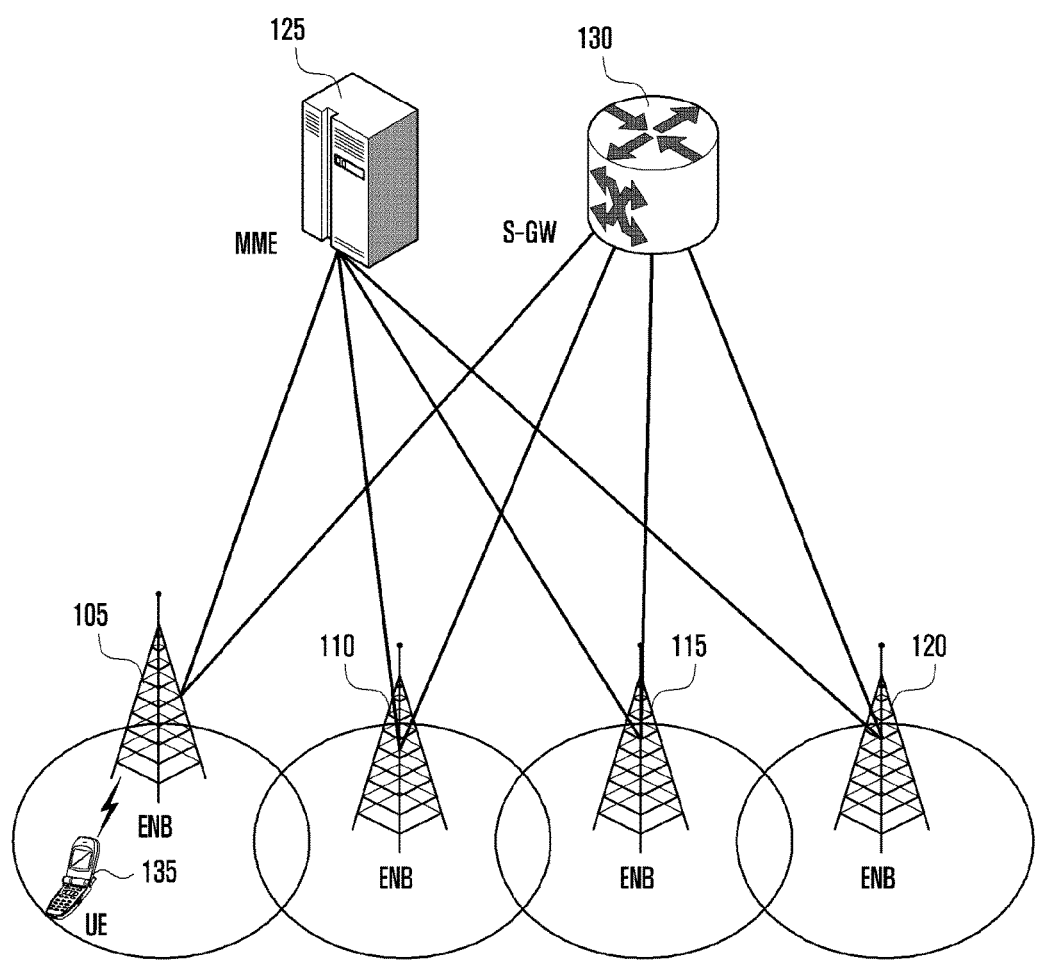
FIG. 1 is a view illustrating a structure of an LTE system to which some embodiments of the present specification are applied.

FIG. 1 is a view illustrating a structure of an LTE system in which some embodiments of the present specification are applied.

Referring to FIG. 1, a wireless access network of the LTE system includes a next generation base station (i.e., Evolved Node B, hereinafter, ENB, Node B or base station) 105, 110, 115 and 120, a Mobility Management Entity (MME) 125 and a Serving-GateWay (S-GW). A User Equipment (hereinafter, a UE or terminal) 135 is connected to an external network through the ENB 105, 110, 115 and 120.

In FIG. 1, the ENB 105, 110, 115 and 120 correspond to the existing node B of a UMTS system. The ENB 105, 110, 15 or 120 is connected with the UE 135 through a wireless channel, and performs a more complicated role than the conventional node B. In the LTE system, all user traffic, such as a real time service such as a Voice over IP (VoIP) through an internet protocol are serviced through a shared channel, therefore, a device which collects and schedules state information such as a buffer state, a capable transmission power state, and a channel state is necessary, and the ENB 105, 110, 15 or 120 take charge of this. One ENB generally controls a plurality of cells. In order to implement a transmission rate of 100 Mbps, the LTE system uses an Orthogonal Frequency Division Multiplexing (OFDM) as a wireless access technology in a bandwidth of 20 MHz. In addition, an Adaptive Modulation & Coding (AMC) method which determines a modulation scheme and a channel coding rate that is suitable for a channel state of the terminal is employed. The S-GW 130 is a device for providing a data bearer, and generates or removes the data bearer under a control of the MME 125. The MME is a device for managing the mobility of the terminal and taking charge of various control functions and is connected to multiple ENBs.

Figure 2:
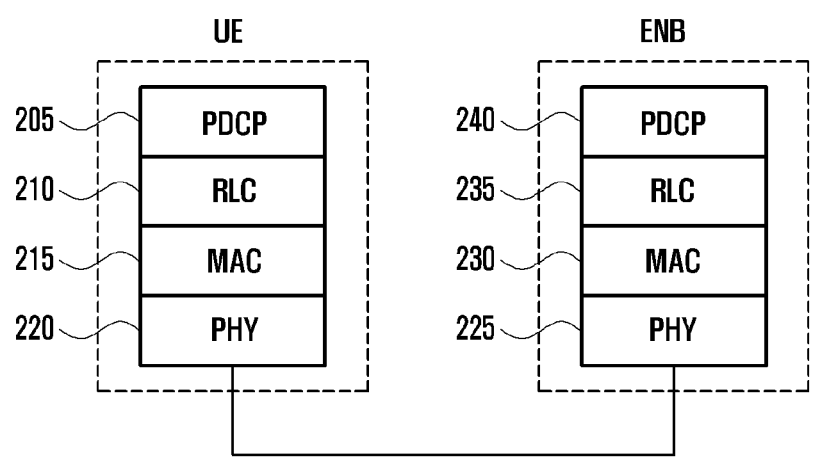
FIG. 2 is a view illustrating a structure of a wireless protocol structure in the LTE system to which some embodiments of the present specification are applied.

FIG. 2 is a view illustrating a structure of a wireless protocol structure in the LTE system to which some embodiments of the present specification are applied.

Referring to FIG. 2, the UE and the ENB includes a Packet Data Convergence Protocol (PDCP) 205 or 240, a Radio Link Control (RLC) 210 or 235, a Medium Access Control (MAC) 215 or 230 respectively, as the wireless protocol of the LTE system. The PDCP 205 or 240 performs an operation such as an IP header compression/recovery, and the RLC 210 or 235 reconstructs a PDCP Packet Data Unit (PDU) to a proper size to perform an ARQ operation and so on. The MAC 215 or 230 is connected with various RLC layer devices configured in one UE, and performs a multiplexing of RLC PDUs to MAC PDU and a de-multiplexing of the RLC PDUs from the MAC PDU. The PHY layers 220 and 225 perform an operation of channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
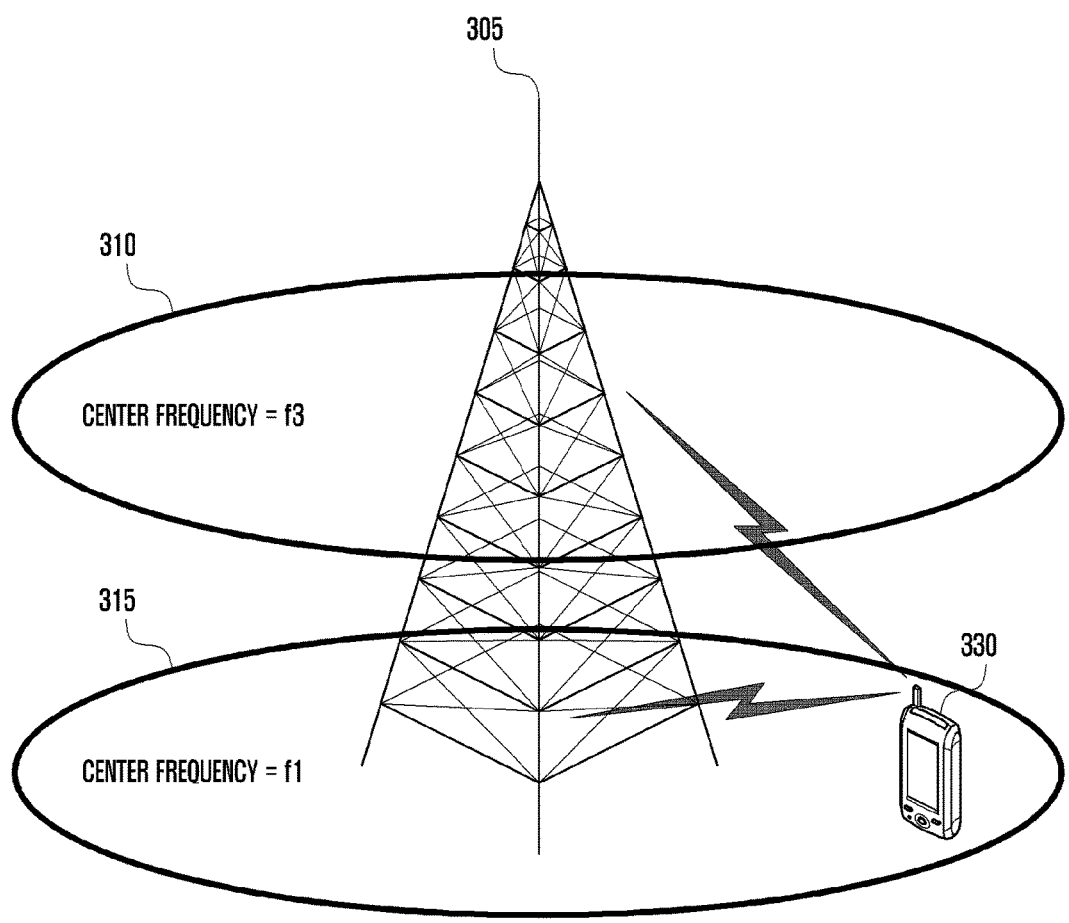
FIG. 3 is a view illustrating a carrier aggregation in an ENB to which some embodiments of the present specification are applied.

FIG. 3 is a view illustrating a carrier aggregation in the ENB to which some embodiments of the present specification are applied.

Referring to FIG. 3, one ENB generally may transmit and receive multiple carriers through various frequency bands. For example, when a carrier 315 of which a forward center frequency is f1 and a carrier 310 of which a forward center frequency is f3 are transmitted, in the prior art, one terminal transmits and receives data using one carrier of two carriers. However, a terminal having a carrier aggregation capability may transmits/receives the data using multiple carriers simultaneously. The ENB 305 may allocate more carriers to the UE 330 with the carrier aggregation capability according to circumstances, so as to improve the transmission rate of the UE 330. The aggregation of the forward carrier and the backward carrier which are transmitted and received by the one ENB as described above is referred to as an inter-ENB carrier aggregation. However, according to an occasion, it may be necessary to aggregate a forward carrier and a backward carrier which are transmitted and received by different base stations differently as shown in FIG. 3.

Figure 4:
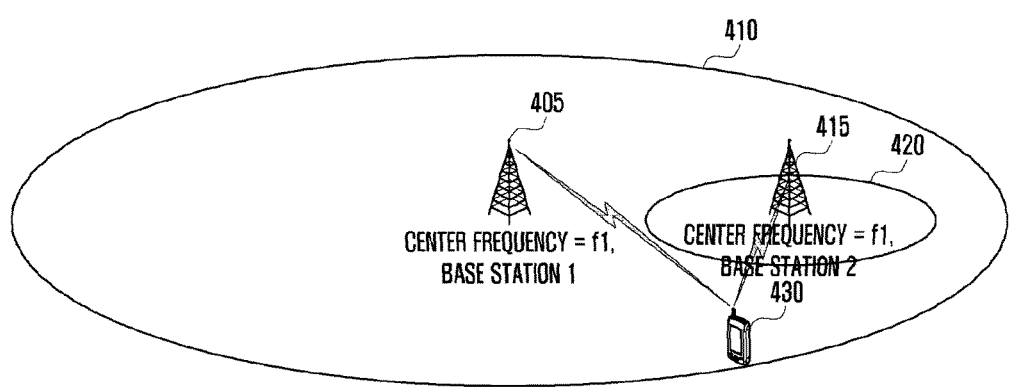
FIG. 4 is a view illustrating a carrier aggregation method according to an embodiment of the present specification.
Figure 5:
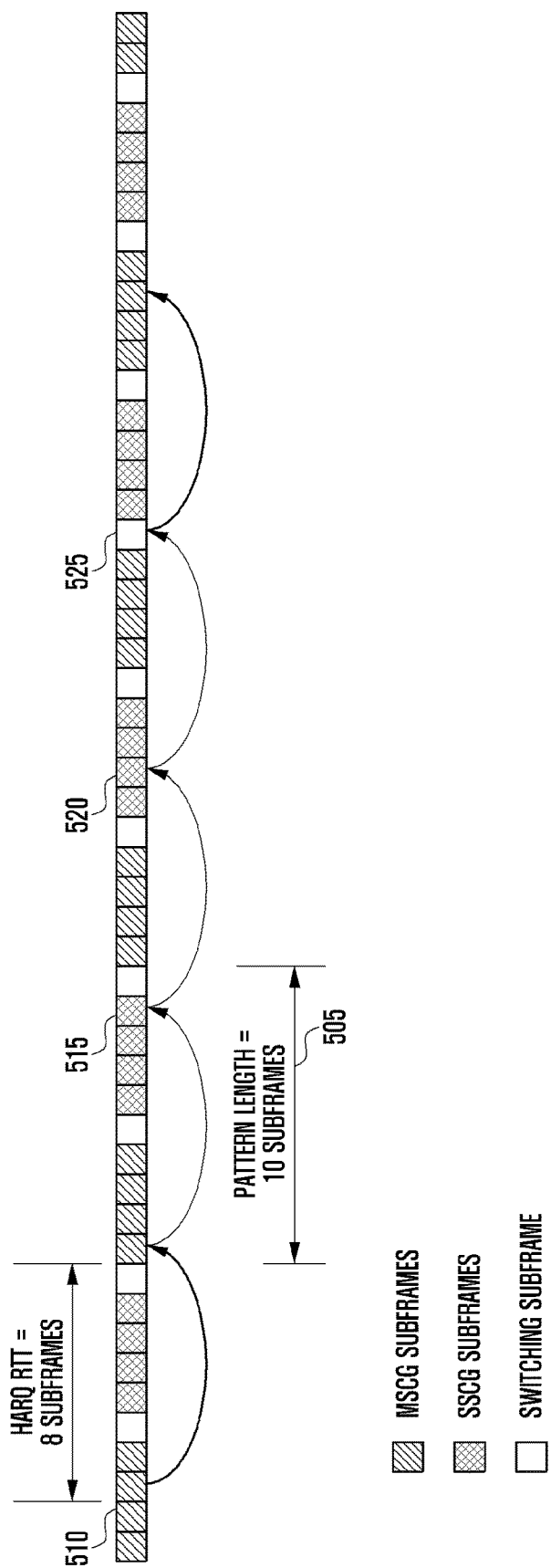
FIG. 5 is a view illustrating an inefficient PUSCH transmission due to a wrong configuration of the length of a pattern.

FIG. 4 is a view illustrating a carrier aggregation method according to an embodiment of the present specification.

Referring to FIG. 4, when a ENB 1 405 transmits/receives a carrier of which a center frequency is f1 and a ENB 2 420 transmits/receives a carrier of which a center frequency is f2, if a UE 430 aggregates (or combines) the carrier of which a forward center frequency is f1 and a forward center frequency is f2, one UE aggregates carriers transmitted/received by two or more ENBs, and this is referred to as an inter-ENB carrier aggregation (or an inter-ENB CA) in the present specification.

Below, terms frequently used in the present specification are described.

When one forward carrier transmitted by one ENB and one backward carrier received by the ENB forms one cell, the carrier aggregation may be understood as a transmitting/receiving data through multiple cells simultaneously by the UE as a traditional meaning. Through this, the maximum transmission speed is increased in proportion to the number of the aggregated carriers.

Hereinafter, in the present specification, receiving data through a random forward carrier or transmitting data through a random backward carrier has a meaning equal to transmitting and receiving data using a control channel and a data channel provided in a cell corresponding to a center frequency and a frequency band characterizing the carrier. In the present specification, specially, the carrier aggregation is expressed as a configuration of multiple serving cells, and a Primary serving Cell (PCell), Secondary serving Cell (Scell), an activated serving cell and the like are used. The above terms have meanings thereof used in an LTE mobile communication system. In the present invention, terms of a carrier, a component carrier, a serving cell and the like may be mixed.

In the present specification, a group of serving cells controlled by the same ENB is defined as a Serving Cell Group (SCG). The SCG is again divided into a Master Serving Cell Group (MSCG) and a Slave Serving Cell Group (SSCG). The MSCG means a group of serving cells controlled by an ENB (hereinafter, a Master eNB, or MeNB) controlling the PCell, and the SSCG means a group of serving cells controlled by an ENB (hereinafter, Slave eNB, or SeNB) controlling an eNB, not the eNB controlling the PCell, that is an eNB controlling only the SCell. A predetermined serving cell is configured in a procedure configuring a corresponding serving cell by an ENB whether the predetermined serving cell is included in the MSCG or the SSCG. One MSCG and at least one SSCG may be configured in one UE, and in the present invention, for the convenience of description, only a case in which one SSCG is configured is considered. However, although at least one SSCG is configured, contents of the present invention may be applied as itself without a different addition or subtraction.

In the below description, for an understanding, another term may be used instead of the MSCG and SSCG. For example, a primary set and a secondary set, a primary carrier group and a secondary carrier group, an MeNB Cell Group (MCG) and an SeNB Cell Group (SCG), or the like may be used. However, in this case, it should be noticed that only the terms are different, but the meanings are the same. A main using object of the terms is for dividing a cell controlled by an eNB controlling the PCell of the specific UE. Operation methods of a UE and a corresponding cell may be different in a case in which the cell is controlled by the eNB controlling the PCell of the specific UE and in a case in which the cell is not controlled by the eNB controlling the PCell of the specific UE.

At least one SCG may generally be configured in a UE, but in the present invention, for the convenience of description, it is assumed that only one SCG may be configured in the UE. The SCG may include multiple SCells, and one among the multiple SCells has a special nature.

In a CA of a normal eNB, a UE may transmit an HARQ feedback and a CSI for the SCell as well as an HARQ feedback and a CSI for the PCell through a PUCCH of the PCell. This is for applying a CA for a UE, which cannot possibly perform an uplink simultaneous transmission.

In the case of the inter-eNB CA, it may be impossible for transmitting the HARQ feedback and the CSI of the SCells included in the SCG through the PUCCH of the PCell practically. This is because the HARQ feedback should be transmitted in a HARQ Round Trip Time (RTT) (e.g., normally 8 ms), and a transmission delay between the MeNB and the SeNB may be longer than the HARQ RTT. A PUCCH transmission resource may be configured in one cell among the SCells included in the SCG and the HARQ feedback and the CSI for the SCG SCells may be transmitted through the PUCCH because of the above problem. The special SCell is referred to as a Primary SCell (PSCell) or a PUCCH SCell. Hereinafter, the inter-eNB CA and a dual connectivity are mixed.

A scheduler is installed in an eNB unit. It may not be easy to schedule multiple eNBs such that transmission resources of the multiple eNBs are not overlapped in a real time. Thus, a UE to which one or more SCG is configured may be controlled by one or more schedulers, and may receive an indication to perform a simultaneous backward transmission in serving cells included in different SCGs. Generally, since serving cells in the same frequency band forms one SCG, when the simultaneous backward transmission is performed in the serving cells in different SCGs, a so-called an Inter-Modulation Distortion (IMD) problem may be generated. The IMD generation-or-not is closely related to the structure of a UE. For example, when a UE is operated in random f1 and f2, the structure of the UE may be classified as the following. The f1 or f2 is a frequency specified by a predetermined bandwidth based on one center frequency in the case of a Time Division Duplex (TDD), and specifies a forward frequency specified in a predetermined bandwidth based on the forward center frequency and a backward frequency specified in the predetermined bandwidth based on a backward center frequency in the case of a Frequency Division Duplex (FDD).

2Rx/2Tx structure A: a structure using a separated Rx device, a separated Tx device and a separated power amplifier for f1 and f2, a forward simultaneous receiving is possible, and a backward simultaneous transmission is possible without IMD problem.

2Rx/2Tx structure B: a structure using a separated Rx device, a separated Tx device and a shared power amplifier for f1 and f2, a forward simultaneous receiving is possible, and an IMD problem is generated when a backward simultaneous transmission is used.

2Rx/1Tx structure: a structure using a separated Rx device and a shared Tx device for f1 and f2, a forward simultaneous receiving is possible, and a backward simultaneous transmission is impossible.

1Rx/1Tx structure: a structure using a shared Rx device and a shared Tx device for f1 and f2, both of a forward simultaneous receiving and a backward simultaneous transmission are impossible.

In the present invention, a UE reports information on a structure applied according to a frequency band combination, and information on whether the simultaneous transmitting and receiving are possible to the base station. The base station schedules the terminal such that the simultaneous backward transmission is not generated by scheduling the terminal without an exclusion of the simultaneous transmitting and receiving based on the information or applying a Time Division Multiplex TDM method between the SCGs. Specially, when the eNB configures the serving cell in a frequency band combination in which the simultaneous transmitting and receiving are impossible, the eNB allocates a predetermined pattern to the UE, and the UE performs a backward transmission between the SCGs in the TDM type according to the pattern.

The TDM pattern is configured as three types of subframes.

MSCG subframe: a subframe to which a backward transmission of master serving cells is admitted SSCG subframe: a subframe to which a backward transmission of slave serving cells is admitted Switching subframe: a subframe to which a backward transmission is not admitted Among the three types of TDM patterns, a reason for requiring the switching subframe is because an RF device is re-adjusted such that the UE performs the backward transmission in the MSCG serving cell and performs the backward transmission in the SSCG serving cell. A required period in the re-adjusting of the RF device may be different according to a structure, a hardware performance and the like of the UE. The UE may report information on whether the switching subframe is necessary and the time of a switching according to each frequency band combination to the eNB.

When the 2Rx/1Tx structure or the 1Rx/1Tx structure is applied, in the case of the switching, since a re-configuration of a Tx device is necessary, a switching period of about several hundred micro seconds may be necessary. When the 2Rx/2Tx structure B is applied, the Tx device is separately used. Therefore, since only a path of a backward signal is adjusted in the case of the switching, a switching period shorter than one OFDM symbol time (e.g., about 66.7 micro seconds) may be necessary.

Therefore, the applied structure, the position, the frequency and the like of the switching subframe may have a close relation, and the UE provides related information such that the eNB may place the switching subframe properly.

The MSCG subframe, the SSCG subframe, and the switching subframe have a regular period and are repeated in the same pattern. The length of the pattern is also an important factor influencing the performance.

The backward transmission includes various types, such as a PUSCH and PUCCH. Specially, a Hybrid Automatic ReQuest (HARQ) is applied to the Physical Uplink Shared Channel (PUSCH) transmission, and the HARQ operation is specified by a time relation defined by the HARQ RTT. The length of the pattern is configured differently from the HARQ RTT, and the HARQ operation becomes inefficient. For example, the length of the pattern is 10 subframe _505, a retransmission time point for a PUSCH transmission _510 performed in a random master serving cell is an SSCG subframe or a switching subframe, and thus a circumstance _515, _520 and _525 in which the PUSCH retransmission cannot be performed may be generated.

In order not to generate the above problem, in the present invention, the length of the pattern is defined in consideration of the HARQ RTT. In a carrier aggregation operation (i.e., in a case in which multiple serving cells are configured and all of the serving cells are included in an FDD band) corresponding to a combination between the FDD bands, a pattern having a length of 8 subframes is used. In the combination between TDD bands, a pattern having the following length is used according to forward/direction configurations. In the TDD, 7 UL/DL configurations may exist as shown in Table 1. Table 2 shows a backward HARQ RTT (i.e., a time between an HARQ initial transmission and an HARQ retransmission) and the bitmap length according to each configuration.

TABLE 1

| Uplink-downlink configuration | Downlink-to-Uplink Switch-point periodicity | Subframe number |
|---|---|---|
| 0 | 5 ms | |
| 1 | 5 ms | |
| 2 | 5 ms | |
| 3 | 10 ms | |
| 4 | 10 ms | |
| 5 | 10 ms | |
| 6 | 5 ms | |

TABLE 2

| Uplink-downlink configuration | Backward HARQ RTT | Bitmap length |
|---|---|---|
| 0 | 11/13 ms | 48 bit |
| 1 | 10 ms | 10 bit |
| 2 | 10 ms | 10 bit |
| 3 | 10 ms | 10 bit |
| 4 | 10 ms | 10 bit |
| 5 | 10 ms | 10 bit |
| 6 | 11/14 ms | 50 bit |

In Table 1, D indicates a forward subframe, U indicates a backward subframe, and S indicates a special subframe.

The backward HARQ RTT of backward/forward configurations is 10 ms, and the length of the bitmap is 10 bits. The HARQ RTT of the backward/forward configuration 0 and 6 is formed of two repetitive values. For example, in the configuration 0, the HARQ RTT is 11 ms in an n-th transmission, and the HARQ RTT is 13 ms in an (n+1)-th transmission. The bitmap length is defined as a value obtained by multiplexing 2 to a value obtained by an addition of two RTTs such that a flexible pattern configuration is possible. That is, in the configuration 0, 48 bits, which is twice of (11+13), is defined as the bitmap length, and in the configuration 6, 50 bits, which is twice of (11+14), is defined as the bitmap length.

Figure 6:
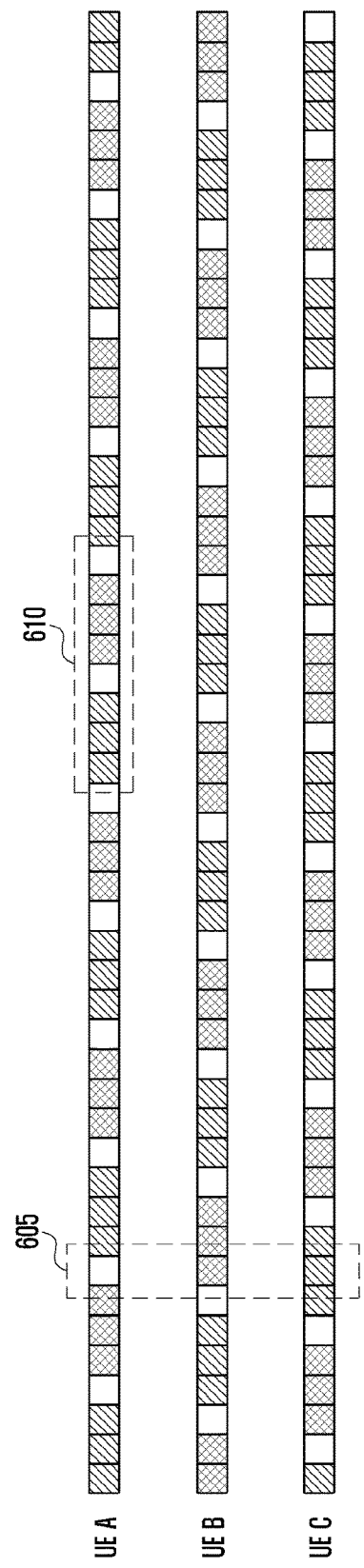
FIG. 6 is a view illustrating a preferable pattern configuration.

FIG. 6 is a view illustrating a preferable pattern configuration.

It is preferable to configure a pattern such that the patterns of each UE are not overlapped so as not to waste transmission resources of the MSCG and the SSCG. For example, it is preferable to configure _605 the switching subframe to a UE, the MSCG subframe to another UE, and the SSCG subframe to further another UE, as a random subframe in transmission resource efficiency. To this end, start time points of the patterns are configured differently according to each UE.

In the present invention, the following three pieces of information are transferred to the UE to configure the specified pattern according to each UE as described above.

Bitmap 1: The bitmap 1 has a predetermined length, and each bit specifies whether the subframe is the MSCG subframe or not. For example, 1 means the MSCG subframe. The length is 8 bits in the CA of the FDD band, the length is 10 bits, 48 bits, or 50 bits in the CA of the TDD band.

Bitmap 2: The bitmap 2 has the length equal to that of the bitmap 1, each bit specifies whether the subframe is the SSCG subframe or not.

Offset: The offset is information specifying a start subframe of the subframe pattern, and the size of the offset is determined by a value obtained through a log operation of the bitmap length. For example, when the size of the bitmap is 8 bits, the size of the offset is Ceiling [Log 2(8), 1]=3 bits, and when the size of the bitmap is 10 bits, the size of the offset is Ceiling [Log 2(10), 1]=4 bits.

The subframe pattern is determined by the bitmap 1 and the bitmap 2. In the bitmap 1, for example, a subframe indicated by 1 as a predetermined value indicates the MSCG subframe. In the bitmap 2, a subframe indicated by the predetermined value indicates the SSCG subframe. In all of the bitmaps, for example, a subframe indicated by 0 as another predetermined value indicates the switching subframe.

For example, a pattern of a UE A is defined as the MSCG subframe, the MSCG subframe, the MSCG subframe, the switching subframe, the SSCG subframe, the SSCG subframe, the SSCG subframe and the switching subframe as shown in _610, the bitmap 1 may be defined as 11100000, and the bitmap 2 may be defined as 00001110.

In this case, the first, second and third subframes are indicated as 1 in the bitmap 1, and thus the first, second and third subframes may be the MSCG subframes. The fifth, sixth and seventh subframes are indicated as 1 in the bitmap 2, and thus the fifth, sixth and seventh subframes may be SSCG subframes. The fourth and eighth subframes are indicated as 0 in both bitmaps, and thus the fourth and eighth subframes may indicate the switching subframes.

Meanwhile, according to another embodiment of the present invention, the subframe pattern may be defined by an index instead of the above-mentioned two bitmaps. For example, in the FDD, the pattern index is defined as shown in Table 3, and the index may be signalized.

TABLE 3

| Pattern index | Subframe pattern |
|---|---|
| 0 | M/M/M/s/S/S/s |
| 1 | M/s/S/S/S/S/s |
| 2 | M/M/s/S/S/S/s |
| ... | ... |

A capital M means the MSCG subframe, a capital S means the SSCG subframe, and a small letter s means the switching subframe.

When the subframe pattern is determined using the bitmaps 1 and 2 or the pattern index, the UE calculates a reference subframe (or start subframe) of the subframe pattern using the offset by Equation 1.

(10*SFN+subframe number)MOD(pattern length)=offset     [Equation 1]

For example, in the FDD band combination, when 6 is signalized as the offset, the subframes in which the pattern is started are the same as the following.

[SFN=0, subframe number=6], [SFN=1, subframe number=4], [SFN=2, subframe number=2], ...

Figure 7:
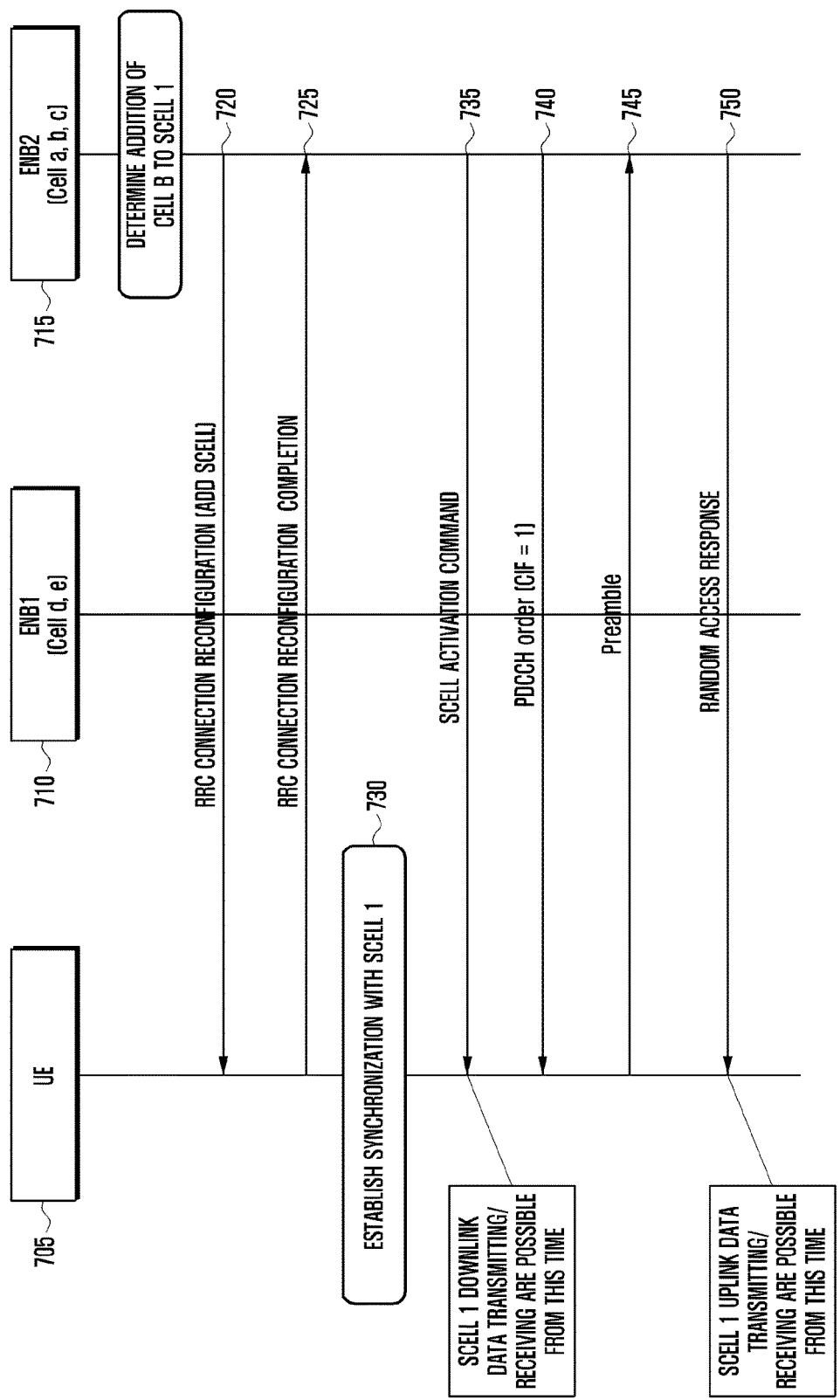
FIG. 7 is a flowchart of operations of a UE and an eNB configuring an SCell in an MSCG.

FIG. 7 is a flowchart illustrating an operation sequence of the UE and the eNB configuring the SCell included in the MSCG according to an embodiment of the present specification.

Hereinafter, for the convenience of description, the serving cell in the MSCG is marked as a serving cell_m, and the serving cell in the SSCG is marked as a serving cell_s.

Referring to FIG. 7, a mobile communication system may include a UE 705, an eNB 1 710 and an eNB 2 715.

A cell a, a cell b and a cell c are controlled by the eNB 2 715, and a cell d and a cell e are controlled by the eNB 1 710. It is assumed that the PCell of the UE is the cell a.

According to the above-mentioned term definition, the eNB 1 715 is the MeNB. The eNB 1 715 which is the MeNB configures the cell b as an additional SCell to the UE. In this case, the MeNB 715 stores information related to the newly added SCell in a Radio Resource Control Connection Reconfiguration control message and transmits the information to the UE 705 (step 720). The newly added SCell is a cell that is directly managed by a serving eNB, and at least one piece of information shown in the following Table 4 is stored in the control message.

TABLE 4

| Name | Description |
|---|---|
| sCellIndex-r10 | The sCellIndex-r10 is an identifier of the serving cell. The sCellIndex-r10 is an integer having a predetermined size. sCellIndex-r10 is used when information on a corresponding serving cell is updated later. |
| cellIdentification-r10 | The cellIdentification-r10 is information identifying a serving cell physically. The cellIdentification-r10 includes forward center frequency and Physical Cell ID (PCI). |

TABLE 4-continued

| Name | Description |
| --- | --- |
| radioResourceConfigCommonSCell-r10 | The radioResourceConfigCommonSCell-r10 is information related to wireless resources of the serving cell. For example, a forward bandwidth, forward HARQ feedback channel configuration information, backward center frequency information, backward bandwidth information, and the like are included in here. |
| radioResourceConfigDedicatedSCell-r10 | The radioResourceConfigDedicatedSCell-r10 is information on exclusive resources allocated to the UE in the serving cell. For example, reference signal structure information for channel quality measurement, inter-carrier scheduling configuration information, and the like are included here. |
| TAG(Timing Advance Group) information | The TAG is information indicating a TAG in which the UE is included. This may include, for example, TAG id and a Timing Advance (TA). If the UE is included in a Primary TAG (P-TAG), this information is not signalized. |

Among the parameters, the TAG is a group of the serving cells sharing the same backward transmission timing. A type of the TAG includes a Primary TAG (P-TAG) and a Secondary TAG (S-TAG). The P-TAG is a TAG in which the PCell is included, and the S-TAG is a TAG configured with only the SCell. An inclusion of a random serving cell in a random TAG means that the backward transmission timing of the serving cell is the same as the backward transmission timing of other serving cells included in the TAG, and means that a backward synchronization-or-not is determined by a TA timer of the TAG.

The backward transmission timing of the random TAG is established by a performance of a random access process in a predetermined serving cell, and is maintained by receiving a TA command. The UE drives or re-drives the TA timer of a corresponding TAG whenever the UE receives the TA command with respect to the random TAG. When the TA timer is expired, the UE determines that the backward transmission synchronization of the corresponding TAG is lost, and does not perform the backward transmission until the UE performs the random access again. As shown in Table 4, when the SCell of the same serving cell group is added, the above-mentioned pattern related information is not used. This is because it is possible for the scheduler to schedule so as not to overlap the backward transmission mutually, since the serving cell configured in the UE is controlled by the same scheduler.

The UE 705 transmits an RRC connection reconfiguration complete for the control message (step 725). The UE 705 establishes forward/downlink synchronization for the cell b, that is the serving cell 1 (730). The forward/downlink means that the eNB transmits and the UE receives, and the backward/uplink means that the UE transmits and eNB receives. In the present specification, 'forward' and 'downlink' are mixed as the same meaning. In addition, in the present specification, 'backward' and 'uplink' are mixed as the same meaning. The establishing of the forward synchronization for the random cell means that a synchronization channel of the cell is obtained to recognize a forward frame boundary, and the like.

The MeNB 715 transmits an Activate/Deactivate MAC Control Element (A/D MAC CE) which is a MAC hierarchy control command for activating the SCell 1 to the UE at a random time when the MeNB 715 determines that the UE 705 finishes the configuration of the SCell 1 (735).

The control command may be formed of a bitmap. In the bitmap, for example, a first bit may correspond to an SCell 1, a second bit may correspond to an SCell 2, and an n-th bit may correspond to an SCell n. Each of the bits indicates an activation/deactivation of a corresponding SCell. The bitmap may have 1 byte size. Since the index of the SCell includes 7 indices of 1 to 7, a first Least Significant Bit (LSB) of the byte is not used, a second LSB may be mapped with the SCell 1, a third LSB may be mapped with the SCell 2, and the last LSB (or Most Significant Bit (MSB)) may be mapped with the SCell 7.

The UE 705 starts a monitoring of a Physical Downlink Control Channel (PDCCH) of the SCell 1 from a predetermined time that is elapsed based on a time when the activation command for the SCell 1 is received. The PDCCH is a channel providing forward/backward transmission resource allocation information and the like.

If the SCell 1 is included in a TAG of which the synchronization is established in advance, the UE 705 starts forward/backward transmission/reception from the monitoring start time. If the SCell 1 is not included in the TAG of which synchronization is not established, the UE 705 starts a reception of the forward signal at the monitoring start time, and the UE 705 does not perform the backward signal transmission. That is, the UE 705 receives forward data when the forward transmission resource allocation information is received through the PDCCH. However, the UE 705 ignores the backward transmission resource allocation information even though the UE 705 receives the backward transmission resource allocation information. If the SCell 1 is not included in the TAG of which synchronization is not established, the UE waits until the UE receives a random access command from a predetermined SCell included in the TAG through the PDCCH. The random access command is a configuration of a predetermined field as a predetermined value of a backward grant (which allocates backward transmission resources and the like to the UE using scheduling information transmitted through the PDCCH). The random access command indicates a transmission of a predetermined preamble in a predetermined serving cell to the UE. An identifier of a serving cell performing the preamble transmission may be indicated in a Carrier Indicator Field (CIF) of the random access command.

Next, in step 740, the UE 750 receives the random access command which indicates the transmission of the random access preamble through the serving cell 1. In step 745, the UE 705 transmits the indicated preamble through the SCell 1 and monitors the PDCCH of the PCell so as to receive a Random Access Response (RAR) which is a response message to the preamble. In the RAR, a Timing Advance or Timing Adjustment (TA) command and other pieces of control information are stored. If a cell through which the preamble is transmitted is the serving cell_m, when the response to the preamble is performed in the PCell, since the RAR reception is performed in only PCell, there are merits in which a PDCCH monitoring load of the UE 705 is reduced. The UE 705 monitors the PDCCH of the PCell in order to receive the RAR in step 750. When the UE 505 receives an effective response message to the preamble transmitted in step 745, the UE 705 determines that the backward signal transmission is possible after a predetermined time is elapsed from the time point. For example, when the UE 705 receives the effective RAR in an n-subframe, the UE determines that the backward transmission is possible from an (n+m)-th frame. The UE performs the forward/backward data transmission/reception until the serving cell is released or deactivated, in the newly configured serving cell.

Figure 8:
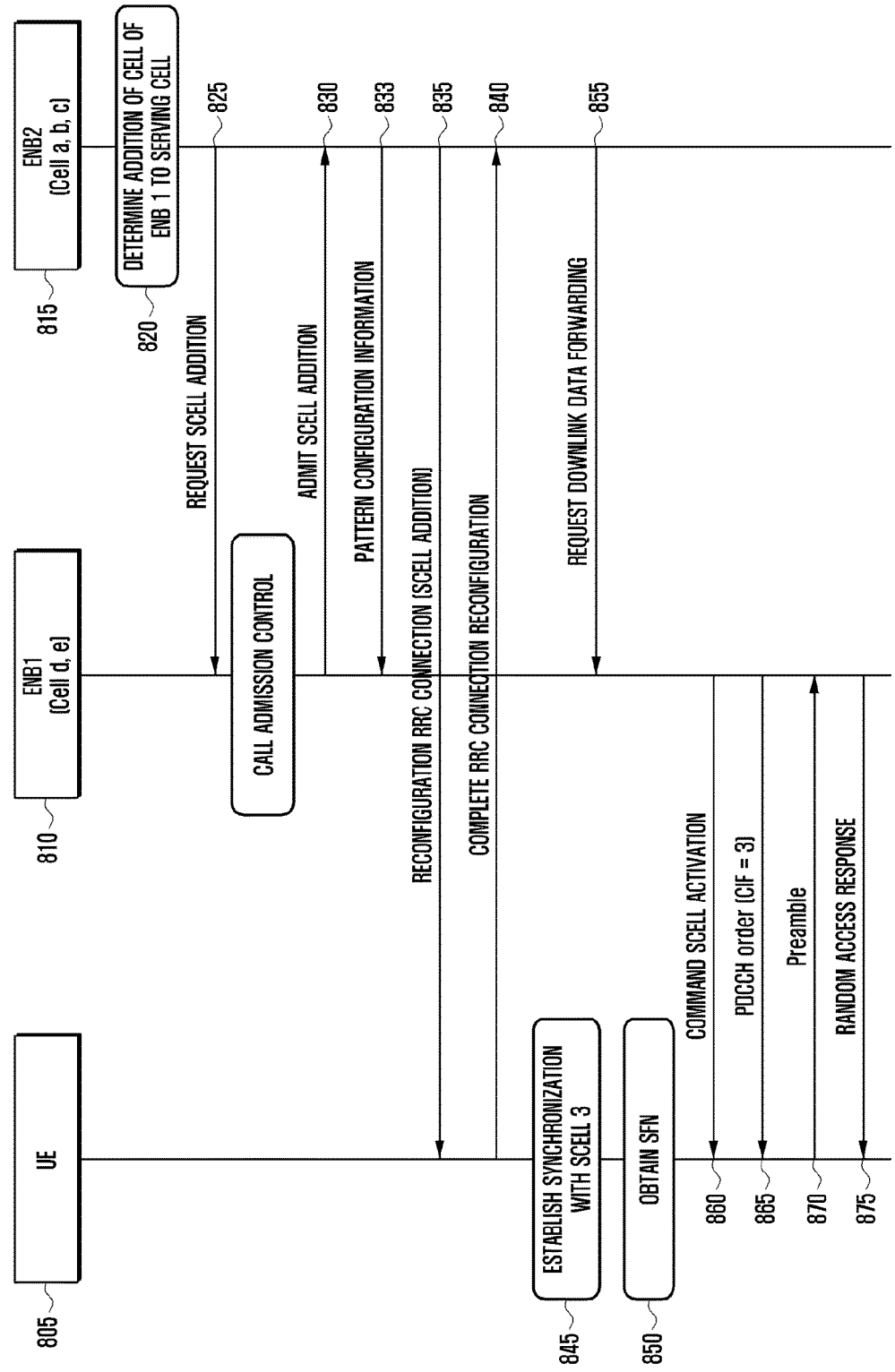
FIG. 8 is a flowchart of operations of the UE and the eNB configuring an SCell in an SSCG.

FIG. 8 is a flowchart illustrating a process of configuring the SCell included in the SSCG, that is the serving cell_s.

FIG. 7 is a process for adding the carrier in the same eNB, and FIG. 8 illustrates a process for adding a carrier in different eNBs.

The MeNB 815 determines that the MeNB 815 adds the SCell to the UE 805 at a random time (820). Specially, when the UE 805 is located in an area of a cell controlled by an eNB 1 810, the MeNB 815 determines that the MeNB 815 adds the cell controlled by the eNB 1 810 as the SCell in step 820. Next, the MeNB 815 transmits a control message for requiring an SCell addition to an eNB 2 810 (825). In the control message, at least some of information described in the following Table 5 may be stored.

TABLE 5

| Name | Description |
|---|---|
| SCell id information | The SCell id information is information related to identifiers of the SCells configured in the SeNB. The SCell id information includes at least one sCellIndex-r10. The MeNB determines the sCellIndex-r10 and informs of the sCellIndex-r10 to the SeNB in order to prevent a reuse of a previously used identifier. Alternatively, an area of an SCell id used by the MeNB and an area of an SCell id used by a drifty eNB may be divided and defined. For example, SCell id 1 to 3 and SCell id 4 to 7 may be defined in advance such that the SCell id 1 to 3 are used by the MeNB and the SCell id 4 to 7 are used by the SeNB. |
| TAG id information | The TAG id information is information related to an identifier of a TAG configured in the SeNB. The MeNB determines the TAG id information and informs of the TAG id information to the SeNB in order to prevent a reuse of a previously used identifier. |
| Backward scheduling related information | The backward scheduling related information includes priority information of logical channels configured in the UE and logical channel group information. The SeNB uses this information to interpret buffer state report information of the UE and perform a backward scheduling. |
| Offloaded bearer information | The offloaded bearer information is a service required in high capacity data transmission/reception in the SeNB. For example, it is preferable to process a service such as an FTP download. The MeNB determines a bearer which is offloaded to the SeNB, among bearers configured in the UE, and transfers information related to the offloaded bearer, for example, a DRB identifier, PDCP configuration information, RLC configuration information, request Qos information, and the like to the SeNB. |
| Call response control related information | The MeNB provides reference information such that the SeNB determines whether an SCELL addition request is accepted or rejected. |

When the SeNB 810 receives an SCell addition request control message, the SeNB 810 determines whether the SeNB accepts the request or not in consideration of a current load situation and the like. When the SeNB 810 determines that the SeNB 810 accepts the request, the SeNB 810 generates a control message which stores at least some among information of the following Table 6 and transmits the control message to the MeNB 815 (830).

TABLE 6

| Name | Description |
|---|---|
| SCellToAddMod | The SCellToAddMod is information on the SCells configured in the SeNB, and includes pieces of information such as the following. sCellIndex-r10, cellIdentification-r10, radioResourceConfigCommonSCell-r10, radioResourceConfigDedicatedSCell-r10, TAG related information |
| PUCCH configuration information for PUCCH SCell | In at least one SCell among the SCells in the SSCG, the Physical Uplink Control Channel (PUCCH) is configured. The backward control information such as the HARQ feedback, the Channel Status Information (CSI), Sounding Reference Signal (SRS), or the Scheduling Request (SR) is transmitted through the PUCCH. Hereinafter, the SCell through which the PUCCH is transmitted is |

TABLE 6-continued

| Name | Description |
|---|---|
| | referred to as a PUCCH SCell. Identifier information of the PUCCH SCell, PUCCH configuration information, and the like is a lower layer information of this information. |
| Data forwarding information | The data forwarding information is logical channel (or logical tunnel) information to be used in a data exchange between the MeNB and the SeNB, and includes information such as a GPRS Tunnel Protocol (GTP) tunnel identifier for a forward data exchange and a GTP tunnel identifier for a backward data exchange. |
| Identifier of UE | The identifier of UE is a C-RNTI to be used in the SCell of the SSCG by the UE. Hereinafter, it is referred to as a C-RNTI_S. |
| Bearer configuration information | The bearer configuration information is configuration information of a bearer which is offloaded. The bearer configuration information is configuration information includes a list of a bearer of which an offload is accepted and configuration information according to each bearer. When the configuration of the bearer is the same, the bearer configuration information may include only the list information of the accepted bearer. |
| Load information | The load information is information on a current load situation of an added SCell, that is the serving cell_s. For example, the load information may be a % indicating a level of a load of a corresponding cell during a predetermined current past period, and may be information such as high/medium/low. |

When the MeNB 815 receives the control message, the MeNB 815 may compare a current frequency band combination configuration (i.e., a combination of a frequency band of the serving cell_m and a frequency band of the serving cell_s) of the UE with a performance for a corresponding frequency band combination reported by the UE, and may determine whether an application of a pattern is necessary.

As a result of the determination, when it is necessary to apply the pattern, the MeNB 815 compares load information of the serving cell_s provided from the SeNB with a load of the serving cell_m configured to the UE to determine the pattern to be applied. For example, when the load of the serving cell_s is preferable to the load of the serving cell_m, the SSCG subframe selects more patterns compared to the MSCG subframe.

The MeNB transfers the determined pattern information to the SeNB using a predetermined control message. The pattern information may include the bitmap 1, bitmap 2 and offset, or the pattern index and offset.

The MeNB 815 generates the RRC control message indicating the serving cell addition and transmits the RRC control message to the UE 805 (835). The RRC control message includes pattern information and thus the RRC control message includes at least some pieces of information among the following pieces of information shown in Table 7.

TABLE 7

| Name | Description |
|---|---|
| SCellAddMod | Information transmitted by the SeNB is stored as itself. That is, the SCellAddMod is information the same as the SCellAddMod of Table 6. One SCellAddMod is stored per one SCell, and the information is a lower layer information of the SCellAddModList. |
| PUCCH configuration information for PUCCH SCell | Information transmitted by the SeNB is stored as itself. That is, the PUCCH configuration information for PUCCH SCell is information the same as the PUCCH information for PUCCH SCell of Table 6. |
| Serving cell_s information | The serving cell_s information is information on the SCells that belongs to the SSCG among the configured SCells. The serving cell_s information may be identifiers of the SCells or identifiers of the TAGs that belong to the SSCG. |
| Identifier of UE | The identifier of UE is C-RNTI to be used in the serving cell of the SSCG by the UE. That is, the identifier of UE is a C-RNTI_S. |
| Offload bearer information | The offload bearer information is information on a bearer to be processed in the SeNB. The offload bearer information is information on a bearer transmitted and received through the serving cell s from a point of the UE. When a list of the bearer and a bearer configuration are different, the bearer configuration information is included here. |
| Pattern information | Bitmap 1, Bitmap 2, Offset, and the like |

The configuration information of a plurality of SCells may be stored in the RRC control message. In addition, the serving cell_m and the serving cell_s may be configured together. For example, a Cell b, a Cell c, a Cell d and a Cell e are configured to a UE of which a Cell a is a PCell as the SCell, and the pieces of the information may be disposed in various sequences in the RRC control message.

Figure 9:
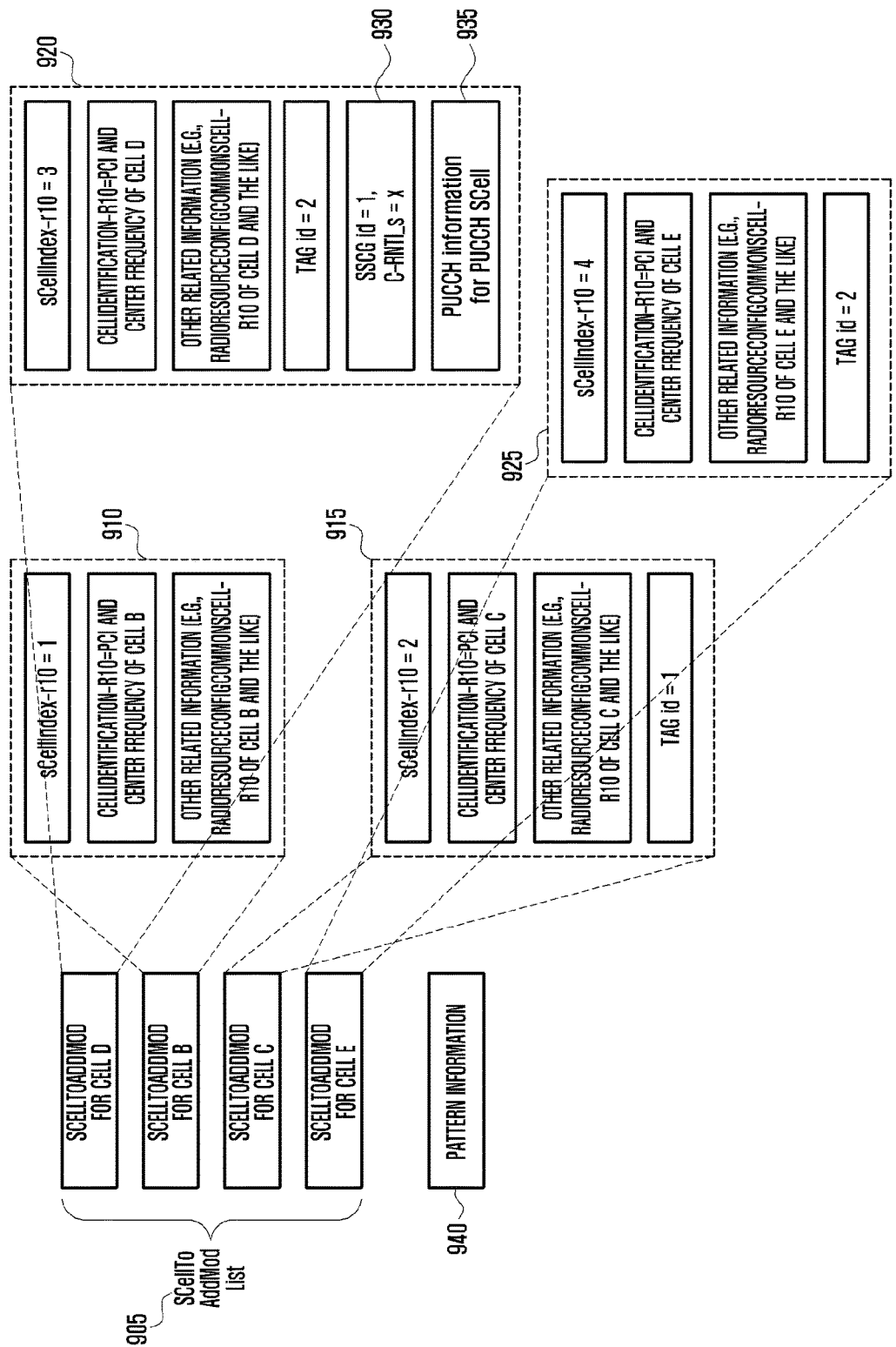
FIG. 9 is a configuration diagram of an RRC control message according to an embodiment of the present specification.

FIG. 9 is a view illustrating a configuration of the RRC control message according to an embodiment of the present specification.

In the present embodiment, it is assumed that the Cell a and Cell b have the same backward transmission timing and form a P-TAG, the Cell c forms an S-TAG 1, and the Cell d and Cell e form an S-TAG 2.

The RRC control message includes SCellToAddModList 905 and pattern information 940. In the SCellToAddModList 905, SCellToAddMod 910 for the Cell b, SCellToAddMod 915 for the Cell c, SCellToAddMod 920 for the Cell d, SCellToAddMod 925 for the Cell e are stored.

Specific information may be included or not included in the SCellToAddMod 910, 915, 920 and 925 according to a nature of a corresponding SCell. When the SCell is included in the P-TAG, that is, the SCell has the backward transmission timing the same as that of the PCell, information on the TAG is not stored in a corresponding SCellToAddMod. For example, the information on the TAG is not stored in the SCellToAddMod 910 for the Cell b. In the remained SCellToAddMod 915, 920 and 925 for the SCells in the TAG rather than the P-TAG, an identifier and a TA timer value of the TAG in which a corresponding SCell is included are included.

In at least one cell among the serving cell_s, information 930 on the SSCG, for example, an identifier of the SSCG and a C-RNTI of a UE to be used in the SSCG are stored. In an example of FIG. 9, the information is stored in the SCellToAddMod 915 for the Cell d. The PUCCH configuration information 935 is stored in at least one cell among the serving cell_s. In the example of FIG. 9, the information is stored in the SCellToAddMod 915 for the Cell d. Information on the SSCG of the SCell having the same TAG id is applied to the SCell included in the SSCG but does not have the information on the SSCG. For example, since the SSCG related information is not stored in the Cell e, but the SSCG related information is stored in the Cell d having the same TAG id, the UE determines that the Cell e is also the SSCG, and the SSCG identifier and the C-RNTI of the Cell e use the same value indicated for the Cell d.

Figure 10:
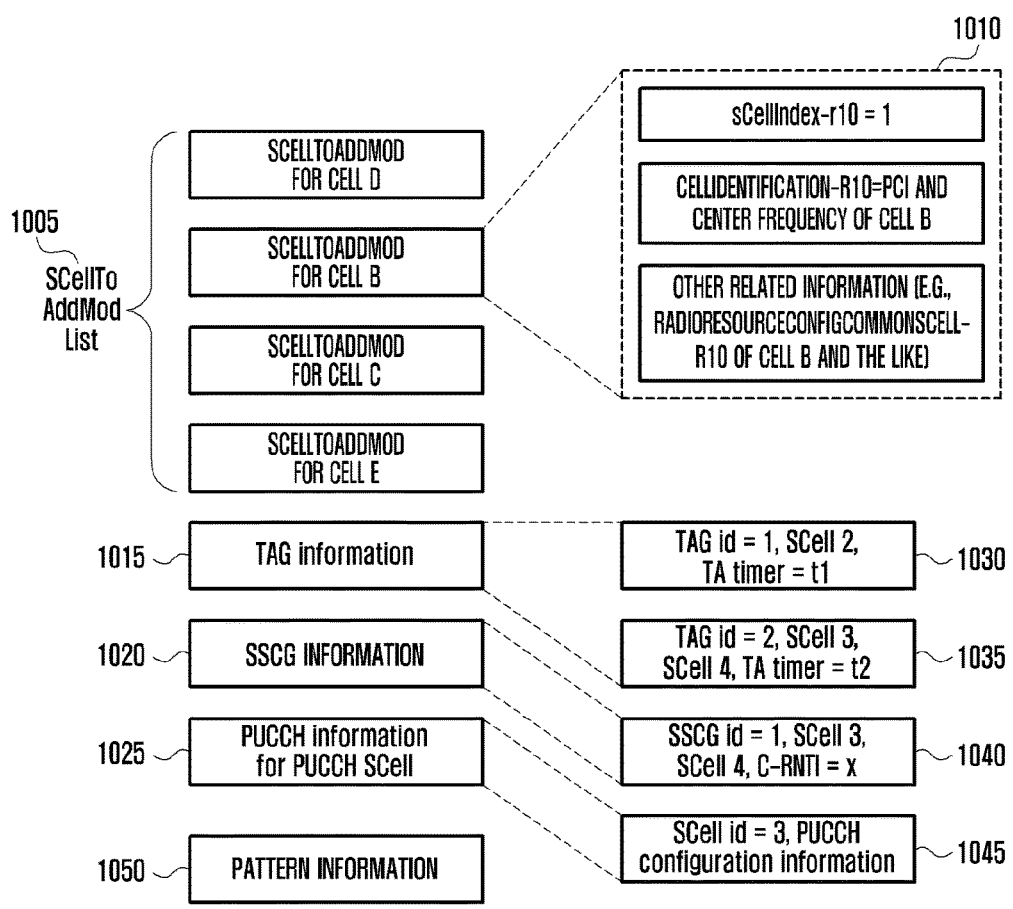
FIG. 10 is a configuration diagram of an RRC control message according to another embodiment of the present specification.
Figure 11:
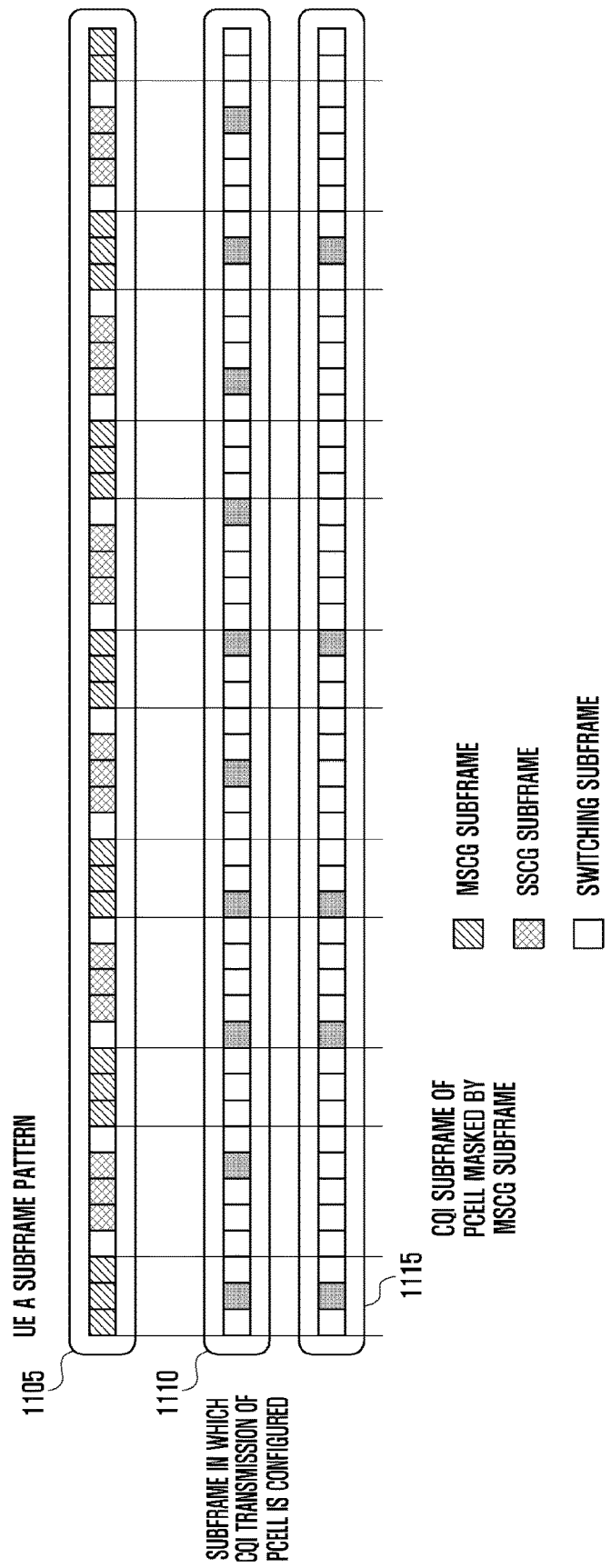
FIG. 11 is a view illustrating a CQI transmission subframe determined through a subframe pattern and CQI configuration information.

FIG. 10 is a view illustrating a configuration of the RRC control message according to another embodiment of the present specification.

FIG. 10 illustrates another example in which the TAG related information and the SSCG related information are stored in an additional position rather than the SCellToAddMod.

The RRC control message includes SCellToAddModList_1005. In the SCellToAddModList_1005, SCellToAddMod_1010 for a Cell 2, SCellToAddMod for a Cell 3, SCellToAddMod for a Cell 4 and SCellToAddMod for a Cell 5 are stored. In the SCellToAddMod, pieces of information of the same types are stored. That is, in all SCellToAddMods, information such as sCellIndex-r10, cellIdentification-r10 and radioResourceConfigCommonSCell-r10 are stored.

The TAG related information _1015, the SSCG related information _1020, the PUCCH configuration information of the PUCCH Scell, the pattern information _1050, and the like are stored individually. In the TAG related information _1015, the TAG identifier, identifiers of the SCells forming the TAG and the TA timer value according to each TAG are stored. For example, information _1030 wherein a TAG of which the TAG identifier is 1 is formed of the SCell 2 and t1 is used as the TA timer is stored, and information 1035 wherein a TAG of which the TAG identifier is 2 is formed of the SCell 3 and the SCell 4 and t2 is used as the TA timer is stored.

In the SSCG related information _1020, a cell group identifier, identifiers of the serving cells forming the cell group and the C-RNTI information to be used in a corresponding cell group according to each SSCG are stored. For example, information _1040 wherein an SSCG of which the cell group identifier is 1 is formed of the SCell 3 and the SCell 4 and x is used as the C-RNTI is stored. Information on the MSCG is not signalized separately and is determined according to the following rule.

<MSCG Related Information Determining Rule>

The serving cell in the MSCG: the SCell and PCell not the serving cell_s among the SCells The C-RNTI to be used in the MSCG: the C-RNTI which is currently being used in the PCell In the SSCG related information, the identifier of the TAG rather than the identifier of the SCell may be included. This is an available method under a premise in which one TAG is not formed through the multiple cell groups. For example, in the SSCG configuration information _1020, information indicating a TAG id 2 instead of information indicating the SCell 3 and the SCell 4 may be stored, and the UE may determine that the SCell 3 and the SCell 4 in the TAG id 2 are the SSCG.

The PUCCH configuration information of the PUCCH SCell includes the SSCG identifier, the identifier of the PUCCH SCell and the PUCCH configuration information. One PUCCH SCell exists per SSCG. The CSI information, the HARQ feedback information and the like for the serving cells in the SSCG are transmitted through the PUCCH configured in the PUCCH SCell.

The PUCCH SCell may be determined according to a predetermined rule instead the identifier of the PUCCH SCell is definitely signalized. For example, an SCell corresponding to a first SCellToAddMod of the SCellToAddModList may be determined as the PUCCH SCell. Alternatively, an SCell of which the SCell identifier is the highest or an SCell of which the SCell identifier is the lowest among the SCells of which SCellToAddMod information is stored in a corresponding RRC control message may be determined as the PUCCH SCell. Such a tacit determining method is performed in a premise in which one SSCG exists.

Random access configuration information of multiple serving cells may be included. The UE should perform a random access in at least one serving cell among the serving cells in the TAG. In order to perform the random access in a random serving cell, the random access configuration information of a corresponding serving cell is necessary. The UE in which multiple serving cells are configured has the following random access configuration information.

Random access configuration information of the PCell: The random access configuration information of the PCell is information obtained through system information SIB 2 of the PCell by the UE, and is applied when the UE perform the random access in the PCell.

Random access configuration information of a predetermined SCell: The random access configuration information of the predetermined SCell is information applied when the UE performs the random access in the SCell, and is stored in radioResourceConfigCommonSCell-r10 and radioResourceConfigDedicatedSCell-r10 of a corresponding SCell. That is, the random access configuration information of the predetermined SCell is transferred to the UE through an exclusive RRC control message.

The random access configuration information includes prach-ConfigIndex-r10 which is information on a Physical Random Access Channel (PRACH) resource configured in a corresponding serving cell. The random access process includes transmitting a preamble from the UE, transmitting an RAR from the eNB to the UE, and the like. The prach-ConfigIndex-r10 is information specifying the PRACH resource in which the UE transmits the preamble. Since the PRACH is always configured in specific frequency resource in the FDD, the information specifies a subframe in which the PRACH is configured. Since the PRACH is configured in one among six frequency resources in the TDD, the information specifies both of the subframe and the frequency resource. The prach-ConfigIndex-r10 is an integer between 0 and 63, and the PRACH specified by each index is described in section 5.7 of standard 36.211.

Referring to FIG. 8 again, in step 840, the UE 805 transmits a response message (e.g., RRC connectivity reconfiguration completion message) to the serving eNB 815, and in step 845, the UE 805 establishes forward synchronization with newly configured SCells.

Next, in step 850, the UE 805 obtains a System Frame Number (SFN) of the PUCCH SCell among newly configured SCells. The SFN obtainment is performed in a process of receiving system information called a Master Information Block (MIB). The SFN is an integer between 0 and 1023, and is increased by 1 every 10 ms. The UE 805 identifies a PUCCH transmission time of the PUCCH SCell using the SFN and PUCCH configuration information.

Next, the UE 805 waits until the SCells are activated. When the SeNB 810 receives forward data from the serving eNB 815 or receives a predetermined control message indicating an activation of the SCell, the SeNB 810 starts a procedure of activating the SCells (855).

In step 860, the SeNB 810 may transmit a control message (e.g., A/D MAC CE) indicating an activation, for example, the SCell 3 to the UE 805.

When the UE 805 receives the MAC CE in a subframe n, the UE activates the SCell in a subframe (n+m1).

However, since backward synchronization of the PUCCH SCell is not established yet in the subframe (n+m1), although the SCell is activated, all of the forward and backward transmitting and receiving are impossible. That is, the UE 805 monitors the PDCCH of the SCell, but the UE 805 ignores forward/backward resource allocation signal although the UE 805 receives the forward/backward resource allocation signal.

The SeNB 810 transmits the random access command to the UE 805 such that the UE 805 establishes the backward synchronization of the PUCCH SCell (865). The UE 805 starts the random access process in the PUCCH SCell using an exclusive preamble indicated in the command. That is, the UE 805 transmits the preamble in the SCell (870), and monitors PDCCH in order to receive the RAR which is a response message for this.

When the UE 805 transmits the preamble in the MSCG, the RAR is transmitted through the PCell. In contrast, when the UE 805 transmits the preamble in the serving cell_s, the UE 805 monitors the PDCCH of the SCell transmitting the preamble or the PUCCH SCell in order to receive the RAR. This is because an additional information exchange is necessary between the SeNB 810 and the serving eNB 815.

For example, the RAR may be received through a C-RNTI_s of the UE 805. This is because transmitting and receiving the response message using the C-RNTI_s is more effective, since there is no probability of an occurrence of an incorrect operation by a conflict because the C-RNIT_s is allocated to the UE 805 in advance and an exclusive preamble is used (when the eNB receives an exclusive preamble, the eNB recognizes the UE transmitting the preamble. Thus, the eNB recognizes the UE to which the eNB transmits the RAR). When the UE 805 receives an effective response message in the SCell or PDCCH SCell in which the preamble is transmitted, the UE 805 adjusts a backward transmission timing of the PDCCH SCell or a TAG in which the SCell is included by applying a TA command of the response message and activates the backward direction at a predetermined time. The predetermined time may be a subframe (n+m2) when an effective TA command or an effective random access response message is received at a subframe (n). The m2 is previously determined integer.

Meanwhile, according to an embodiment of the present invention, the UE does not depend on a dynamic scheduling in the serving cells, and may perform the backward transmission using a predetermined transmission resource or according to a determination thereof. For example, the CQI and the like may be transmitted through transmission resources allocated in the PUCCH in advance. Alternatively, the UE selects some among transmission resources noticed as a preamble transmission purpose to perform the preamble transmission. The Sounding Reference Signal (SRS) is also performed by the backward transmission through a previously allocated transmission resource.

In a circumstance in which a pattern is used so as not to overlap the backward transmissions of the serving cell_m and the serving cell_s, the backward transmission which is autonomously performed by the UE as described above should also be adjusted suitably for the pattern. That is, the PUCCH transmission resource configured in the serving cell_s of the UE should be configured on the SSCG subframe, and the PRACH preamble transmitted on the random access process should be transmitted on the MSCG subframe.

To this end, a method of defining the PRACH configuration information may be considered so as to configure the PRACH such that the PRACH adapts a specific pattern or so as to allocate PUCCH transmission resource such that the PUCCH adapts a specific pattern by defining the PUCCH configuration information flexibly. Such a method has a limit in which previously defined PUCCH configuration information or PRACH configuration information cannot be used and PRACH configuration information applied all UEs of the cell cannot be used since a pattern is different according to each UE.

Therefore, the UE according to an embodiment of the present invention may define a pattern applied to the backward transmission based on the subframe specified by the configuration information and the subframe specified by the pattern while using the existing configuration information as itself. For example, the UE may define an intersection of the subframe specified by the configuration information and the subframe specified by the pattern as the pattern applied to the autonomous backward transmission.

For example, when a subframe pattern of a random UE A is the same as _1105 and a subframe in which a Channel Quality Indicator (CQI) transmission resource specified by cqi-PUCCH-ResourceIndex of the PCell is configured is the same as _1110, in determining a subframe transmitting the CQI in the PCell by the UE, the UE determines that only subframes _1115 which are the MSCG subframe of the subframe pattern and a CQI transmission subframe of the PCell as a subframe transmitting the CQI.

In determining the subframe transmitting the CQI in the PUCCH SCell, the UE masks a subframe in which the CQI transmission resource specified by cqi-PUCCH-ResourceIndex of the PUCCH SCell is configured as the SSCG subframe, and the UE transmits the CQI in the PUCCH SCell with respect to only a subframe corresponding to both of them.

The operation may also correspond to another PUCCH transmission resource, for example, Precoding Matrix Indicator (PMI), Precoding Type Indicator (PTI), Rank Indicator (RI), Scheduling Request (SR) transmission resources, SRS transmission resources and the like.

The transmission resources are specified by cqi-pmi-ConfigIndex, ri-ConfigIndex, sr-ConfigIndex and srs-ConfigIndex. In determining the subframe transmitting the backward signal in the PCell by the UE, the UE masks subframes specified by cqi-pmi-ConfigIndex, ri-ConfigIndex, sr-ConfigIndex and srs-ConfigIndex of the PCell, respectively, as the MSCG subframe to determine the PCell subframe transmitting the backward signal.

In addition, in determining the subframe transmitting the backward signal in the PUCCH SCell by the UE, the UE may mask subframes specified by cqi-pmi-ConfigIndex, ri-ConfigIndex, sr-ConfigIndex and srs-ConfigIndex of the PUCCH SCell, respectively, as the SSCG subframe to determine the PUCCH SCell subframe transmitting the backward signal.

In addition, in determining the subframe transmitting the SRS in a random SCell by the UE, the UE masks subframes specified by srs-ConfigIndex of a corresponding SCell, respectively, as the MSCG subframe when the SCell is the serving cell_m and as the SSCG subframe when the SCell is the serving cell_s to determine the subframe transmitting the SRS.

Figure 12:
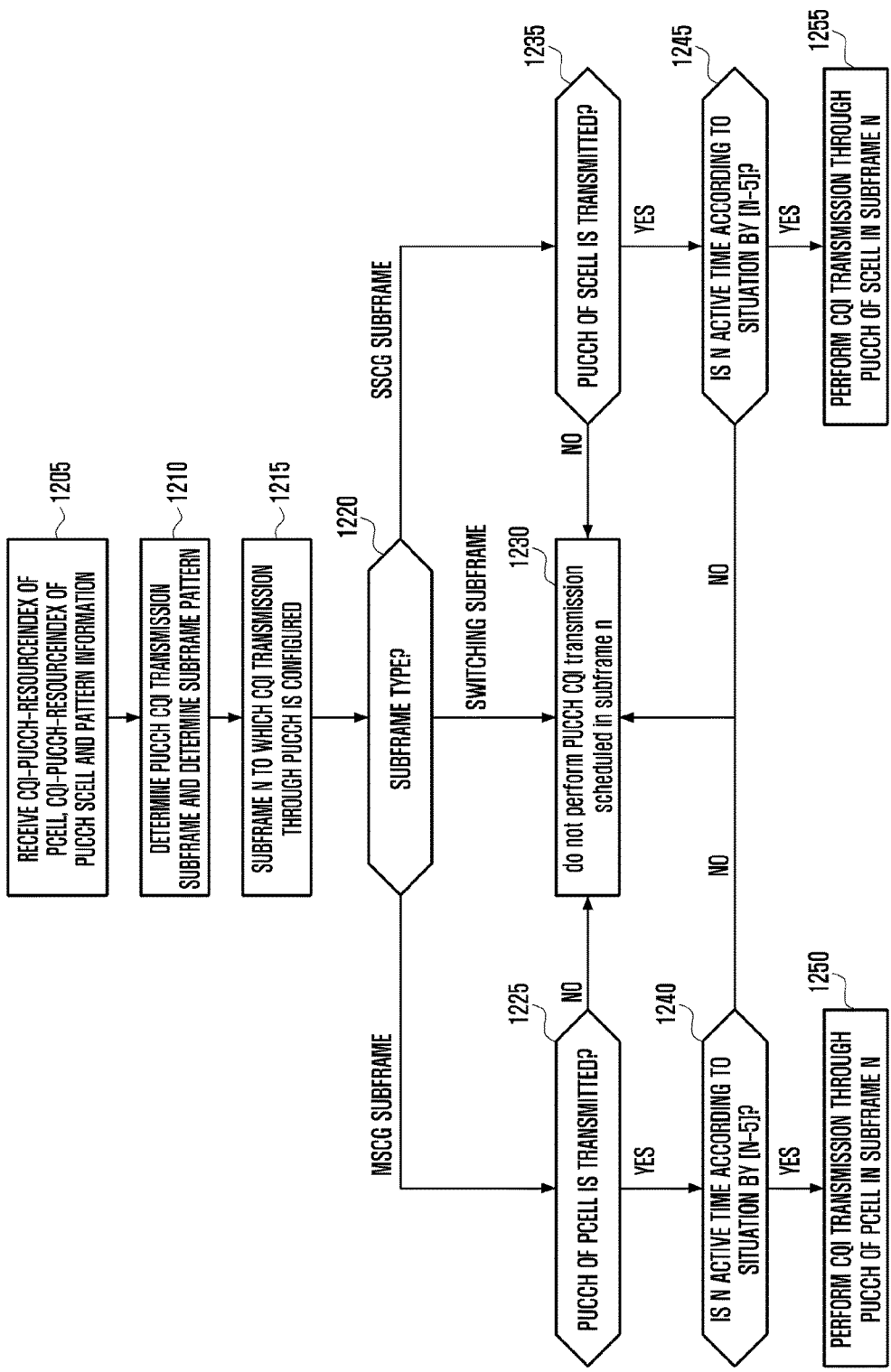
FIG. 12 is a view illustrating an operation of a UE determining whether a PUCCH CQI is transmitted or not in a random subframe n.

FIG. 12 is a flowchart illustrating a UE operation sequence transmitting the CQI according to an embodiment of the present invention.

In step _1205, the UE receives cqi-PUCCH-ResourceIndex of the PCell, cqi-PUCCH-ResourceIndex of the PUCCH SCell, pattern information and the like from the eNB. The pieces of the information may be received simultaneously through one control message, and may be received sequentially through individual control messages.

In step _1210, the UE determines the subframe transmitting the PUCCH CQI of the PCell, the subframe transmitting the PUCCH CQI of the PUCCH SCell, and the subframe pattern using the pieces of the information. The transmitting of the PUCCH CQI means transmitting the CQI using the PUCCH transmission resource. The determining operation may be simultaneously progressed, or may be sequentially progressed according to a received sequence of related control information.

Next, the UE performs a normal operation. In step _1215, when the subframe transmitting the PUCCH CQI, for example a subframe n, is approached, the UE performs step _1220.

In step _1220, the UE determines a type of the subframe n. When the subframe n is the MSCG subframe, the UE performs step _1225, when the subframe n is the switching subframe, the UE performs step _1230, and when the subframe is the SSCG subframe, the UE performs step _1235.

In _1225 step, the UE checks whether the PUCCH CQI transmission scheduled in the subframe n is the PUCCH CQI transmission of the PCell. That is, the UE checks whether the subframe n is a subframe specified by cqi-PUCCH-ResourceIndex of the PCell. When the PUCCH CQI transmission scheduled in the subframe n is the CQI transmission of the PCell, the UE performs step _1240, and when the PUCCH CQI transmission scheduled in the subframe n is not the CQI transmission of the PCell, the UE performs step 1230.

In step _1230, the UE does not perform the PUCCH CQI transmission scheduled in the subframe n and waits until a next subframe to which the PUCCH CQI transmission is configured comes.

In step _1235, the UE checks whether the PUCCH CQI transmission scheduled in the subframe n is the PUCCH CQI transmission of the PUCCH SCell. That is, the UE checks whether the subframe n is a subframe specified by cqi-PUCCH-ResourceIndex of the PUCCH SCell.

When the PUCCH CQI transmission scheduled in the subframe n is the CQI transmission of the PUCCH SCell, the UE performs step _1245, and when the PUCCH CQI transmission scheduled in the subframe n is not the CQI transmission of the PUCCH SCell, the UE performs step _1230.

In step _1240, when the UE determines at a subframe [n−5], the UE determines whether the subframe n is an active time. Step _1240 is performed only in the case in which a DRX is configured. A terminal to which the DRX is not configured skips step 1240 and directly performs step _1250.

In this case, the DRX is a method for reducing a battery consumption of the UE, and the UE may monitor the PDCCH only during an active time specified by a predetermined condition.

Regarding the CQI transmission, in principle, it is preferable to transmit the CQI only during the active time. However, since the active time may be expired or ended unexpectedly, it may not be possible to comply with the principle.

In determining whether the UE transmits the CQI in a random subframe, when the UE determines before a predetermined period, if the subframe is the active time, the UE transmits the CQI, and if the subframe is not the active time, the UE does not transmit the CQI. More specifically, in determining whether the UE transmits the CQI in the subframe n, when the UE considers a forward assignment, a backward grant, the DRX command and the like received until a subframe [n−5], the UE determines that the UE transmits the CQI according to whether the subframe n is the active time.

When a situation by the subframe [n−5] is considered, if n is the active time, the UE performs step _1250, and if n is not the active time, the UE performs step _1230.

In step _1250, the UE performs the PUCCH CQI transmission in the PCell. In addition, the UE waits until a next subframe to which the PUCCH CQI transmission is configured comes.

In step _1245, the UE considers the situation by the subframe [n−5], if n is the active time, the UE performs step _1255, and if n is not the active time, the UE performs step 1230.

In step _1255, the UE performs the PUCCH CQI transmission in the PUCCH SCell. In addition, the UE waits until a next subframe to which the PUCCH CQI transmission is configured comes.

Figure 13:
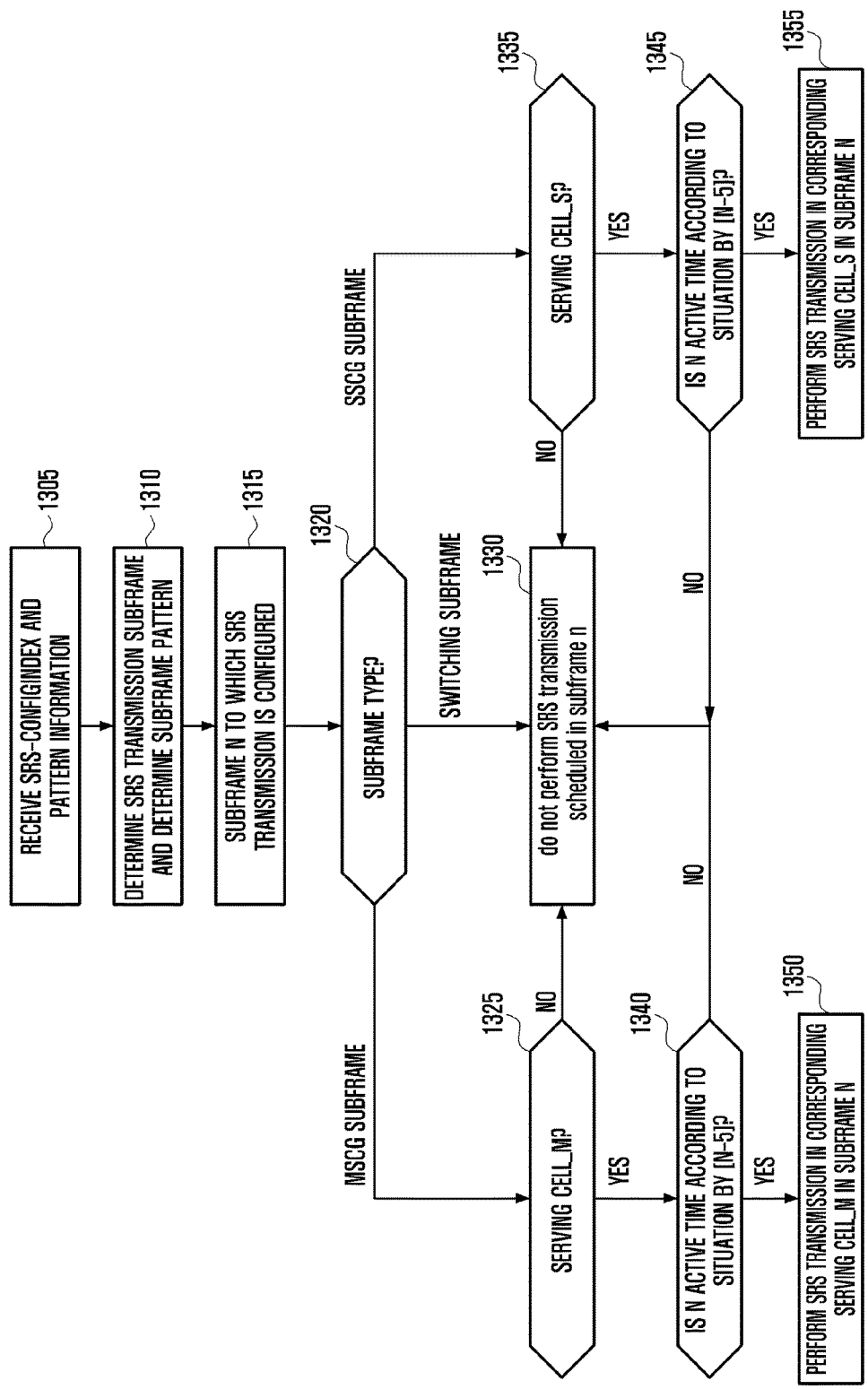
FIG. 13 is a view illustrating an operation of a UE determining whether an SRS is transmitted or not in a random subframe n.

FIG. 13 is a flowchart illustrating an operation sequence of the UE transmitting the SRS according to an embodiment of the present invention.

In step _1305, the UE receives at least one srs-ConfigIndex, pattern information and the like from the eNB. The srs-ConfigIndex may be signalized according to each serving cell. The pieces of the information may be received simultaneously through one control message, and may be received sequentially through individual control messages.

In step _1310, the UE determines a subframe transmitting the SRS according to each serving cell and the subframe pattern using the pieces of the information. The determining operation may be simultaneously progressed, or may be sequentially progressed according to a received sequence of control information.

Next, the UE performs a normal operation. In step _1315, when the subframe transmitting the SRS, for example a subframe n, is approached, the UE performs step 1320.

In step _1320, the UE determines a type of the subframe n. When the subframe n is the MSCG subframe, the UE performs step _1325, when the subframe n is the switching subframe, the UE performs step _1330, and when the subframe is the SSCG subframe, the UE performs step _1335.

In _1325 step, the UE checks whether the SRS transmission scheduled in the subframe n is configured to serving cell_m. That is, the UE checks whether the subframe n is a subframe specified by srs-ConfigIndex of the serving cell_m. When the SRS transmission scheduled in the subframe n is the SRS transmission of the serving cell_m, the UE performs step _1340, and when the SRS transmission scheduled in the subframe n is the SRS transmission of the serving cell_s, the UE performs step _1330.

In step _1330, the UE does not perform the SRS transmission scheduled in the subframe n and waits until a next subframe to which the SRS transmission is configured comes.

In _1335 step, the UE checks whether the SRS transmission scheduled in the subframe n is the SRS transmission of the serving cell_s. That is, the UE checks whether the subframe n is a subframe specified by srs-ConfigIndex of the serving cell_s. When the SRS transmission scheduled in the subframe n is the SRS transmission of the serving cell_s, the UE performs step _1345, and when the SRS transmission scheduled in the subframe n is not the SRS transmission of the serving cell_s, the UE performs step _1330.

In step _1340, when the UE considers a situation by a subframe [n–5], if n is an active time, the UE performs step _1350, and if n is not the active time, the UE performs step 1330.

In step _1350, the UE performs the SRS transmission in the serving cell_m. In addition, the UE waits until a next subframe to which the SRS transmission is configured comes.

In step _1345, when the UE considers the situation by the subframe [n–5], if n is the active time, the UE performs step _1355, and if n is not the active time, the UE performs step _1330.

In step _1355, the UE performs the SRS transmission in the serving cell_s. In addition, the UE waits until a next subframe to which the SRS transmission is configured comes.

Figure 14:
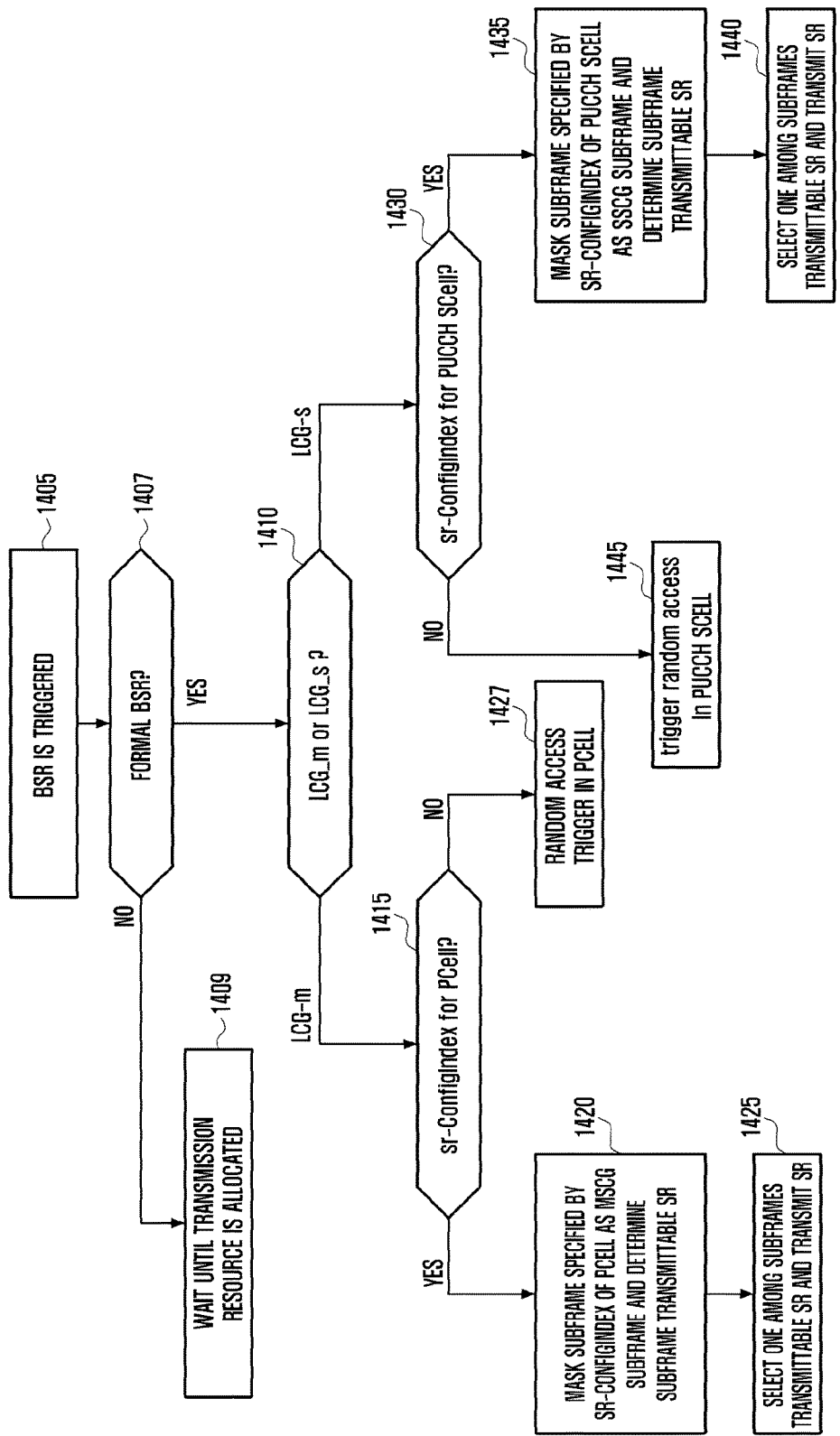
FIG. 14 is a view illustrating an operation of a UE transmitting an SR when a buffer status report is triggered.

FIG. 14 is a flowchart illustrating an operation sequence of the UE transmitting the Scheduling Request (SR) according to an embodiment of the present invention.

In step _1405, a Buffer Status Report (BSR) is triggered to the UE. The BSR is control information reporting a buffer status to the eNB, and one of two formats called a short BSR and a long BSR is selectively used. In the BSR, a Buffer Status (BS) for one to four Logical Channel Group (LCG) is reported.

The short BSR is used when an LCG in which transmitted data is included is one, and includes an LCG identifier and the BS. In the long BSR, the BS of four LCGs is reported, and the BSs of the LCG are stored in a sequence of an LCD identifier.

The LCG is a group of grouped logical channels by the control of the eNB, and the logical channels generally have a similar logical channel priority. The BS of the LCG is a sum of the BS related to the logical channels in the LCG, and indicates an amount of transmittable data among data of an RLC transmission buffer, an RLC retransmission buffer, a PDCP transmission buffer of the logical channels. The BSR is periodically triggered, or is triggered when a predetermined condition, for example, data of which priority is higher than that of currently stored data is generated. The former is referred to as a periodic BSR and the latter is referred to as a formal BSR.

In _1407 step, the UE checks whether the triggered BSR is the periodic BSR or the formal BSR. When the triggered BSR is the formal BSR, the UE performs step _1410, and when the triggered BSR is the periodic BSR, the UE performs step _1409.

In step _1409, the UE waits until transmission resources capable of transmitting the BSR are allocated.

Meanwhile, when the formal BSR is triggered, in step _1410, the UE starts a procedure for requesting a transmission resource allocation transmitting the BSR. This is because the formal BSR differently from the periodic BSR should be transmitted rapidly to the eNB.

In step _1410, the UE checks whether the data triggering the formal BSR, or data of which priority is the highest among transmittable data at a corresponding time is data included in an LCG_m or data included in an LCG_s. Alternatively, the UE checks whether the data triggering the formal BSR is data included in an LCH_m or data included in an LCH_s. When an LCH transmitted/received in the serving cell_s is referred to as an LCH_s and an LCH transmitted/received in the serving cell_m is referred to as an LCH_m, the LCG_m is a logical channel group formed of only the LCH_m and the LCG_s is a logical channel group formed of only the LCH_s. When the data triggering the formal BSR is in the LCH_m, step _1415 is performed, and when the data triggering the formal BSR is in the LCH_s, step _1430 is performed. Alternatively, when the data triggering the formal BSR is in the LCG_m, step _1415 is performed, and when the data triggering the formal BSR is in the LCG_s, step _1430 is performed.

In step _1415, the UE checks whether the SR is configured in the PUCCH transmission resource of the PCell. Alternatively, the UE checks whether sr-ConfigIndex is signalized for the PCell and sr-ConfigIndex is not released yet. When the SR is configured, step _1420 performed, and when the SR is not configured, step _1427 is performed.

In step _1420, the UE masks subframes specified by sr-ConfigIndex of the PCell as the MSCG subframe to determine subframes transmittable SR. In step 1425, the UE selects one among the identified subframes to transmit the SR. For example, the UE may select a subframe which is the closet to a corresponding time.

In step _1427, the UE triggers the random access in the PCell.

In addition, in step _1430, the UE checks whether the SR is configured in the PUCCH transmission resource of the PUCCH SCell. Alternatively, the UE checks whether sr-ConfigIndex is signalized for the PUCCH SCell and sr-ConfigIndex is not released yet. When the SR is configured, step _1435 performed, and when the SR is not configured, step _1445 is performed.

In step _1435, the UE masks subframes specified by sr-ConfigIndex of the PUCCH SCell as the SSCG subframe to determine subframes transmittable SR. In step _1440, the UE selects one among the identified subframes to transmit the SR. For example, the UE may select a subframe which is the closet to a corresponding time. In step _1445, the UE triggers the random access in the PUCCH SCell.

Figure 15:
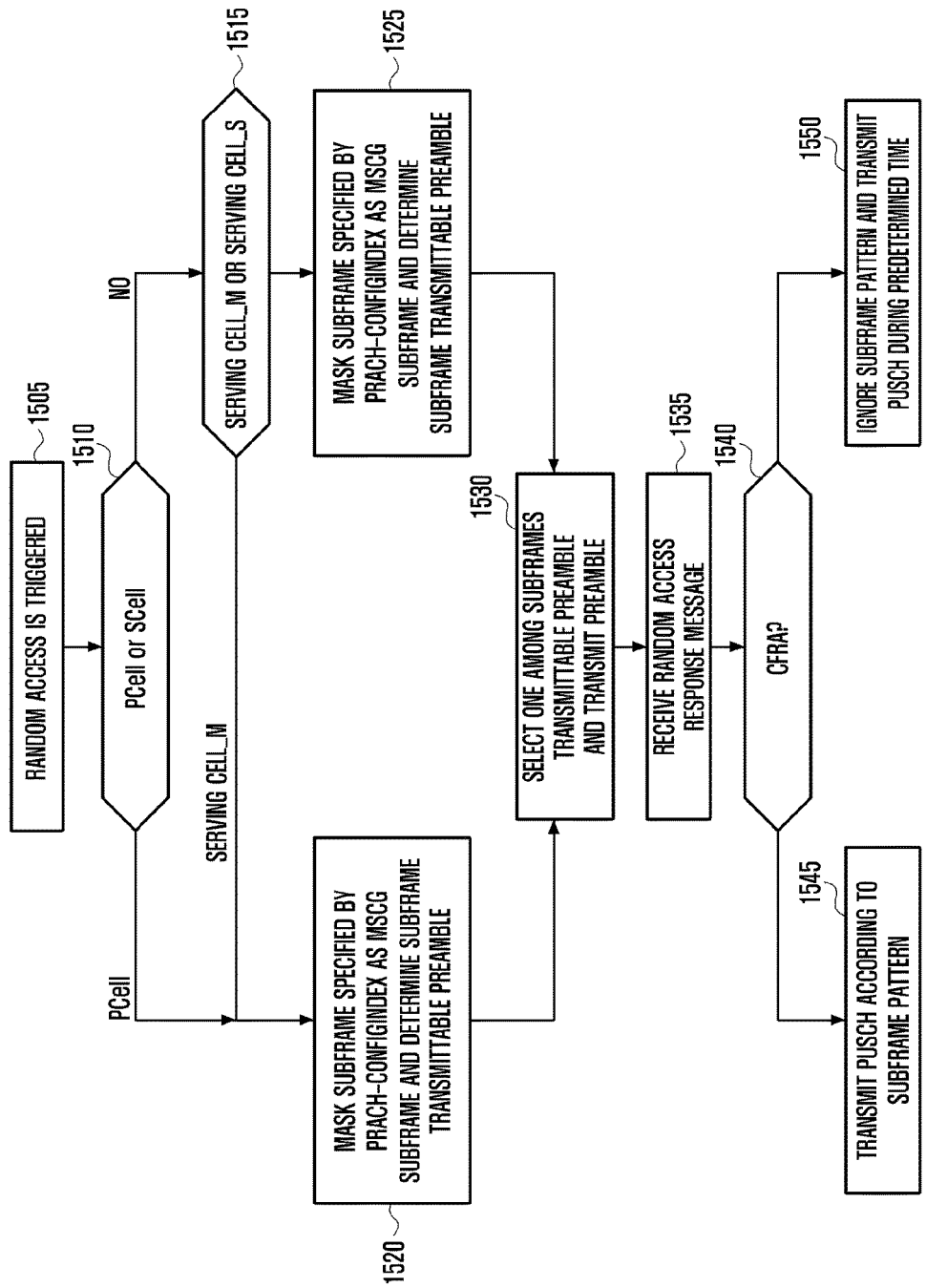
FIG. 15 is a view illustrating an operation of a UE performing a random access.

FIG. 15 is a flowchart illustrating an operation sequence of the UE performing a random access process according to an embodiment of the present invention.

In step _1505, the random access is triggered to the UE. The random access may be triggered in various reasons. For example, there are a triggered case in a target cell in the case of the handover, a triggered case by an indication of the eNB, a triggered case to transmit the BSR, and the like.

In step _1510, the UE checks whether the random access is triggered in the PCell or the SCell. When the random access is triggered in the PCell, step _1520 is performed, and when the random access is triggered in the SCell, the step _1515 is performed.

In step _1515, the UE checks whether the SCell in which the random access is triggered is the serving cell_m or the serving cell_s. When the SCell is the serving cell_m, step _1520 is performed, and when the SCell is the serving cell_s, step _1525 is performed.

In summary of step _1510 and step _1515, when the random access is triggered, if the random access is triggered in the PCell or the SCell of the MSCG, the UE performs step _1520, and if the random access is triggered in the SCell of the SSCG, the UE performs step _1525.

The case in which the random access is triggered in the PCell may include, for example, a case wherein the random access is triggered by the handover, a case wherein the eNB directs the random access in the PCell, a case wherein the formal BSR is triggered by the LCH_m data of the UE to which the PUCCH SR is not configured, a case wherein the RRC connection reconfiguration process is triggered, a case wherein the PUCCH SR transmission of the PCell fails, and the like.

The case wherein the random access is triggered in the SCell of the MSCG may include, for example, a case wherein the eNB directs the random access in a corresponding SCell. The case wherein the random access is triggered in the SCell of the SSCG may include, for example, a case wherein the eNB directs the random access in a corresponding SCell, a case wherein the formal BSR is triggered by the LCH_s data, and the like.

In step _1520, the UE masks a subframe specified by prach-ConfigIndex of a corresponding serving cell, that is the PCell or the SCell of the MSCG as the MSCG subframe. That is, the UE determines that subframes which are subframes specified by prach-ConfigIndex and the MSCG subframes as the transmittable subframe. As described above, prach-ConfigIndex of the PCell is obtained through an SIB2 of the PCell, and prach-ConfigIndex of the SCell of the MSCG is obtained through a predetermined exclusive RRC control message.

In step _1525, the UE masks a subframe specified by prach-ConfigIndex of a corresponding serving cell, that is the SCell of the SSCG as the SSCG subframe. That is, the UE determines that subframes which are subframes specified by prach-ConfigIndex and the SSCG subframes as the transmittable subframe. The prach-ConfigIndex of the SCell of the SSCG is obtained through a predetermined exclusive RRC control message.

In step _1530, the UE selects one among subframes in which the preamble transmission is possible and transmits the preamble. For example, the UE may select the closest subframe among the subframes. The UE transmits the preamble until the UE receives an effective random response message according to a predetermined rule.

In step _1535, the UE receives a random access response message. In the random access response message, uplink transmission resource allocation information (e.g., an uplink grant and an UL grant), transmission output control command information (e.g., a Transmission Power Control (TPC)), uplink transmission time adjustment information (e.g., Timing Advance (TA)), and the like are stored. When the UE receives an effective random access response message, the UE adjusts a transmission power according to the transmission output control command, and adjusts the backward transmission timing according to the TA.

In step _1540, the UE determines whether the random access is a Contention Free Random Access (CFRA) or a contention random access.

Here, the CFRA means a random access in which a preamble (e.g., an exclusive preamble and a dedicated preamble) directed by the eNB is used. When the eNB receives the preamble, the eNB identifies the UE transmitting the preamble.

In contrast, the contention random access means a random access in which a preamble (e.g., a random preamble) selected by the UE is used. The eNB cannot identify the UE transmitting the preamble using only the reception of the preamble, and Msg 3 transmission/reception through a contention solution process is necessary. When the random access is a contention free based random access, in allocating the UL grant in the random access response message by the eNB, the eNB allocates the UL grant such that the UL grant corresponds to the subframe pattern. That is, the random access is the CFRA in the PCell or the CFRA in the SCell of the MSCG, the UL grant is allocated such that the PUSCH transmission triggered by the UL grant is performed in the MSCG subframe.

When the random access is the CFRA in the SCell of the SSCG, the UL grant is allocated such that the PUSCH transmission triggered by the UL grant is performed in the SSCG subframe. Therefore, in step _1545, the UE performs the PUSCH transmission for the UL grant according to the subframe pattern. When the random access is the contention based random access, the UE performs step _1550.

The UE ignores the subframe pattern during a predetermined time, for example, until the PUSCH transmission triggered by the UL grant of the random access response message is completed. After the predetermined time is elapsed, the UE restarts a subframe pattern application. In addition, when the backward transmissions of the SSCG and the MSCG are conflicted while the UE ignores the subframe pattern, the UE performs the PUSCH transmission triggered by the UL grant of the RAR, and gives up another backward transmission.

For example, when the UE performs the contention random access in the PCell, the UE performs the PUSCH transmission in the subframe although the PUSCH transmission triggered by the UL grant of the random access response message should be performed in the SSCG subframe or the switching subframe. In addition, when the PUSCH transmission is conflicted with the backward transmission of the SSCG, the UE performs the PUSCH transmission and gives up another backward transmission of the SSCG.

Figure 16:
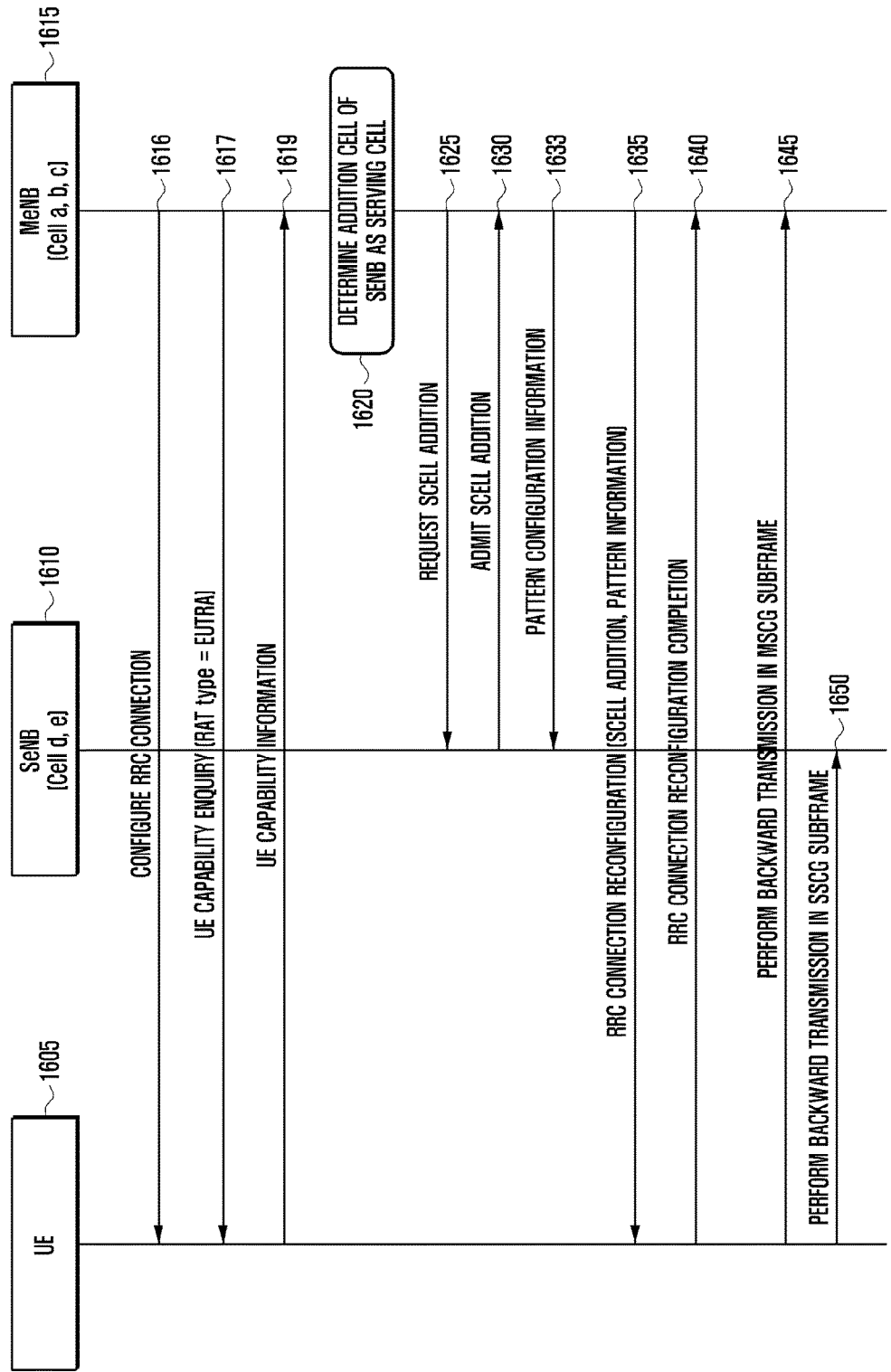
FIG. 16 is a flowchart illustrating operations of a UE and an eNB, in which the UE reports a capability and the eNB configures an inter-eNB CA.

FIG. 16 is a flowchart illustrating an operation sequence of the UE and the eNB, in which the UE reports a UE capability to the eNB and the eNB configures an inter-eNB CA, according to an embodiment of the present invention.

First, the UE configures an RRC connection with the MeNB in a mobile communication system including the UE _1605, the SeNB _1610 and the MeNB _1615 (_1616).

After the RRC connection process is completed, the MeNB transmits a control message called a UE capability enquiry to the UE so as to obtain capability information of the UE (_1617). The message directs the report of the capability to the UE, may request capability information for a specific Radio Access Technology (RAT) of the UE using a parameter referred to as an RAT type.

When the UE performs the process in the LTE network, the RAT-type is configured as an Evolved Universal Terrestrial Radio Access (EUTRA). If there is another wireless network, for example, UMTS network on the periphery, the eNB may add the UTRA to the RAT-type to request UMTS related capability information of the UE, in order to prepare a later handover and the like.

When the UE receives the UE capability enquiry control message, the UE generates the UE capability information storing capability information of the UE for a wireless technology directed in the RAT type to transmit the UE capability information to the eNB (_1619). According to an embodiment of the present invention, in the control message, at least one piece of band combination information may be stored according to each band combination supported by the UE. The band combination information is information indicating a CA combination supported by the UE. The eNB may configure a proper CA to the UE using the information.

As described above, in the capability information of the UE, information (i.e., SupportedBandCombination (SBC) _1705) on a band combination supported by the UE is included. The SBC includes at least one band combination parameter (i.e., BandCombinationParameters (BCP) _1710, _1715, _1720 and _1725). The BCP is information on each band combination supported by the UE.

The BCP includes at least one band parameter (i.e., BandParameters (BP)).

The BP includes information (i.e., FreqBandIndicator) indicating a band, a forward band parameter (i.e., BandParametersDL (BPDL) and a backward band parameter (i.e., BandParametersUL (BPUL).

The BPDL and the BPUL again includes a bandwidth layer class indicating the number of the serving cells supported in a corresponding band, and antenna capability information. The bandwidth class A indicates a capability capable of configuring one serving cell of which a whole bandwidth is a maximum of 20 MHz. The bandwidth class B indicates a capability capable of configuring two serving cells and a sum of a whole bandwidth is a maximum of 20 MHz. The bandwidth class C indicates a capability capable of configuring two serving cells and a sum of a whole bandwidth is a maximum of 40 MHz.

In order to support the inter-eNB CA, the UE should perform the following functions.

A function of configuring and managing two or more serving cell groups
A function of transmitting the PUCCH in at least one cell by serving cell group
A function of transmitting/receiving data according to each serving cell group It may be different whether the multiple SCGs are supported or not according to each band combination. When the multiple SCGs are supported, the number of the supported SCGs, and the like may be different according to each band combination. In addition, it may be different whether a TDM pattern is necessary, whether the switching subframe is necessary, and the like. When it is considered that there are multiple band combinations in one UE, it is inefficient to report all pieces of information of the UEs for all band combinations.

In an embodiment of the present invention, in reporting the capability of the inter-eNB CA by the UE, first, it may be indicated whether the UE supports the inter-eNB CA, only in the case in which the UE supports the inter-eNB CA, the UE may report a detailed capability according to each band combination.

The UE shows the following information using 1 bit or information _1735 coded in another method of ASN.1.

The inter-eNB CA is supported or not in at least one band combination among the band combinations supported by the UE;
Two or more serving cell groups are supported or not in at least one band combination among the band combinations supported by the UE;
The PUCCH may be transmitted or not in two or more serving cells in at least one band combination among the band combinations supported by the UE.

Hereinafter, for the convenience of description, 'supporting the inter-eNB CA', 'supporting two or more serving cell groups' and 'transmitting the PUCCH in two or more serving cells' may have a similar meaning and may be mixed.

When multipleSCGcapability _1735 is yes, or when the UE supports the inter-eNB CA, one 1 bit information (i.e., multipleSCGsupported) _1740 to _1760 is included in each band combination or each BCP. The 1 bit information may indicate yes or no, and may indicate whether a corresponding multipleSCGsupport exists. The multipleSCGsupported is information indicating whether the inter-eNB CA is supported or at least two serving cell group are supported in a corresponding band combination, and the like. Specifically, the multipleSCGsupported have the following meaning.

Figure 17:
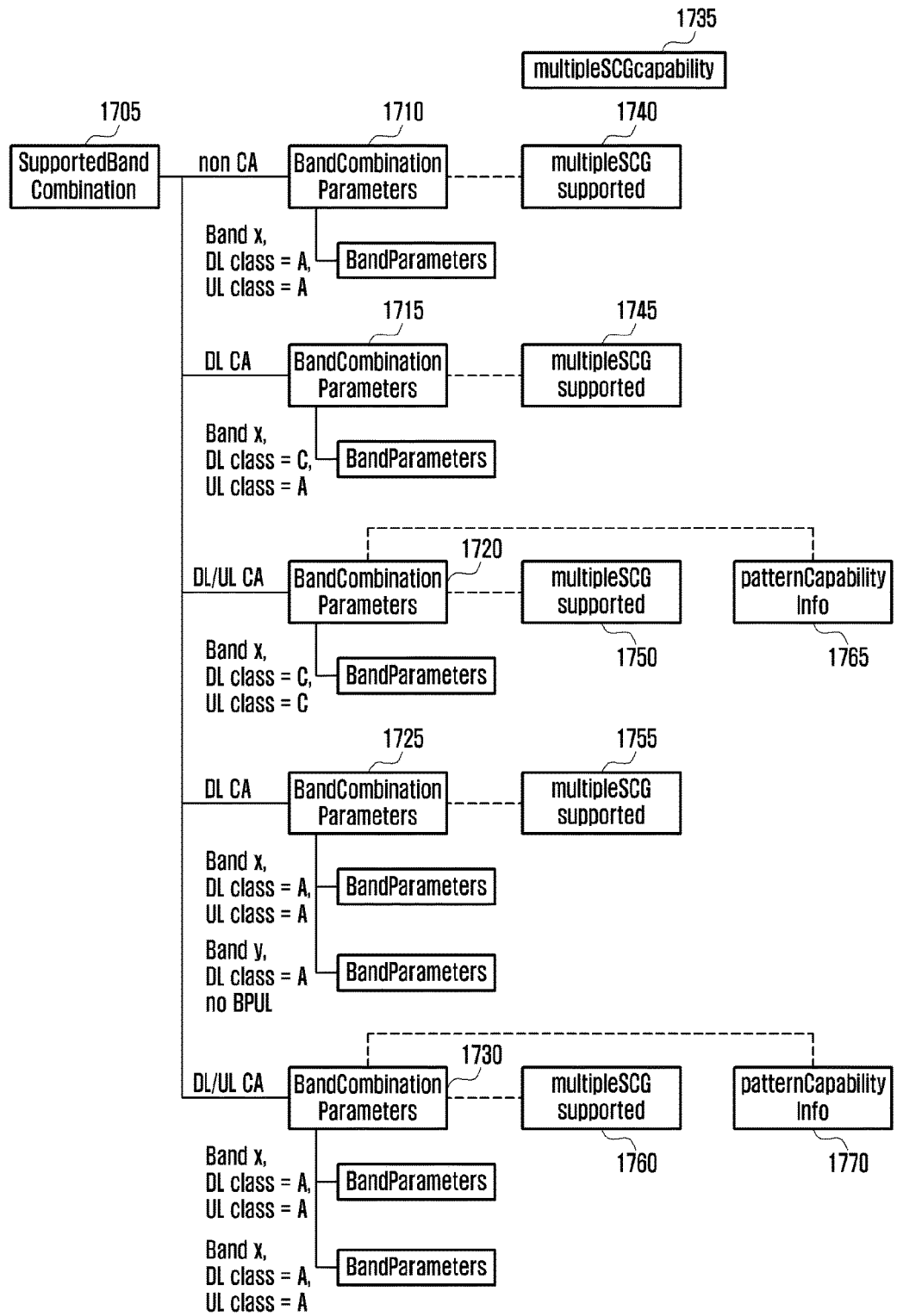
FIG. 17 is a view illustrating a configuration of capability report information of a UE.
Figure 18:
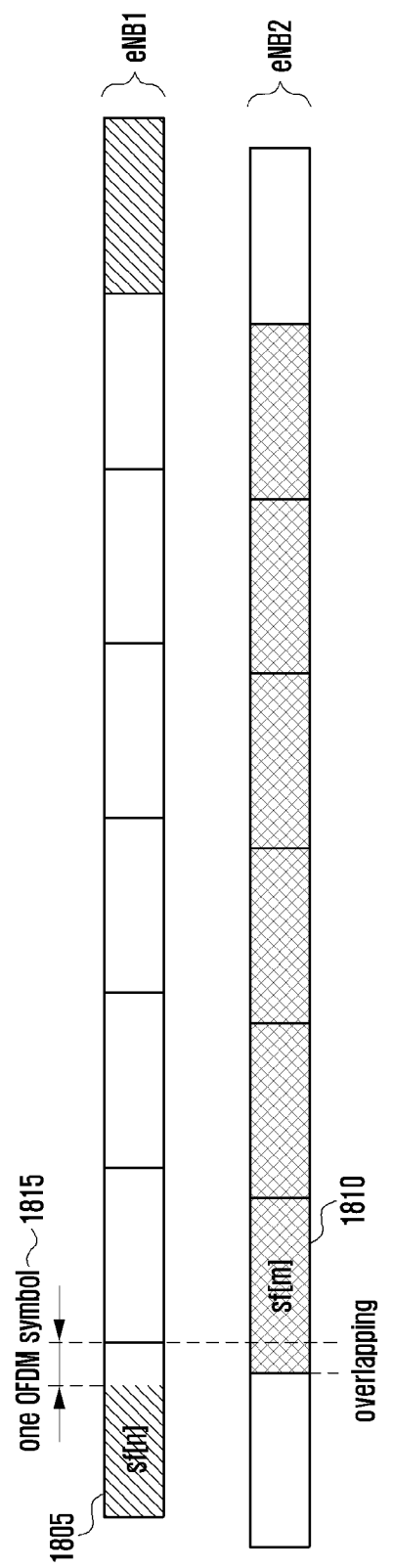
FIG. 18 is a view illustrating a case wherein an MSCG subframe and an SSCG subframe are overlapped.

When the corresponding band combination includes one band parameter (that is, includes one band entry), and two or more serving cells are included backwardly for the band combination (i.e., when a backward bandwidth class is not A, or when the backward bandwidth class is B, C or more), if the multipleSCGsupported is yes, the multipleSCGsupported means that inter-eNB CA is supported for the serving cell of the corresponding band entry. That is, the multipleSCGsupported means that the serving cells may include two or more serving cell groups in the band, and the PUCCH may be configured in the serving cells (or means that the serving cells may be the PCell or the PUCCH SCell). In FIG. 17, a band combination of which the band entry is one includes _1710, _1715 and _1720. _1710 is a non-CA to which all of the forward serving cell and the backward serving cell are configured one by one, and _1715 the forward CA in which two serving cells are configured in forward direction. Thus, _1715 and _1720 do not correspond, and only _1720 corresponds. That is, when the multipleSCGsupported _1750 is yes or the multipleSCGsupported exists, two serving cells may be configured in a band x, the serving cells may be configured as individual serving cell groups, and the PUCCH may be configured in all serving cells.

When the corresponding band combination includes one band parameter (that is, includes one band entry), and only one serving cell is included backwardly for the band combination, (i.e., the backward bandwidth class is A), the UE unrelated to a value indicated by the multipleSCGsupported does not support the inter-eNB CA for the band combination. For example, in band combinations _1710 and _1715, the inter-eNB CA is not supported regardless of the value indicated by _1740 and _1745.

When the corresponding band combination includes two or more band parameters, and a BPUL is included in two or more band entries (that is, a backward direction is configured in two or more band entries, or a backward direction may be configured in two or more serving cells), if the multipleSCGsupported is yes, the UE may support the inter-eNB CA for the band combination, may configure component carriers (or serving cells) in the same band as one serving cell group, may configure the PUCCH in one component carrier among the component carriers, and may configure at least one cell as the PCell or the PUCCH SCell according to each band entry. _1730 corresponds to here. _1760 illustrates whether one serving cell group may be configured in a band x, another serving cell group may be configured in a band y, and the serving cells may be configured as the PCell or the PUCCH SCell.

When the corresponding band combination includes two or more band parameters (i.e., includes two or more band entries), and the BPUL is included in only one band entry (i.e., a backward direction is configured in only one band entry), the UE does not support the inter-eNB CA for the band combination regardless of the value indicated by the multipleSCGsupported. For example, in the band combination _1725, the inter-eNB CA is not supported regardless of the value indicated by _1755.

The UE reports pattern capability information for the band combination satisfying a predetermined condition together. The pattern capability information _1765 and _1770 includes the following three types of lower information.

Uplink TDM necessity indication information
Downlink TDM necessity indication information
Switching subframe necessity indication information All lower information may exist, some of the lower information may exist, and the existed lower information is determined implicitly. When the uplink TDM is not necessary, since the downlink TDM is not necessary and the switching subframe is also not necessary, the downlink TDM necessity indication information and the switching subframe necessity indication information are omitted. This is referred to as pattern capability information 1 (i.e., patternCapabilityinfo1).

When the uplink TDM is necessary, all of the downlink TDM necessity indication information and the switching subframe necessity indication information are necessary. When the uplink TDM is necessary, the UE applies two Tx devices (2Rx/2Tx B) for the corresponding band combination, or applies one Tx device. When the two Tx devices are applied, since a time required in an RF reconfiguration is extremely short, the UE reports that the switching subframe is not necessary. When one Tx device is applied, since the time required in the RF reconfiguration is considerable, the UE reports that the switching subframe is necessary. When one Rx device is applied to the corresponding SBC, the UE reports that the downlink TDM is necessary. Thus, when the UE reports that the uplink TDM is necessary, the downlink TDM necessity indication information and the switching subframe necessity indication information should be reported together. Information including all of the uplink TDM necessity indication information, the downlink TDM necessity indication information and the switching subframe necessity indication information is referred to as pattern capability information 2 (i.e., patternCapabilityinfo2).

The UE reports patternCapabilityinfo1 or patternCapabilityinfo2 with respect to the band combination satisfying the following condition.

A band combination in which the band entry is one and the backward bandwidth class is B or more (i.e., a band combination in which the backward bandwidth class is not A)

A band combination in which the number of the band entries (or backwardly configured band entries) including the BPUL are two or more The band combination _1720 and the band combination _1730 correspond to here, and patternCapabilityinfo _1765 and _1770 are stored, respectively. The UE may not store the patternCapabilityinfo in the band combination which does not satisfying the condition, or may store patternCapabilityinfo1 (i.e., patternCapabilityInfo indicating that the uplink TDM is not necessary) in the band combination which does not satisfying the condition.

The UE stores the information in a control message called UE capability information and transmits the information to the eNB. When multipleSCGcapability _1735 is stored in the message, multipleSCGsupported information _1740 to _1760 are sequentially stored equally to the band combination for the all band combinations, and patternCapabilityinfo _1765 and _1770 are stored for a band combination satisfying a predetermined condition. When the multipleSCGcapbility is not stored, multipleSCGsupported and patternCapabilityinfo are also not stored.

Referring to FIG. 16 again, when the eNB receives the UE capability information storing the information, the eNB may determine whether the eNB configures the CA to the UE based on the capability information. When the eNB determines that the eNB configures the CA to the UE, the eNB may determine whether the eNB configures the inter-eNB CA, whether the eNB configures the CA in the eNB, and the like.

Step _1620, step _1625, step _1630, step _1633, step _1635 and step _1640 of FIG. 16 may correspond to step _820, step _825, step _830, step _833, step _835 and step _840 of FIG. 8.

In step _1645 and step _1650, the UE performs the backward transmission for the serving cells controlled by the MeNB in the MSCG subframe and performs the backward transmission for the serving cells controlled by the SeNB in the SSCG subframe.

As described above, when the UE operates an individual TX device in a corresponding band combination or in a corresponding CA configuration, and thus an extremely short switching time is required, the UE may use a pattern having a small number of switching subframe pattern or a pattern in which a switching subframe is not included. In this case, some of the MSCG subframe and some of the SSCG subframe may be overlapped. For example, when an eNB 1 is the MeNB and an eNB 2 is the SeNB, the MSCG subframe 1805 and the SSCG subframe _1810 overlap. In this case, the UE performs a puncturing of a last section of a subframe _1805 which is prior by a time of a predetermined duration, for example, one symbol duration _1815 (e.g., one OFDM symbol duration) to perform the backward transmission. The reason of the puncturing by one symbol duration is that a format of a puncturing by one symbol duration among PUSCH transmission formats is previously defined in a standard.

When the UE fails the random access, according to the prior art, the UE ends the random access process and does not perform an additional operation. Generally, since an object of the random access is to transfer important information to the eNB, it is preferable to continuously perform the random access process before an RRC layer definitely directs an end of the random access process. However, when the random access has already failed, a preamble transmission output may already be considerably high because of a power lamping applied to the preamble, and the continuous random preamble transmission may cause considerable uplink interference to a peripheral cell.

In the present invention, the random access failure is classified as a first failure and a second failure. Although the random access failed first, the UE maintains the preamble transmission. At this time, the uplink interference is maintained in a proper level after the first failure of the random access, by adjusting a preamble transmission frequency before and after the first failure of the random access. In the present invention, the first failure of the random access is referred to as the case in which the random access is not succeeded although the UE transmits the random access preamble by a predetermined number. The second failure of the random access is referred to as the case in which the random access cannot be succeeded until a higher layer directs a stop of the random access.

Figure 22:
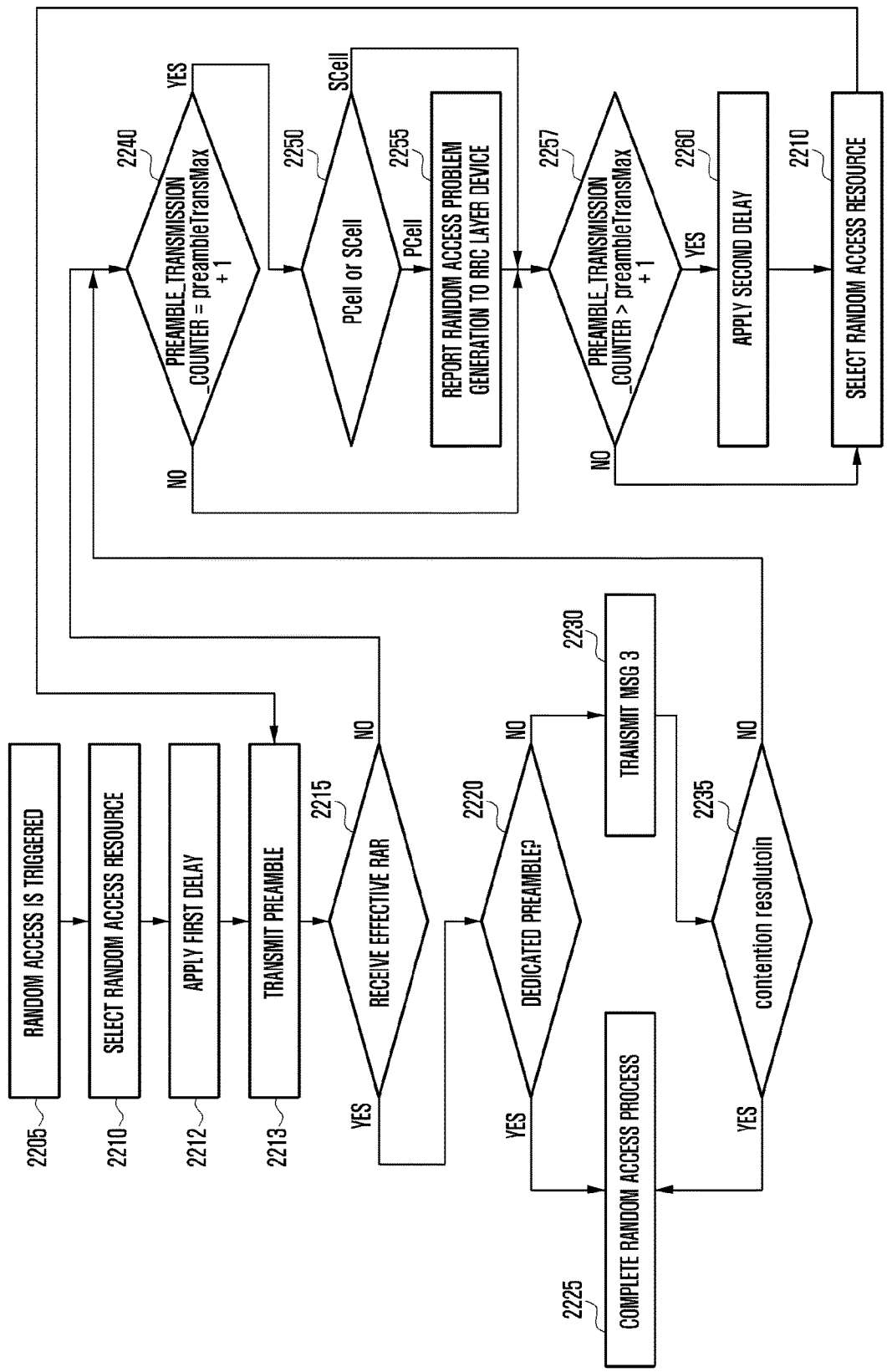
FIG. 22 is a view illustrating an operation of a UE according to an embodiment of the present specification when a random access is failed.
Figure 23:
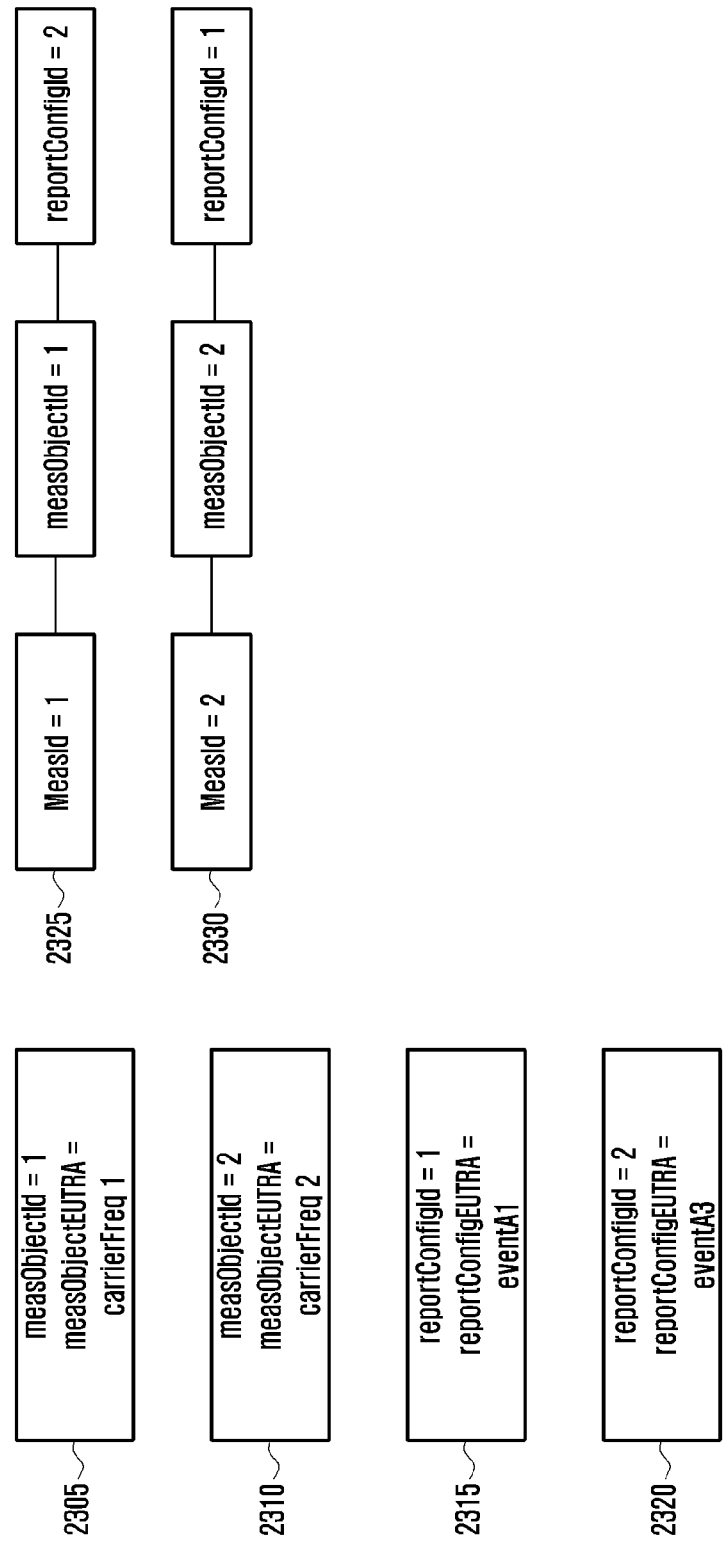
FIG. 23 is a view illustrating an example of a measurement configuration.

FIG. 22 illustrates a UE operation.

In step _2205, a random access is triggered by a random reason. The random access may be triggered by various reasons, and may be triggered in the PCell or the SCell.

In step _2210, the UE selects a random access resource. The random access resource referred to as an access preamble, a PRACH resource to which a preamble is transmitted, and a subframe to which the PRACH resource is configured. The eNB may specify the random access resource to the UE. When the eNB allocates a preamble index which is not 0 and a PRACH mask, the UE selects a preamble (i.e., a dedicated preamble) specified the preamble index using the PRACH resource of the subframe specified by the PRACH mask. When the eNB does not allocate the preamble index or a preamble index which is 0, the UE selects a preamble (i.e., a random preamble) to be transmitted by oneself by applying a predetermined rule. The rule for selecting the preamble index, the PRACH mask index and the random preamble, and the like are disclosed in the rule 36.321.

In step _2212, after the UE waits during a first delay and performs step _2213. The first delay is a delay related to a PRACH configuration of a serving cell in which the random access is performed, and is a maximum value rather than a fixed value. More specifically, the first delay is defined as a distance on a time between a time when the random access preamble is selected and the closet subframe transmittable the random access preamble. Different first delays may be applied to the PCell and the SCell.

In step _2213, the UE transmits the preamble. In step _2215, the UE checks whether an effective RAR is received. More specifically, the UE determines whether an RAR satisfying a predetermined condition is received in a predetermined serving cell during ra-Window. More specifically, when an RAR addressed as a predetermined RA-RNTI is received during the ra-Window and a preamble identifier specifying the preamble transmitted by the UE is included in the RAR, the UE determines that the effective RAR is received and performs step _2220. When the condition is not satisfied, the UE performs step _2240. The predetermined serving cell in which the UE attempts to receive the RAR may be different according to a type of the serving cell in which a preamble is transmitted. When the preamble is transmitted in the PCell, the predetermined serving cell is the PCell. When the preamble is transmitted in the SCell and the SCell is an SCell of a master serving cell group, the predetermined serving cell is the PCell. When the preamble is transmitted in the SCell and the SCell is an SCell of a slave serving cell group, the serving cell is the SCell in which the preamble is transmitted.

In step _2220, the UE checks whether the dedicated preamble is transmitted or the random preamble is transmitted. When the dedicated preamble is transmitted, in step _2225, the UE determines that the random access process is completed and ends the process. In step _2230, the UE transmits a message 3 according to the UL grant in the RAR. The message 3 is uplink data transmitted from the UE to the eNB for a contention resolution, and information, for example C-RNTI MAC CE, capable of identifying the UE is included in the message 3. The UE determines the serving cell in which the message 3 is transmitted in consideration of the serving cell in which the preamble is transmitted rather than the serving cell in which the RAR is received. For example, although the RAR is received in the PCell, when the preamble is transmitted in the SCell, the message 3 is also transmitted in the SCell.

In step _2235, the UE checks whether the contention is resolved. The resolution of the contention means that the UE receives a downlink signal satisfying a predetermined condition before a predetermined time called mac-ContentionResolutionTimer is expired. The downlink signal may include, for example, a predetermined RRC control message, a UL grant addressed as C-RNTI, or a DL assignment. The process of the contention resolution is disclosed in the rule 36.321.

If the contention is resolved, in step _2225, the UE determines that the random access process is successfully completed and ends the process.

If the contention resolution fails, the UE performs step _2240.

In step _2240, the UE checks whether PREAMBLE_TRANSMISSION_COUNTER is the same as a value obtained by adding 1 to preambleTransMax. The PREAMBLE_TRANSMISSION_COUNTER is a variable which is initialized as 0 when the random access process is triggered and then is increased by 1 whenever the preamble is transmitted. The process is for determining whether a random access problem generation is reported to a higher layer device. The preambleTransMax is a value signalized from the eNB to the UE. When the random access process is triggered in the PCell, preambleTransMax obtained through system information of the PCell is applied. When the random access process is triggered in the SCell, preambleTransMax notified through the dedicated RRC control message from the eNB is applied. When the condition is not satisfied, the UE performs step _2257. When the condition is satisfied, the UE performs _2250. In step _2250, the UE checks whether the serving cell in which the preamble is transmitted is the PCell or the SCell. When the serving cell is the PCell, step _2255 is performed, and when the serving cell is the SCell, step _2257 is performed. In step _2255, the UE reports that the random access problem is generated to the RRC layer device. The RRC layer device may reset an MAC layer device such that the UE may stop the random access according to a situation.

In step _2257, the UE checks whether the PREAMBLE_TRANSMISSION_COUNTER is larger than the value obtained by adding 1 to the preambleTransMax such that the UE determines whether a first failure is generated. When the PREAMBLE_TRANSMISSION_COUNTER is larger than the value obtained by adding 1 to the preambleTransMax, the UE performs step _2260, and when the PREAMBLE_TRANSMISSION_COUNTER is not larger than the value obtained by adding 1 to the preambleTransMax, the UE is returned to step _2210. After the UE waits during a second delay to adjust a preamble transmission period in step _2260, the UE selects the random access resource in step _2210. The second delay is a value larger than that of the first delay, and may be differently configured according to a type of the serving cell. In the PCell, since a probability in which more important information is transmitted through the random access is high, a comparatively short value, for example about 100 ms may be applied to the second delay. In contrast, in the SCell, since an important RRC control message is not transmitted through the random access, a larger value such as about several hundred ms may be used as the second delay. Alternatively, the second delay may be configured as an infinite value in the SCell so as to stop the preamble transmission after a first failure of the random access in the SCell.

As described above, before a predetermined condition is satisfied, that is, when the PREAMBLE_TRANSMISSION_COUNTER is equal to or lower than the value obtained by adding 1 to the preambleTransMax, the UE applies a first period to the preamble transmission/retransmission. When the PREAMBLE_TRANSMISSION_COUNTER is larger than the value obtained by adding 1 to the preambleTransMax, the UE applies a second period to the preamble transmission/retransmission. The first period is determined by the first delay, and the second period is determined by a sum of the second delay and the first delay. The first delay and the second delay may be differently configured in the PCell and the SCell, the first delay may be defined as a maximum value rather than a fixed value, and the second delay may be defined as a fixed value.

Meanwhile, for a mobility support of the UE, the UE continuously measures a channel status of the serving cell and the peripheral cell, compares a measurement result, and reports the measurement result to the eNB when the predetermined condition is satisfied. The eNB configures a measurement to the UE using a predetermined RRC control message according to a need. The measurement configuration includes a measurement object (i.e., measObject), a report configuration (i.e., reportConfig), a measurement indicator (i.e., measurement ID or measId), and the like.

The measurement object is a frequency in which the UE performs the measurement, and the eNB may configure at least one measurement object to the UE. An identifier is given to each measurement object. The report configuration is related to a measurement report trigger, and is largely divided into an event triggered report method and a periodic report method. For example, the event triggered report method may be subdivided into the following six types of report events.

A1: The measurement result of the serving cell is equal to or larger than a predetermined reference A2: The measurement result of the serving cell is equal to or smaller than a predetermined reference A3: The measurement result of the peripheral cell is better than the measurement result of the PCell by a predetermined offset or more A4: The measurement result of the peripheral cell is equal to or larger than a predetermined reference A5: The measurement result of the PCell is equal to or smaller than a reference 1 and the measurement result of the peripheral cell is equal to or larger than a reference 2

A6: The measurement result of the peripheral cell is better than the measurement result of the SCell by an offset or more Multiple measurements may be configured in the UE, and one measurement includes the MeasId, the measObjectId and the reportConfigId. For example, two measurement objects specified as measObjectId 1 _2305 and measObjectId 2 _2310 are configured in a random UE, and the measObjectId 1 _2305 and measObjectId 2 _2310 indicate a center frequency 1 and a center frequency 2, respectively. In addition, two report configurations specified reportConfigId 1 _2315 and reportConfigId 2 _2320 exist, and the reportConfigId 1 _2305 and reportConfigId 2 _2320 indicate events 1 and 3, respectively. The eNB configures specific measurements using the measurement object configuration information and the report configuration information. That is, when the MeasId 1 _2325 is related to the measObjectId 1 and the reportConfigId 2, if the MeaseId 1 satisfies the event A3 for the center frequency 2, the MeaseId 1 means a measurement reporting the measurement result.

The UE and the eNB may configure various measurements by variously relating the measurement object to the report configuration. The contents related to the measurement are disclosed in the rule 36.331 in more detail.

The UE may compare the measurement result of the serving cell with a predetermined reference (e.g., A1 and A2), may compare the measurement result of the peripheral cell with a predetermined reference (e.g., A4), or may compare the measurement result of the serving cell with the measurement result of the peripheral cell (e.g., A3 and A5) to determine whether the UE triggers the measurement report message. When the SCell is configured in the UE, it should be definitely defined whether the SCell is handled as the serving cell or the peripheral cell. The present invention provides a method and an apparatus in which the SCell is not fixed as the serving cell or the peripheral cell and is handled as the serving cell and the peripheral cell according to an occasion.

Figure 24:
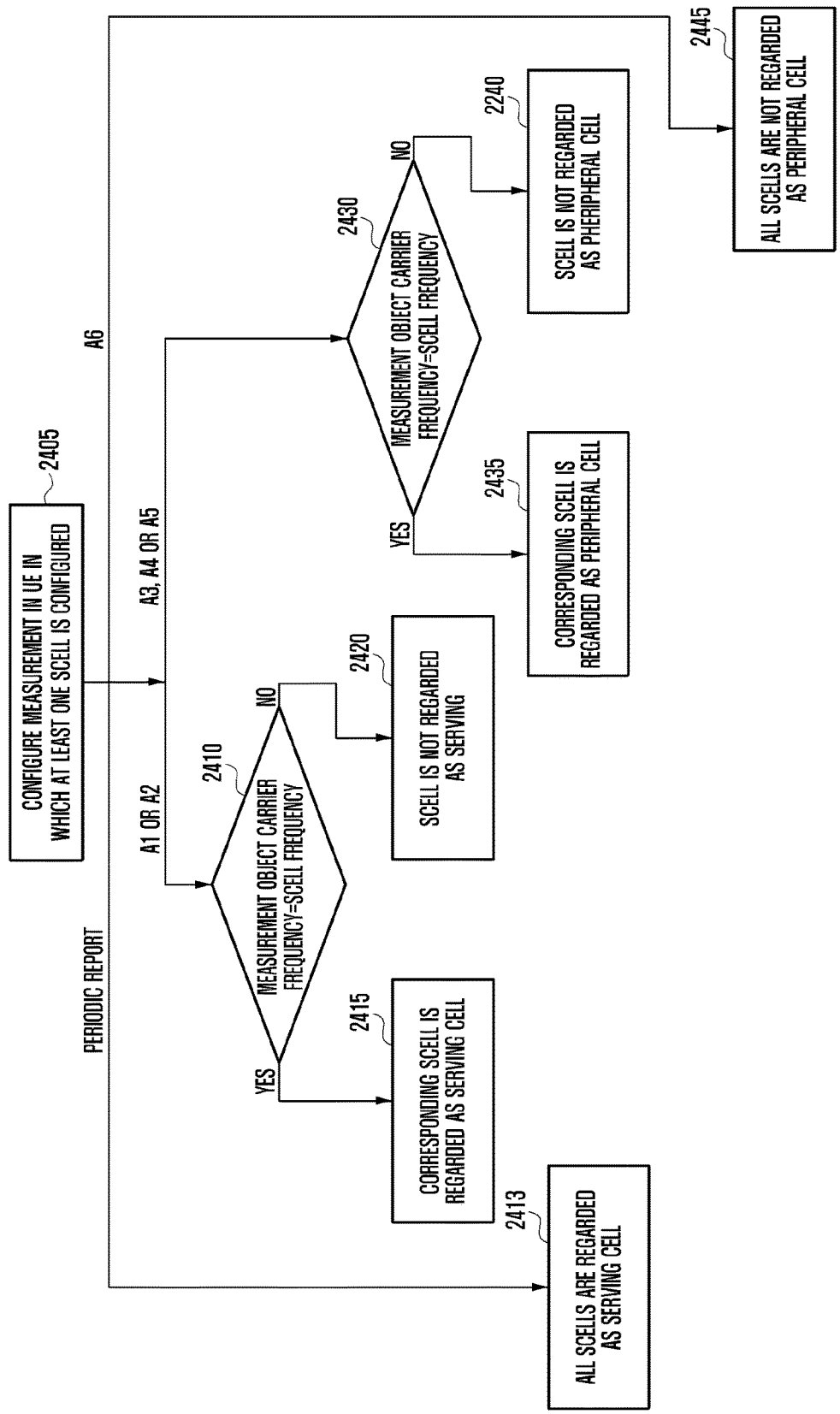
FIG. 24 is a view illustrating an operation of a UE handling an SCell as a serving cell or a peripheral cell according to a measurement report configuration.

FIG. 24 illustrates a UE operation.

In step _2405, a random measurement is configured in the UE, and one or more SCells are configured in the UE. The configuration of the measurement means a configuration of MeasId related to the measObjectId and reportConfigId. The UE checks the reportConfig of the measurement so as to determine whether the SCell is handled as the serving cell or the peripheral cell in the measurement. When the reportConfig is related to the periodic report, step _2413 is performed. When the reportConfig is A1 or A2, step _2410 is performed. When the reportConfig is A3, A4 or A5, step _2430 is performed. When the reportConfig is A6, step _2445 is performed.

When the periodic report is configured, the UE handles all SCells configured in the UE as the serving cell (2413). The UE includes measurement results for all configured SCells in the measurement result report (i.e., measResult) which is periodically triggered.

When A1 or A2 is configured, the UE performs step _2410. In step _2410, the UE checks whether the SCell having a center frequency (or a carrier frequency) the same as that of the measurement object related to the measurement is configured. For example, when the measurement object is f1, the UE checks whether the SCell of which the center frequency is f1 exists. When there is the SCell satisfying the condition, in step _2415, the corresponding SCell is considered as the serving cell. When the measurement result of the SCell is maintained as a status that is better than a predetermined reference value for a predetermined period or more (i.e., in the case of A1), or is maintained as a status that is worse than a predetermined reference value for a predetermined period or more (i.e., in the case of A2), the UE triggers the measurement result report including the measurement result of the SCell and reports the measurement result report to the eNB.

When there is not the SCell satisfying the condition, step _2420 is performed and thus the SCell is not handled as the serving cell. That is, the measurement result report based on the measurement result of the SCell is not triggered. However, when the measurement result report is triggered for another reason, the measurement result of the SCells is included in the measurement result report.

When A3, A4 or A5 is configured, the UE performs step _2430. In step _2430, the UE checks whether the SCell having a center frequency the same as that of the measurement object related to the measurement is configured. When the SCell satisfying the condition is configured, step _2435 is performed, and when the SCell satisfying the condition is not configured, step _2440 is performed. In step _2435, the UE handles the corresponding SCell as the peripheral cell. That is, when the measurement result of the corresponding SCell is maintained as a status that is better than the measurement result of the PCell by a predetermined offset for a predetermined period or more (i.e., in the case of A3), when the measurement result of the corresponding SCell is maintained as a status that is better than a predetermined reference value for a predetermined period of more (i.e., in the case of A4), when the measurement result of the PCell is equal to or lower than a predetermined reference and the measurement result of the corresponding SCell is maintained as a status that is equal to or more than another reference for a predetermined period or more (i.e., in the case of A5), the UE triggers the measurement result report including the measurement result of the SCell and reports the measurement result report to the eNB. When there is not the SCell satisfying the condition, step _2440 is performed and thus the SCell is not handled as the peripheral cell. That is, the measurement result report based on the measurement result of the SCell is not triggered. However, when the measurement result report is triggered for another reason, the measurement result of the SCells is included in the measurement result report.

When A6 is configured, in step _2445, the UE does not handle the all SCells as the peripheral cell. That is, the measurement result report based on the measurement result of the SCell is not triggered. However, when the measurement result report is triggered for another reason, the measurement result of the SCells is included in the measurement result report.

The handling or not of the SCell as the serving cell or the peripheral cell according to a type of an event as described above is for triggering or not triggering, the measurement result report by the SCell measurement result according to an object of the event configuration.

Meanwhile, a UE positioned in a cell change may undergo a backward transmission output shortage problem. A Transmission Time Interval (TTI) bundling function which repeatedly transmits (hereinafter, a bundle transmission) data through 4 TTIs may be configured in such a UE. In the existing carrier aggregation method, the TTI bundling function is not used in the UE in which multiple serving cells are configured. This is because the carrier aggregation is recognized as a usable technology in a case in which the backward transmission output is enough. However, in the inter-eNB carrier aggregation, the UE positioned in the cell change performs a normal operation with a small cell and applies the TTI bundling in a macro cell, and thus communication efficiency may be increased.

When the cell in which the TTI bundling is configured is the PCell, the UE may start the random access process while performing the TTI bundling operation. The UE transmits a message 3 in the random access process. When the transmission of the message 3 and a new TTI bundling transmission are overlapped on a time axis, the UE processes the new transmission prior to the retransmission according to a general rule. That is, the UE gives up the retransmission of the message 3 and starts the new transmission.

However, when a reason why the UE performs the random access is considered, such an operation of the UE is not preferable. The UE may transmit a buffer status report to the eNB through the message 3 of the random access process. When the UE gives up the transmission of the message 3, the buffer status report message is leaked, and thus a scheduling may be negatively influenced.

The present invention provides a method of determining a prior transmission in consideration of types of conflicted transmissions when a new transmission and a retransmission are conflicted on a time.

Figure 25:
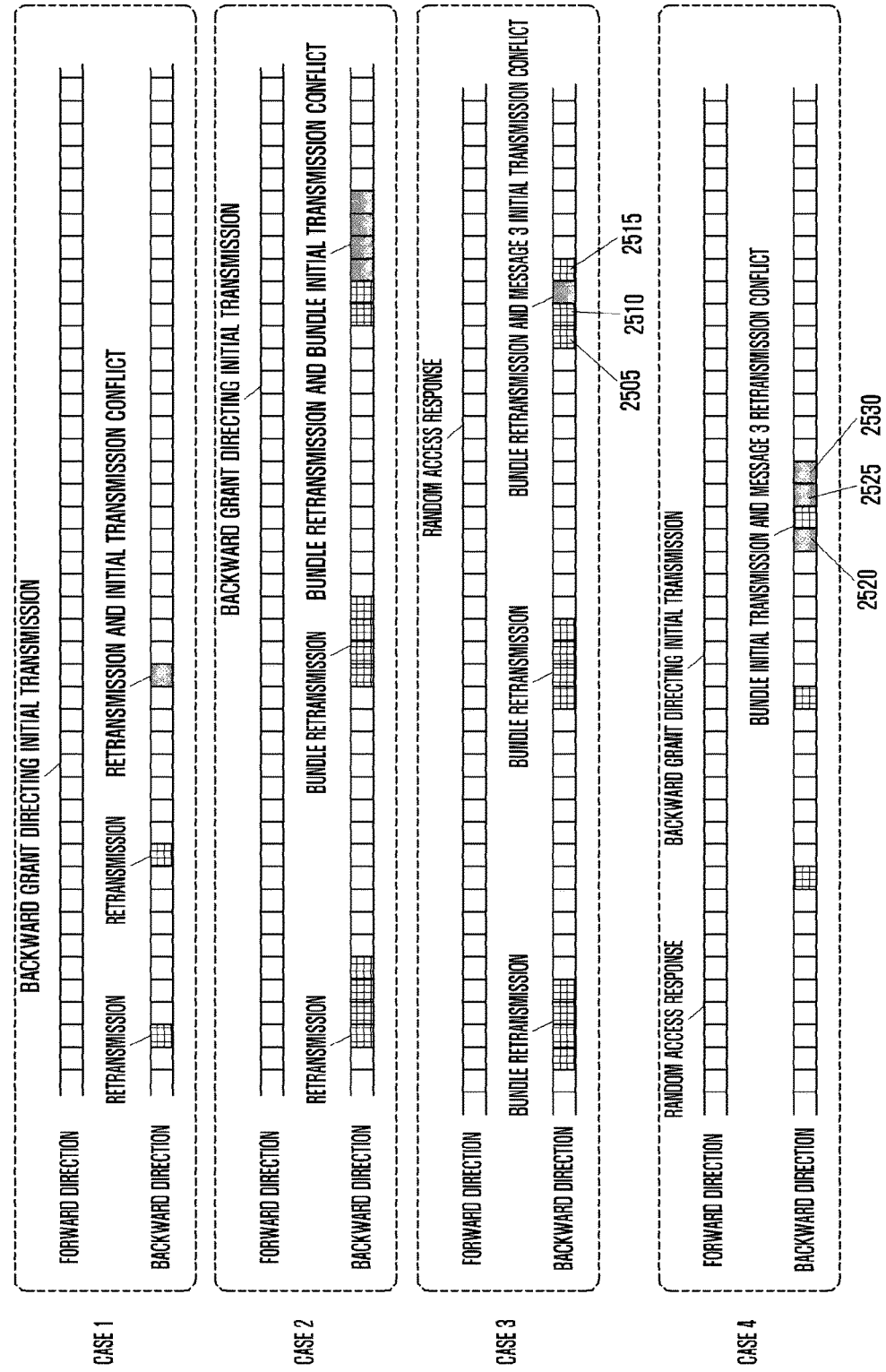
FIG. 25 is a view illustrating a case wherein an initial transmission and a retransmission are conflicted on a time axis.

The case in which the new transmission and the retransmission are conflicted may include various cases. For example, there are a case (e.g., a case 1 of FIG. 25) wherein a new transmission is directed in an HARQ process in which a current retransmission is progressing, a case (e.g., a case 2 of FIG. 25) wherein a bundle initial transmission overlapped a bundle retransmission that is currently progressing on a time axis is directed, a case (e.g., a case 3 of FIG. 25) wherein an Msg 3 transmission overlapped a bundle retransmission that is currently progressing on a time axis is directed, a case (e.g., a case 4 of FIG. 25) wherein a bundle initial transmission overlapped an Msg 3 that is currently progressing on a time axis is directed, and the like. In the present invention, the UE determines a transmission that is previously performed in consideration of the initial transmission, whether the bundle of the retransmission is transmitted or not, whether there is the message 3 or not, and the like.

Figure 26:
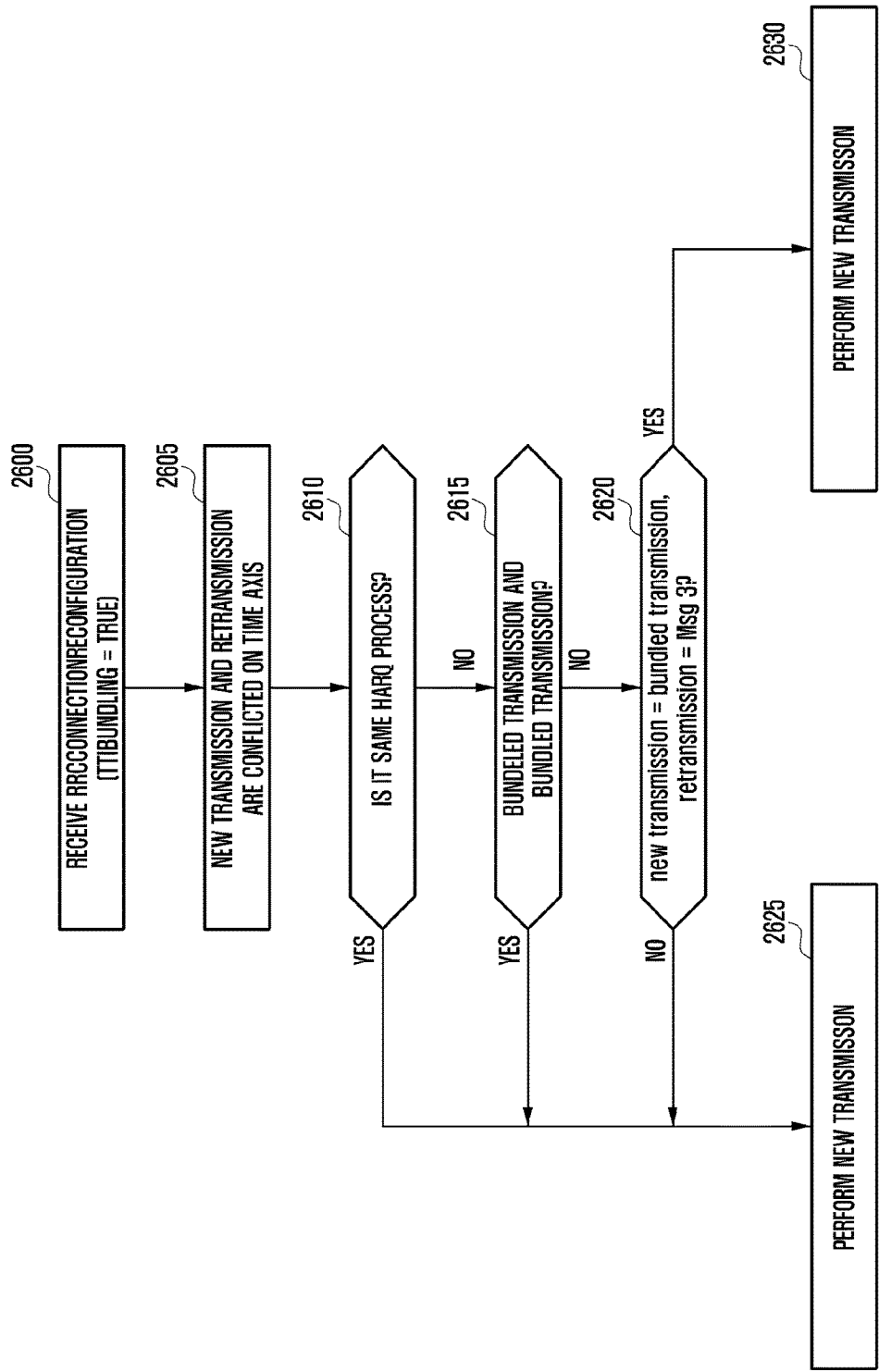
FIG. 26 is a view illustrating a UE operation when the initial transmission and the retransmission are conflicted on a time axis.

FIG. 26 illustrates an operation of the UE. FIG. 26 is a flowchart illustrating an operation sequence of the UE performing the TTI bundling operation.

In step _2600, the TTI bundling is configured in the UE. More specifically, when the UE receives an RRC connection reconfiguration (i.e., RRCConnectionReconfiguration) message in which the TTIbundling is configured as true, the UE applies a bundle transmission to the backward grant received through the PDCCH until the TTI bundling is released, that is until the UE receives RRCConnectionReconfiguration message in which the TTIbundling is configured as false.

In step _2605, the UE recognizes that an initial transmission and a retransmission are conflicted on a time axis in a close future. For example, an initial transmission is directed in a subframe of which a retransmission is already scheduled, and the like correspond to this.

In step _2610, the UE checks whether the conflict is generated in the same HARQ process.

For example, the case wherein the initial transmission is directed in the HARQ process of which a retransmission is currently being progressed, as the case 1 corresponds to here. The case 1 is an example for a non bundling transmission, but the same occasion may be generated in the bundling transmission. When the conflict is the conflict generated in the same process, the UE performs step _2625. When the conflict is not the conflict generated in the same process, the UE performs step _2615. In step _2615, the UE checks whether the conflict is generated by the bundle initial transmission and the bundle retransmission.

For example, the case wherein the bundle initial transmission is directed in a subframe of which some overlaps a subframe of which a retransmission is progressed, as the case 2 corresponds to here. When a normal TTI bundling is configured, the eNB performs a scheduling so as not to generate the above situation. However, for example, when the currently progressed retransmission is caused by noise (e.g., misunderstanding of the UE in which the transmission is directed due to remain an error of a CRC although the eNB does not direct the transmission), the situation may be generated. In this case, it is preferable to follow the rule in which the initial transmission is prior to the retransmission, and the UE performs step _2625. When the conflict is not the conflict between the bundles, the remaining case is a conflict between the bundle transmission and the message 3. It is because the bundle transmission is always applied by a normal backward grant when the TTI bundling is applied to the UE as described above. In step _2620, the UE checks whether the initial transmission is the bundle transmission and the retransmission is the message 3 transmission (or whether a re-transmitted MAC PDU is obtained from a message 3 buffer). When the initial transmission is the bundle transmission and the retransmission is the message 3 transmission (or whether a re-transmitted MAC PDU is obtained from a message 3 buffer), step _2630 is performed, otherwise, that is, when the new transmission is the message 3 transmission and the retransmission is the bundle transmission, step _2625 is performed. In step _2625, the UE performs the new transmission. If the new transmission is the message 3 transmission and the retransmission is the bundle transmission, since remaining subframes _2505, _2510 and _2515 except for the subframe in which the message 3 initial transmission is performed do not overlap the message 3 initial transmission, the bundle transmission may still be performed. However, the bundle transmission is not performed in the subframe overlapping the message 3, although remaining bundle transmission is performed, a probability in which the transmission is finally succeeded is rare. Thus, in order to reduce battery consumption, the UE does not perform the bundle transmission in the remaining subframe, and discards data of the HARQ process (i.e., stops the current bundle transmission of the HARQ process). Alternatively, the UE may not perform a transmission in subframes _2510 and _2515 before and after the message 3 transmission and may perform a transmission in a remaining subframe _2505. In step _2630, the UE previously performs the message 3 retransmission. In remaining subframes _2520, _2525 and _2530 which are not overlapped the message 3 transmission, in order to reduce battery consumption of the UE, the bundle transmission is not performed and the data of the HARQ process is discarded. Alternatively, the UE may do not perform a transmission in subframes _2520 and _2525 before and after the message 3 transmission and may perform a transmission in a remaining subframe _2530.

In step _2615, the initial transmission may not be previously performed and a transmission that is already progressing may be previously performed. That is, in step _2615, when the bundle transmission and the bundle transmission are conflicted, step _2630 may be performed. This is because a possibility wherein the transmission that is already progressing is generated by noise is higher than a possibility wherein a subsequent transmission is generated by noise, stochastically, since the eNB performs the scheduling so as not to generate the conflict between the bundle transmissions, when once the TTI bundling is configured as described above. For example, when the transmission that is already progressing is prior, if the initial grant noise is not generated by noise after the TTI bundling is configured, all grants generated subsequent noise may be filtered. In contrast, when the new transmission is prior, it is influenced by all noise grants generated after the TTI bundling is configured.

Another embodiment of the present invention provides a method of performing the random access in the PCell, PSCell or SCell by the UE.

The UE determines the serving cell in which the UE performs the random access according to an object of the random access.

TABLE 8

| Case | The serving cell in which the random access is performed |
| --- | --- |
| RRC connection configuration | PCell |
| Regular BSR trigger by data of MCG bearer | PCell |
| Regular BSR trigger by data of SCG bearer | PSCell |
| PDCCH order reception | Serving cell in which PDCCH order is received |
| Handover | PCell |
| SeNB/SCG additon or change | PSCell |
| Reconfiguration related to SeNB/SCG | PSCell |

As shown in Table 8, the random access in the serving not the PCell or the PSCell is started by only the PDCCH order.

When the regular BSR is triggered by the data of the SCG bearer, in order to transmit to the SeNB of the regular BSR, the UE triggers the random access in the PSCell.

The handover, SeNB/SCG addition/change, and the reconfiguration related to SeNB/SCG related are triggered by a reception of the RRC control message. In the case of the handover, a handover completion control message is generated through an uplink, the regular BSR due to the data of the MCG bearer is triggered by the control message, and thus the random access is triggered in the PCell.

In contrast, in the case of the SeNB/SCG addition/change or the configuration related to SeNB/SCG, a response RRC control message for this does not trigger the random access in the PSCell. Thus, control information directing a trigger of the random access in the PSCell is included in the related RRC control message. When the SeNB is added or changed, some of bearer configured in the UE is reconfigured to the SCG bearer, if transmittable uplink data is stored in the SCG bearer, the regular BSR by the SCG bearer may be triggered. Thus, when the PSCell random access by the RRC control message is already progressed, the RSCell random access by the regular BSR may be triggered. If the UE stops the random access that is currently progressing and starts the random access by the regular BSR, a completion of the SeNB addition/change may be delayed. Thus, when the PSCell random access by the RRC control message is already progressing, it is preferable to first complete the random access that is currently progressing.

Figure 28A:
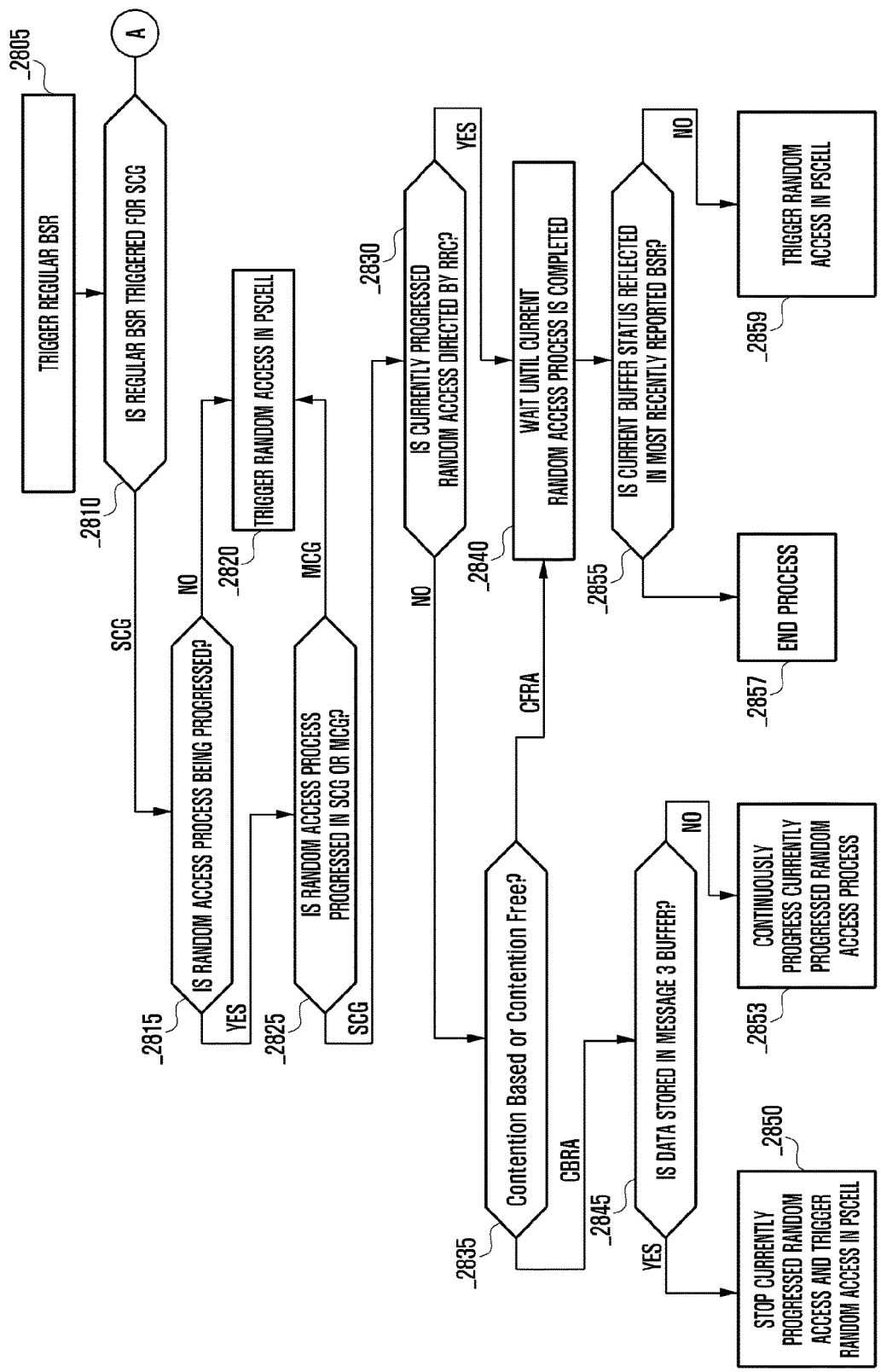
FIGS. 28A and 28B illustrate a UE operation when a regular BSR is triggered.
Figure 28B:
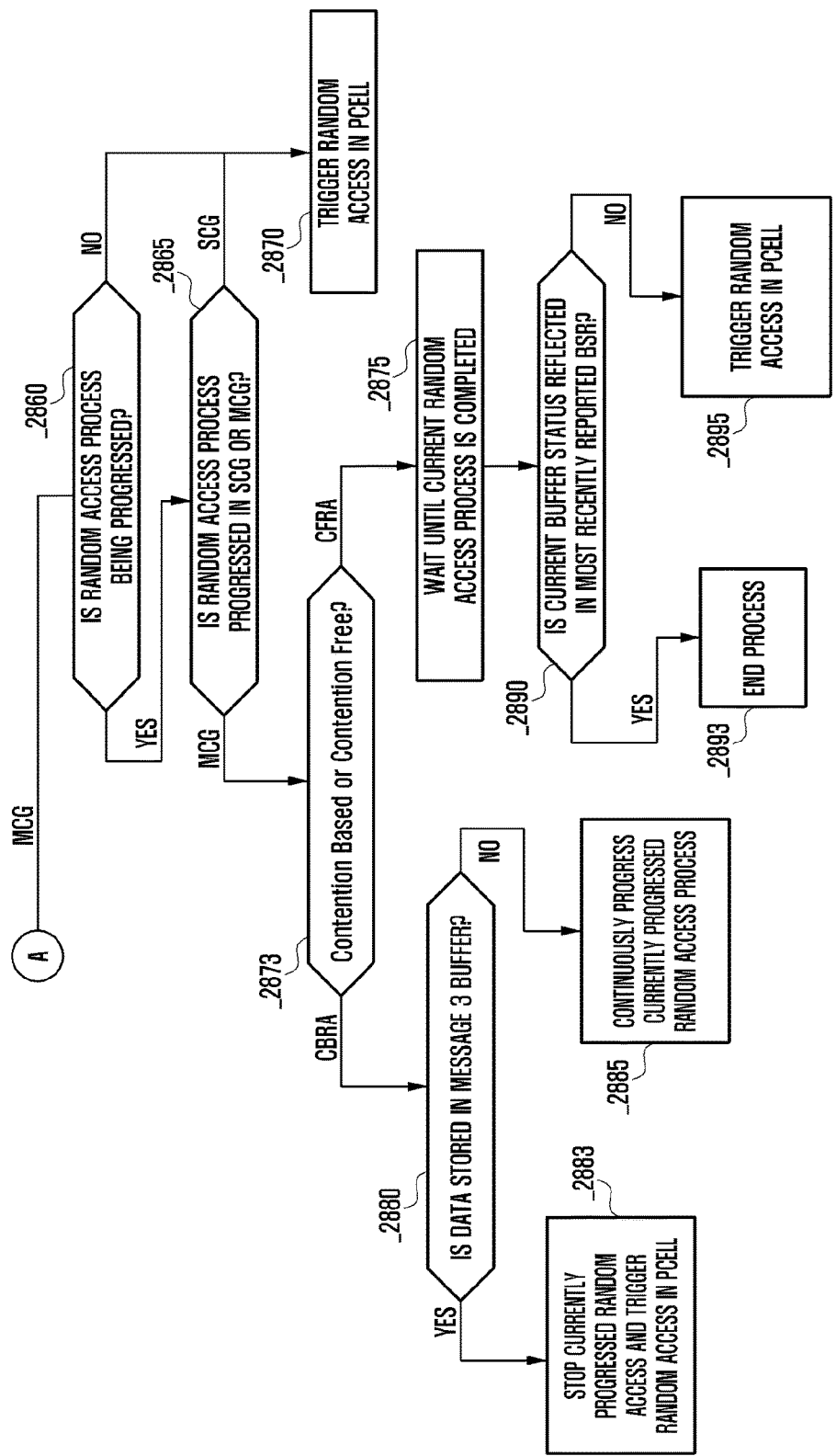

FIGS. 27, 28A and 28B illustrate the UE operations related to the above.

FIG. 27 illustrates an operation of the UE receiving the RRC control message.

In step _2705, the UE receives the RRC control message.

In step _2710, the UE checks whether the RRC control message is a message directing a handover. When the RRC control message is the message directing a handover, the UE performs step _2715, and when the RRC control message is not the message directing a handover, the UE performs step _2725.

The control message including MobilityControlInfo (refer to rule 36.331) is the control message directing the handover.

In step _2715, the UE generates a response message for the control message. The response message is the RRC control message. Since the RRC control message has the highest priority and is always transmitted or received through the MCG, the regular BSR for the MCG is triggered by the response control message. The regular BSR for the MCG means a regular BSR triggered by data to be transmitted through the MCG, a regular BSR triggered by an MAC device configured for the MCG, a regular BSR triggered for the MeNB, or a regular BSR triggered by the LCG_m.

In step _2720, in order to transmit the regular BSR, after the UE performs the handover and triggers the random access in the PCell. That is, the UE starts processes such as transmitting the random preamble in a predetermined time/frequency resource of the PCell and receiving the random access response message through the downlink of the PCell.

In step _2725, the UE checks whether the following predetermined information is included in the RRC control message.

Control information initially configuring SeNB: information on the eNB, for example, MAC configuration information to be used for the SeNB, and the like are included here.
  Control information initially adding the SCG serving cell: control information configuring at least one SCG SCell to a UE in which the SCG serving cell is not configured, information on configured SCell, information indicating that the SCell is included in the SCG, and the like correspond here.
  Control information directing a change of the SeNB: information directing a release of all existing SCG serving cells and a configuration of new SCG serving cells corresponds here.
  Information directing a random access start may be, for example, 1 bit information.

When the predetermined information is included in the RRC control message, step _2730 is performed, and when the predetermined information is not included in the RRC control message, step _2740 is performed.

In step _2730, the UE triggers the random access in a predetermined cell among the SCG serving cells, that is, the PSCell. That is, the UE starts processes such as transmitting the random preamble in a predetermined time/frequency resource of the PSCell and receiving the random access response message through the downlink of the PSCell.

When the regular BSR is triggered while the random access process is performed, the UE controls such that a new random access by the regular BSR for the SCG is not triggered. That is, when the random access of which the start is directed by the RRC is progressing in the PSCell, the random access trigger by the regular BSR for the SCG is ignored until the random access process is completed (_2735).

The regular BSR for the SCG means a regular BSR triggered by data to be transmitted through the SCG, a regular BSR triggered by an MAC device configured for the SCG, a regular BSR triggered for the SeNB, or a regular BSR triggered by the LCG_s.

In step _2740, the UE triggers the regular BSR for the MCG. If the SR transmission resource is not allocated in the PUCCH of the PCell, the UE triggers the random access in the PCell.

FIGS. 28A and 28B illustrate a UE operation when the regular BSR is triggered.

In step _2805, a regular BSR is triggered.

In step _2810, the UE checks whether the regular BSR is a BSR for the SCG and a BSR for the MCG. When the regular BSR is the BSR for the SCG, step _2815 is performed, and when the regular BSR is the BSR for the MCG, step _2860 is performed.

In step _2815, the UE checks whether there is a random access process that is currently progressing. When there is the random access process that is currently progressing, the UE performs step _2825, and when there is not the random access process that is currently progressing, the UE performs step _2820.

In step _2820, the UE triggers the random access in the PSCell.

In step _2825, the UE checks whether the random access is progressing in the SCG serving cell or the MCG serving cell. When the random access is progressing in the SCG serving cell, step _2830 is performed, and when random access is being progressed in the MCG serving cell, step _2820 is performed, to trigger the random access in the PSCell.

In step _2830, the UE checks whether the random access that is currently progressing is directed by the RRC control message. That is, the UE checks whether the random access that is currently progressing is directed by predetermined control information (e.g., 1 bit information directing a random access start) included in the received RRC control message. When the random access that is currently progressing is directed by the RRC control message, step _2840 is performed, and when the random access that is currently progressing is not directed by the RRC control message (e.g., when the random access that is currently progressing is started by the PDCCH order or triggered by another regular BSR), step _2835 is performed.

In step _2840, the UE continuously performs the random access process started by the RRC control message. When the random access process that is being performed is completed, the UE performs step _2855.

In step _2855, the UE checks whether a BSR (e.g., a BSR reported in the random access process) which is reported in the most recent time reflects a current buffer status. The triggering of the regular BSR means that new data of which a priority is high is generated. The random access process that is progressing at a time when the regular BSR is triggered also includes BSR information. Therefore, when the BSR transmitted in the random access process includes information on data triggering the regular BSR, since it is not necessary to newly trigger a random access, step _2857 is performed so as not to trigger the random access any more and to end the process. In contrast, when the information on data causing the regular BSR trigger is not included in the BSR transmitted in the random access process, step _2859 is performed to trigger a new random access in the PSCell. Alternatively, a regular BSR for the SCG may be newly triggered.

In step _2835, the UE checks whether the random access that is currently progressing is a Contention Based Random Access (CBRA) or a Contention Free Random Access (CFRA). In the case of the CBRA, step _2845 is performed, and in the case of the CFRA, step _2840 is performed. The random access triggered by the regular BSR is always the CBRA. When the random access that is currently progressing is the CFRA, in order to previously perform the random access by the CFRA, step _2840 is performed.

In step _2845, the UE checks whether data is stored in the message 3 buffer. When the data is stored in the message 3 buffer, step _2850 is performed, and when the data is not stored in the message 3 buffer, step _2853 is performed. The storing of the data in the message 3 buffer means that a BSR reflecting contents triggering the regular BSR cannot be transmitted in the random access process because a configuration of an MAC PDU to be transmitted using uplink transmission resources allocated in the random access response. In contrast, an absence of the data in the message 3 buffer means that the MAC PDU to be transmitted in the random access process is not configured yet, and means that the contents of the BSR to be stored in the MAC PDU may be corrected so as to reflect the most recent buffer status.

In order to transmit the BSR reflecting an accurate buffer status, in step _2850, the UE stops the random access that is currently progressing and newly starts a random access in the PSCell.

In step _2853, the UE continuously progresses the random access process that is currently progressing. In addition, the UE stores the BSR reflecting the most recent buffer status in the MAC PDU to be transmitted through the random access process, and transmits the BSR.

In step _2860, the UE checks whether there is a random access process that is currently progressing. When there is the random access process that is currently progressing, the UE performs step _2865, and when there is not the random access process that is currently progressing, the UE performs step _2870.

In step _2870, the UE triggers the random access in the PCell.

In step _2865, the UE checks whether the random access is progressing in the SCG serving cell or the MCG serving cell. When the random access is progressing in the SCG serving cell, step _2870 is performed, and when random access is progressing in the MCG serving cell, step _2873 is performed.

In step _2873, the UE checks whether the random access that is currently progressing is a Contention Based Random Access (CBRA) or a Contention Free Random Access (CFRA). In the case of the CBRA, step _2880 is performed, and in the case of the CFRA, step _2875 is performed.

In step _2880, the UE checks whether data is stored in the message 3 buffer. When the data is stored in the message 3 buffer, step _2883 is performed, and when the data is not stored in the message 3 buffer, step _2885 is performed.

In step _2883, the UE stops the random access that is currently progressing and newly starts a random access in the PCell.

In step _2885, the UE continuously progresses the random access process that is currently progressing. In addition, the UE stores the BSR reflecting the most recent buffer status in the MAC PDU to be transmitted through the random access process, and transmits the BSR.

In step _2875, the UE continuously progresses the CFRA process that is currently progressing, and when the random access process is completed, the UE performs step _2890.

In step _2890, the UE checks whether a BSR (i.e., a BSR reported in the random access process) which is reported in the most recent time reflects a current buffer status. When the BSR which is reported in the most recent time reflects the current buffer status, in step _2893, the UE does not trigger the random access any more and ends the process. When the BSR which is reported in the most recent time does not reflect the current buffer status, in step _2895, the UE triggers a new random access in the PCell. Alternatively, a regular BSR for the MCG may be newly triggered.

The UE triggers the random access by oneself or the random access is triggered according to a direction of the eNB.

The eNB uses a layer 1 control signal or a layer 3 control message in order to trigger the random access in a predetermined serving cell.

Figure 29:
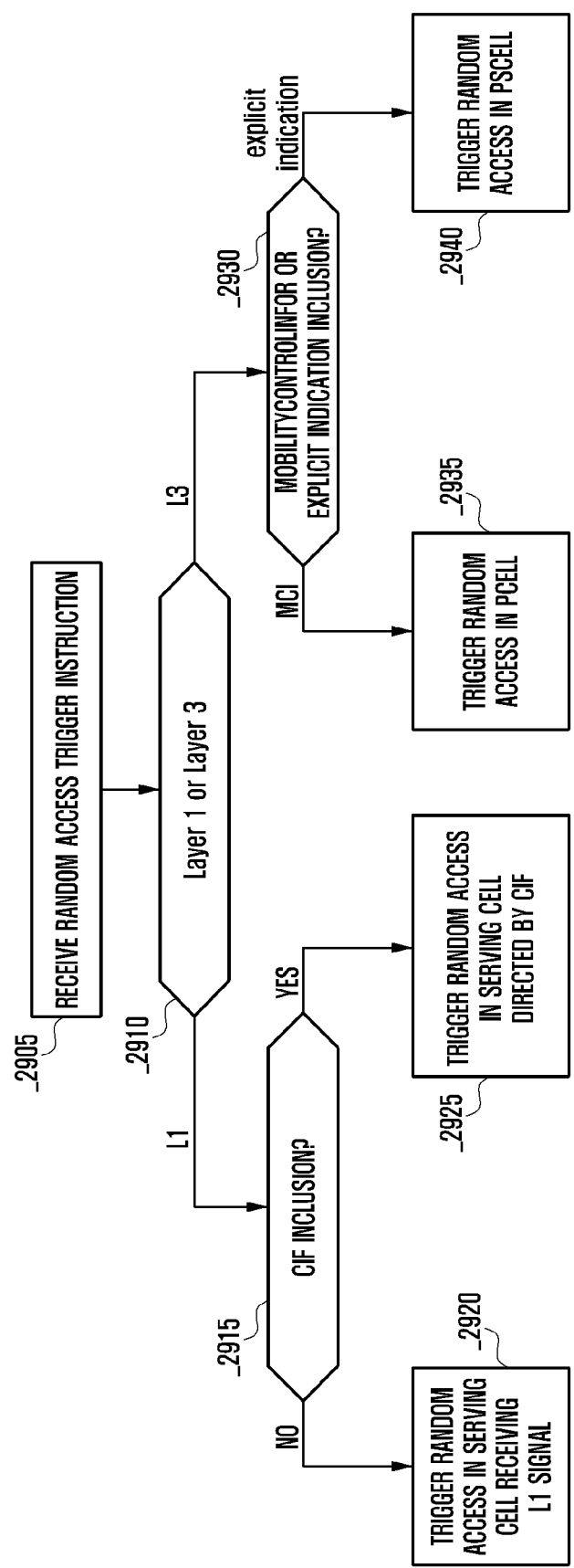
FIG. 29 illustrates an operation of a UE determining a cell triggering a random access according to a direction of an eNB.

FIG. 29 illustrates an operation of the UE determining the cell in which the random access is triggered according to the direction of the eNB.

In step _2905, the random access is triggered by the downlink signal transmitted from the eNB. Alternatively, the random access may be triggered by the direction of the eNB.

In step _2910, the UE checks whether the downlink signal triggering the random access is the layer 1 signal such as the PDCCH order or the layer 3 signal such as the RRC control message.

In step _2915, the UE checks whether a Carrier Indicator Field (CIF, refer to the rule 36.331) field is included in the layer 1 signal. When the CIF field is included in the layer 1 signal, step _2925 is performed, and when the CIF field is not included in the layer 1 signal, step _2920 is performed.

In step _2920, the UE triggers the random access in the serving cell in which the layer 1 signal is received. The UE transmits the random access preamble through the uplink of the serving cell in which the layer 1 signal is received. When the serving cell is the serving cell of the MCG, the UE receives the random access response message through the PCell. When the serving cell is the serving cell of the SCG, the UE receives the random access response message through the PSCell.

In step _2925, the UE triggers the random access in the serving cell directed in the CIF of the layer 1 signal.

In step _2930, the UE checks whether MobilityControlInfo is included in the L3 control message and whether control information explicitly indicating the triggering of the random access is included in the L3 control message, and performs step _2935 or step _2940 as described below.

When the MobilityControlInfo is included in the L3 control message, step _2935 is performed to transmit the preamble in the PCell and receive the random access response message in the PCell.

When the explicit control information (e.g., 1 bit information) indicating the random access in included in the L3 control message, step _2940 is performed to trigger the random access in the PSCell.

A UE, an eNB operation and an apparatus for transmitting and receiving a PHR in a multiple connection status are provided as another further embodiment of the present invention.

The PHR is an MAC control message for reporting a UE transmission Power Headroom (PH) to control a UE uplink transmission power. The eNB schedules the uplink transmission of the UE in consideration of the PH reported by the UE such that transmission power of the UE is not larger than maximum transmission power.

Two types of PHs called a type 1 PH and a type 2 PH are defined in the PH. The type 1 PH is a PH related to a Physical Uplink Shared Channel (PUSCH, refer to rule 36.213) transmission, and may be defined as a difference value between transmission power and maximum transmission power of the UE requested in the case of a predetermined PUSCH transmission. The type 2 PH is a Physical Uplink Control Channel (PUCCH, refer to rule 36.213) transmission, and may be defined as a difference value between transmission power and maximum transmission power when predetermined PUSCH transmission and PUCCH transmission are simultaneously performed.

Figure 30:
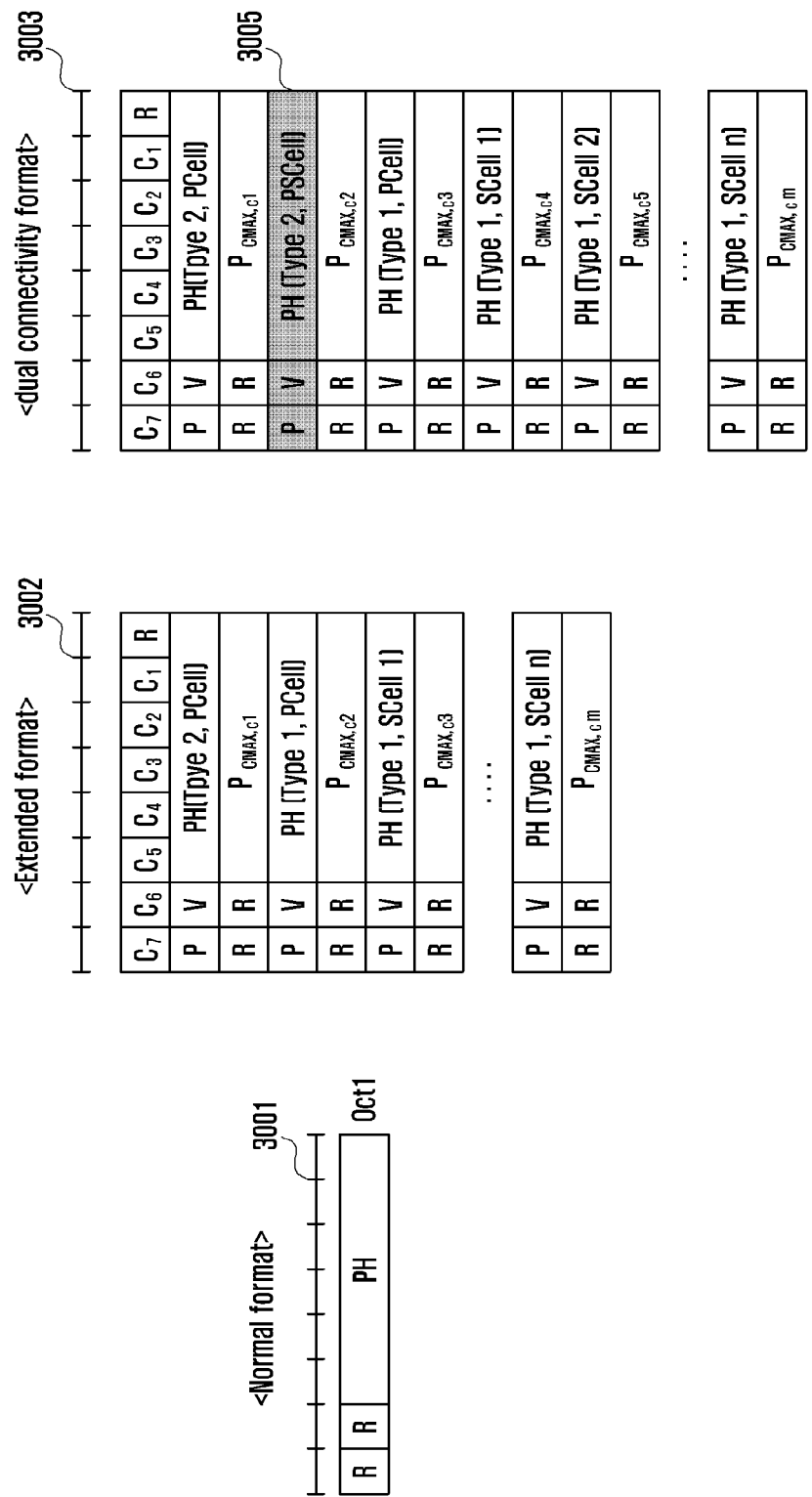
FIG. 30 illustrates formats of a PHR.

FIG. 30 illustrates formats of the PHR.

The PHR includes three types of formats. A normal format 301 is storing the type 1 PH for one serving cell. An extended format 3002 is storing the type 1 PH for a plurality of serving cells and the type 2 PH for the PCell. A first octet of the extended format is used as a bitmap indicating whether there is a serving cell. The next octet includes the type 2 PH information of the PCell. The subsequent octet includes the type 1 PH information of the PCell. After the PH information for the PCell is included, the PH information for the SCell designated in the first octet is sequentially listed in a sequence of an SCell index. The maximum power (i.e., PCmax) of the UE is included in a corresponding cell together with each PH information and is reported.

The multiple connection format 3003 stores the type 1 PH of all serving cells which are active status at time when the PHR is triggered and the type 2 of the PCell and the PSCell. The first octet of the multiple connection format may be used as a bitmap indicating whether there is the serving cell. The next octet may include the type 2 PH information for the PCell. The PCmax may be stored in the subsequent octet. The type 2 PH information of the PSCell is stored in the next octet 3005, and then stored in a sequence of the size of the serving cell identifier.

As described above, PHs of multiple SCells are stored in multiple connection format. A type 1 PH of the SCell is stored in a sequence of a serving cell identifier size of the SCell. In contrast, a type 2 PH of the SCell is stored in a predetermined position, rather than the sequence of the serving cell identifier size. Thus, the type 1 PH and the type 2 PH of the PSCell are stored and spaced apart by two or more octets rather than an adjacent octet.

It is compared to the case wherein a type 1 PH and a type 2 PH of one cell are stored in adjacent octets in the extended format.

The type 1 PH and the type 2 PH may accompany or may not accompany an octet in which the PCmax is stored. Therefore, the storing of two random PHs in adjacent octets means adjacency-or-not in a status in which the octet storing the PCmax is not considered. That is, the storing of the type 1 PH and the type 2 PH of the PSCell in octets that are not adjacent means that the PHs are not adjacent even though the PCmax octet is not accompanied to each PH.

In the extended format, the type 2 PH of the PCell is an optional field. When the eNB configures a simultaneous transmission of the PUSCH and the PUCCH to the UE, the type 2 PH of the PCell is always included in the extended format. On the contrary, when the eNB does not configure the simultaneous transmission of the PUSCH and the PUCCH to the UE, the type 2 PH of the PCell is not included in the extended format. This is because an efficiency of the type 2 PH is reduced when a probability of the simultaneous transmission of the PUSCH and the PUCCH, since a possibility of a generation of the transmission power status of the UE using only the PUCCH is remarkably low.

In the multiple connection format, the type 2 PH of the PCell and the type 2 PH of the PSCell are always included regardless of whether the simultaneous transmission is configured or not. This is because the simultaneous transmission is possible between cell groups although the PUCCH and the PUSCH are not simultaneously transmitted.

Therefore, the UE connects type 2 PH report-or-not with PUCCH and the PUSCH simultaneous transmission configuration (i.e., simultaneous PUCCH-PUSCH) or non-configuration until the multiple connections are configured. However, when the multiple connections are configured, the type 2 PH of the PCell and the type 2 PH of the PSCell are always reported regardless of whether the PUCCH and PUSCH simultaneous transmission is configured or not.

Before the multiple connections are configured, the UE reports the PHR using one of the normal format and the extended format. The eNB transfers a parameter called extendedPHR using the RRC control message to the UE, and when the parameter is transferred, the UE using the extended format. It is preferable to use the multiple connection format when the multiple connections are configured differently from the normal format and the extended format. Thus, it is not necessary to signal using an additional parameter. Therefore, the UE uses one of the normal format and the extended format according to a direction of the eNB when the multiple connections are not configured, and the UE uses the multiple connection format regardless of the direction of the eNB when the multiple connections are configured.

Figure 31:
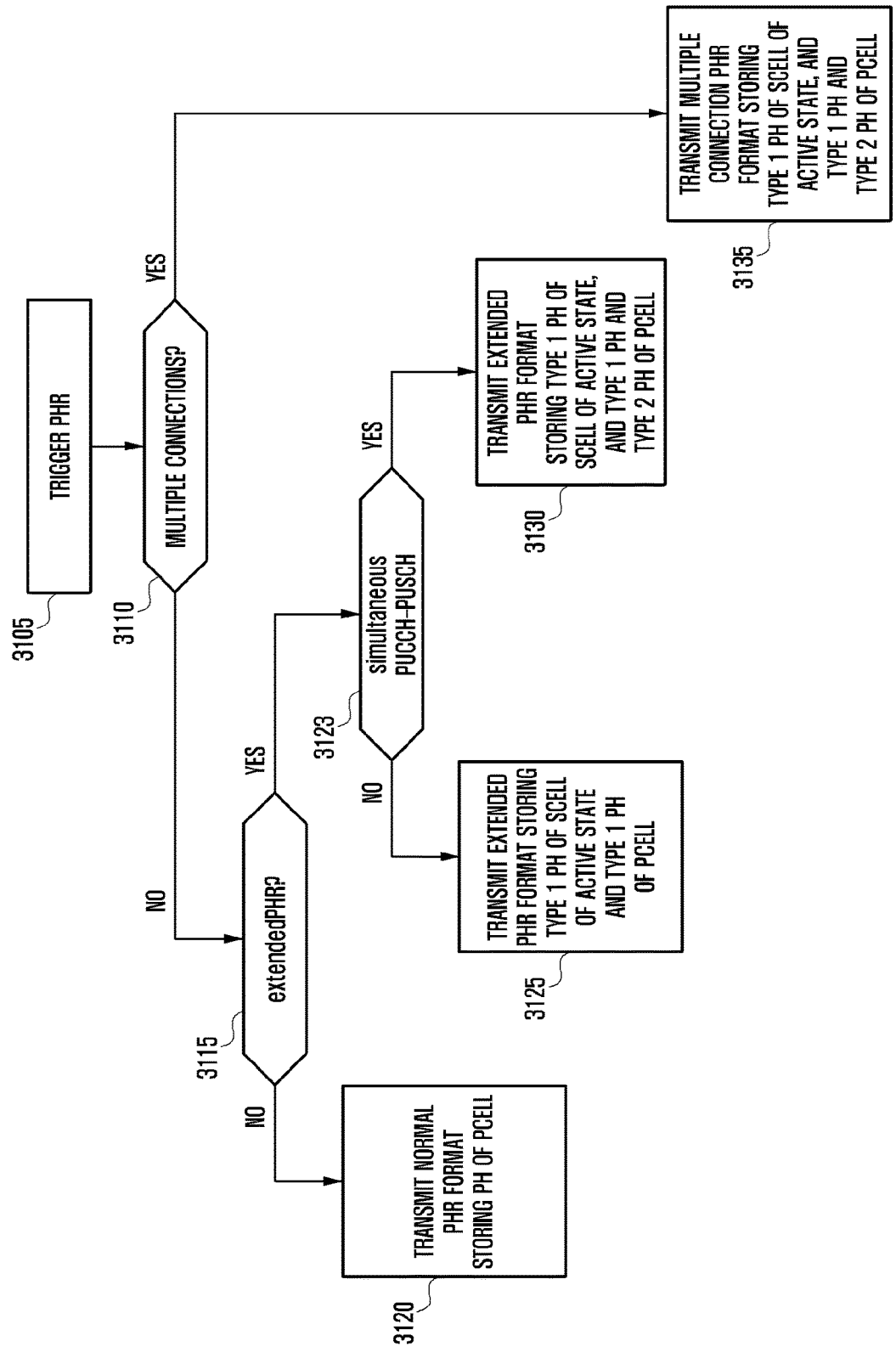
FIG. 31 illustrates an operation of the UE.

FIG. 31 illustrates an operation of the UE.

In step 3105, the PHR is triggered. For example, the PHR is triggered when a path loss is changed by a predetermined reference or more, or is triggered periodically.

In step 3110, the UE checks whether the multiple connections are currently configured. The configuration of the multiple connections has a meaning the same as a configuration of at least one SCG, a configuration of two MAC devices, a configuration of two cell groups, a configuration of the PSCell, and the like.

When the multiple connections are configured, step 3135 is performed, and when the multiple connections are not configured, step 3115 is performed. In step 3115, the UE checks whether an extended PHR format is configured. When the extended PHR format is configured, step 3123 performed, and when the extended PHR is not configured, step 3120 is performed.

In step 3120, the UE generates and transmits the PHR of the normal format storing the type 1 PH of the PCell.

In step 3123, the UE checks whether the simultaneous transmission of the PUCCH and PUSCH is configured. Alternatively, the UE checks whether the simultaneous-PUCCH-PUSCH is configured. The simultaneousPUCCH- PUSCH may be configured according to each MAC entity or each cell group. Since step 3123 is not the multiple connections, only one cell group exists. When the simultaneousPUCCH-PUSCH is configured, step 3130 is performed, and when the simultaneousPUCCH-PUSCH is not configured, step 3125 is performed.

In step 3125, the UE generates and transmits the PHR of the extended format storing the type 1 PHs of the SCell of the active state and the type 1 PH of the PCell.

In step 3130, the UE generates and transmits the PHR of the extended format storing the type 1 PHs of the SCell of the active state, and the type 1 PH and the type 2 PH of the PCell. At this time, the type 1 PH and the type 2 PH of the same cell are stored in adjacent octets. The adjacent octets in the above and in the below are octets (e.g., an n-th octet and an (n+2)-th octet) spaced apart by one octet when the PCmax is reported, and are physically wholly adjacent octets (e.g., the n-th octet and an (n+1)-th octet) when the PCmax is not reported.

In step 3135, the UE generates and transmits the PHR of the multiple connection format storing the type 1 PHs of the SCell of the active state, the type 1 PH and the type 2 PH of the PCell, and the type 2 PH of the PSCell. When the UE determines whether the UE reports the type 2 PH of the PCell and the type 2 PH of the PSCell, the simultaneousPUCCH-PUSCH configuration or non-configuration of the MCG and the simultaneousPUCCH-PUSCH configuration or non-configuration of the SCG are not considered. That is, the UE reports the type 2 PH of the PCell or PSCell although the simultaneousPUCCH-PUSCH is configured in the MCG or SCG. Therefore, the UE in which the simultaneousPUCCH-PUSCH is not configured in the PCell generates and reports the PHR wherein the type 2 PH of the PCell is not included when the multiple connections are not configured, and the UE generates and reports the PHR including the type 2 PH of the PCell when the multiple connections are configured. The UE in which the simultaneousPUCCH-PUSCH is configured in the PCell generates and reports the PHR including the type 2 PH of the PCell regardless of whether the multiple connections are configured or not. In generating the multiple connection format PHR, the UE stores a type 1 PH and a type 2 PH of a first predetermined serving cell in adjacent octets, and stores a type 1 PH and a type 2 PH of a second predetermined serving cell in octets which are not adjacent. The first serving cell is the PCell and the second serving cell is the PSCell.

Figure 19:
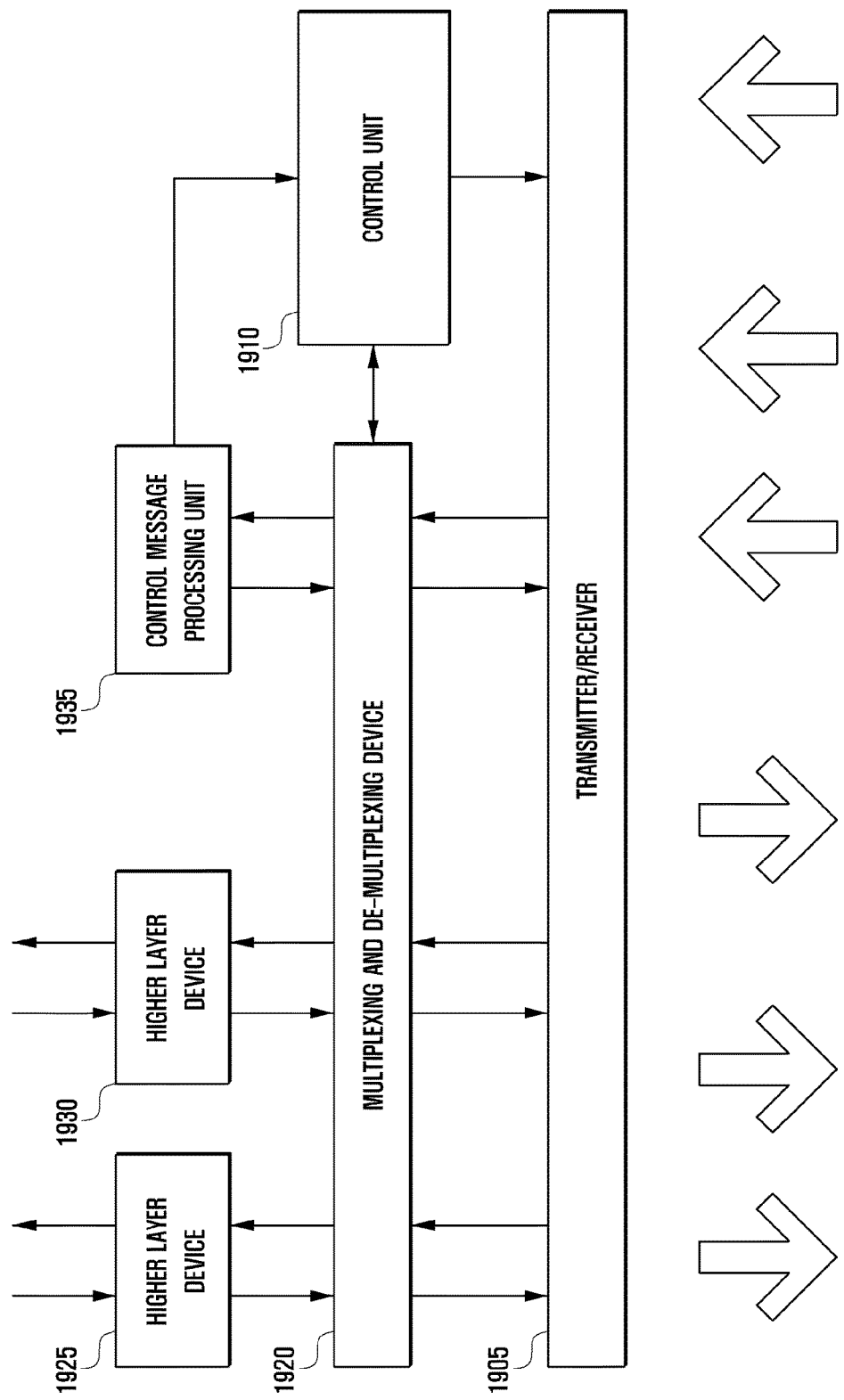
FIG. 19 is a view illustrating a structure of a UE according to an embodiment of the present specification.

FIG. 19 is a view illustrating a UE structure according to an embodiment of the present specification.

Referring to FIG. 19, the UE according to an embodiment of the present specification includes a transmitting and receiving unit _1905, a control unit _1910, a multiplexing and de-multiplexing unit _1915, a control message processing unit _1930 and various types of higher layer processing units _1920 and _1925.

The transmitting and receiving unit _1905 receives data and a predetermined control signal through the downlink channel of the serving cell, and transmits the data and the predetermined control signal through the uplink channel. In the case wherein a plurality of serving cells are configured, the transmitting and receiving unit _1905 transmits and receives data and a control signal through the plurality of serving cells.

The multiplexing and de-multiplexing unit _1915 multiplexes data generated in the higher layer processing units _1920 and _1925 and the control message processing unit _1930 or de-multiplexes the data received from the transmitting and receiving unit _1905, to transfer the data to proper higher layer processing units _1920 and _1925 or the control message processing unit _1930. An independent multiplexing and de-multiplexing unit (or the MAC device) is configured in the MeNB and the SeNB, but one multiplexing and de-multiplexing unit (or MAC device) is configured in the UE.

The control message processing unit _1930 is an RRC layer device, and processes a control message received from the eNB to perform a necessary operation. For example, the control message processing unit _1930 receives the RRC control message and transfers, to the control unit, random access related information, PUCCH configuration information, pattern information, PHR configuration information, and the like.

The higher layer processing units _1920 and _1925 may be configured according to each service. The higher layer processing units _1920 and _1925 process data generated from a user service such as a File Transfer Protocol (FTP) or a Voice over Internet Protocol (VoIP) to transfer the data to the multiplexing and de-multiplexing unit _1915, or process the data transferred from the multiplexing and de-multiplexing unit _1915 to transfer the data to a service application of a higher layer.

The control unit _1910 identifies a scheduling instruction received through the transmitting and receiving unit _1905, for example, backward grants, and controls the transmitting and receiving unit 1205 and the multiplexing and de-multiplexing unit _1915 so as to perform a backward transmission through a suitable transmission resource at an appropriate time point. In addition, the control unit manages all procedures related to the SCell configuration, all procedures related to the random access, all procedures related to the PUCCH transmission, all procedures related to the SCG, all procedures related to the PHR transmission, and the like. More specifically, the control unit performs necessary control operations related to the operations of the UE shown in FIGS. 5 to 31.

The control unit _1910 according to an embodiment of the present invention may control sequential processes of establishing synchronization with a serving cell included in a serving cell addition control message when the control unit _1910 receives the serving cell addition control message including uplink subframe pattern information for a master serving cell group or a slave serving cell group. In addition, the control unit _1910 may control to transmit and receive to and from the eNB through the added serving cell when the control unit 1910 receives an instruction for activating the serving cell in which the synchronization is established.

In this case, the uplink subframe pattern information may include at least one of information on a subframe to which an uplink transmission for the master serving cell group is admitted, information on a subframe to which an uplink transmission for the slave serving cell group is admitted, and information on a subframe to which an uplink transmission is not admitted.

In addition, the length of the uplink subframe pattern may be determined based on a Hybrid Automatic ReQuest (HARQ) Round Trip Time (RTT).

According to an embodiment of the present invention, the uplink subframe pattern information may include at least one of bit information indicating a subframe to which an uplink transmission for the master serving cell group is admitted, bit information on a subframe to which an uplink transmission for the slave serving cell group is admitted, and offset information indicating a start of a subframe pattern.

According to an embodiment of the present invention, the uplink subframe pattern information may be pattern index information indicating one pattern among multiple subframe patterns having a predetermined length.

In addition, the control unit _1910 according to an embodiment of the present invention may receive transmission resource configuration information for an uplink control information transmission from the base station and may determine a resource transmitting the uplink control information based on the uplink subframe pattern information and the transmission resource configuration information for the uplink control information transmission. In addition, the control unit _1910 may control to transmit the uplink control information based on the determined resource. The uplink control information may include at least one of a Channel Quality Indicator (CQI), a Scheduling Request (SR), a Sounding Reference Signal (SRS), and a Buffer Status Report (BSR).

Further, the control unit _1910 according to an embodiment of the present invention may control to generate a terminal capability information message including information on at least one band combination supported by the terminal, and to transmit the generated terminal capability information message to the base station.

Also, the control unit _1910 according to an embodiment of the present invention may determine previously performing one of the initial transmission or retransmission as shown in FIG. 26 when the initial transmission and the retransmission are conflicted.

Figure 20:
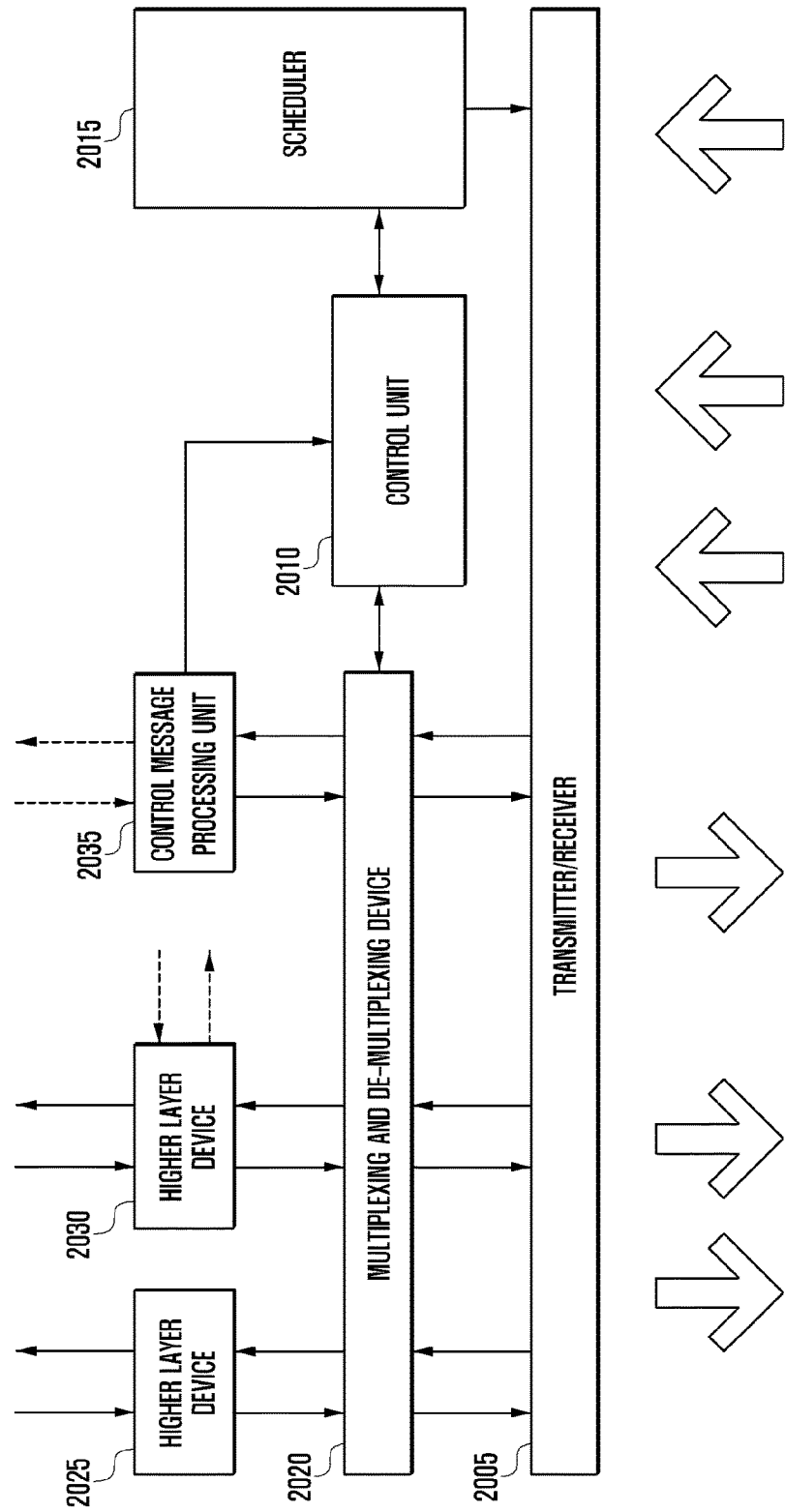
FIG. 20 is a view illustrating a structure of an eNB according to an embodiment of the present specification.

FIG. 20 is a view illustrating an MeNB structure according to an embodiment of the present specification.

The MeNB according to an embodiment of the present specification may include a transmitting and receiving unit _2005, a control unit _2010, a multiplexing and de-multiplexing unit _2020, a control message processing unit _2035, various types of higher layer processing units _2025 and _2015 and a scheduler _2015.

The transmitting and receiving unit _2005 transmits data and a predetermined control signal through a forward carrier and receives data and a predetermined control signal through a backward carrier. In cases wherein a plurality of carriers is configured, the transmitting and receiving unit _2005 transmits and receives data and a control signal through the plurality of carriers.

The multiplexing and de-multiplexing unit _2020 multiplexes data generated in the higher layer processing units _2025 and _2030 and the control message processing unit _2035 or de-multiplexes the data received from the transmitting and receiving unit _2005, to transfer the data to proper higher layer processing units _2025 and 2030, the control message processing unit _2035 or the control unit _2010. The control message processing unit _2035 processes a control message transmitted from the UE to perform a necessary operation, or generates the control message to be transferred to the UE to transfer to a lower layer.

The higher layer processing units _2025 and 2030 may be configured according to each bearer. The higher layer processing units _2025 and 2030 transfers data transferred from an S-GW or another eNB to the multiplexing and de-multiplexing unit _2020, or transfers an RLC PDU transferred from the multiplexing and de-multiplexing unit _2020 to the S-GW or another eNB.

The scheduler allocates a transmission resource to the UE at an appropriate time point in consideration of a buffer status, a channel status and the like of the UE. The scheduler processes a signal transmitted from the UE to the transmitting and receiving unit, or processes to enable the UE to transmit the signal.

The control unit also manages all procedures related to the SCell configuration, and the like. More specifically, the control unit performs a control operation required in an operation that should be performed by the MeNB in FIGS. 5 to 31.

Figure 21:
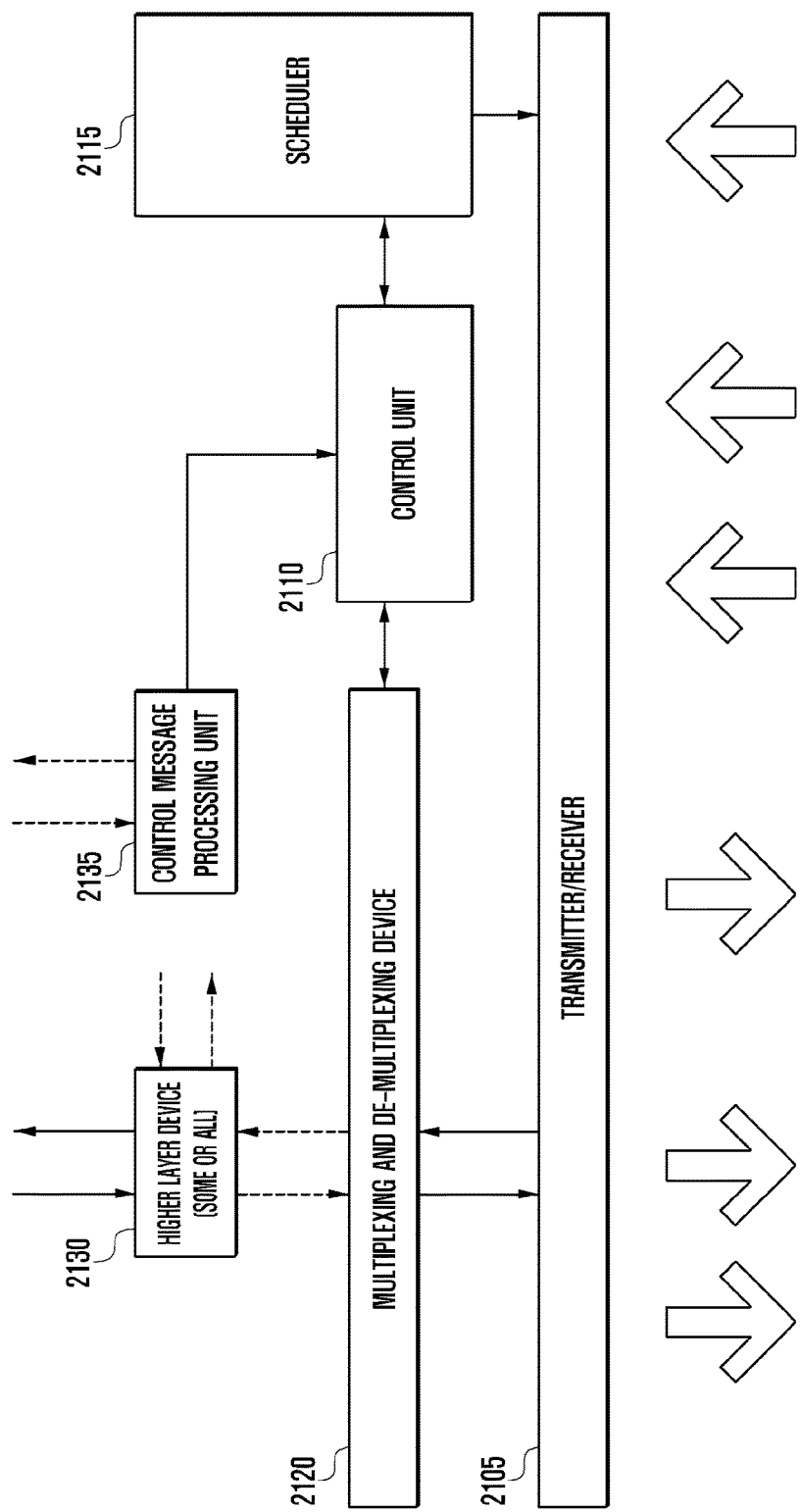
FIG. 21 is a view illustrating a structure of a slave eNB according to an embodiment of the present specification.

FIG. 21 is a view illustrating an SeNB structure according to an embodiment of the present specification. The SeNB according to an embodiment of the present specification may include a transmitting and receiving unit _2105, a control unit _2110, a multiplexing and de-multiplexing unit _2120, a control message processing unit _2135, various types of higher layer processing units _2130 and a scheduler _2115.

The transmitting and receiving unit _2105 transmits data and a predetermined control signal through a forward carrier and receives data and a predetermined control signal through a backward carrier. In cases wherein a plurality of carriers is configured, the transmitting and receiving unit _2105 transmits and receives data and a control signal through the plurality of carriers.

The multiplexing and de-multiplexing unit _2120 multiplexes data generated in the higher layer processing units _2125 and _2130 and the control message processing unit _2135 or de-multiplexes the data received from the transmitting and receiving unit _2105, to transfer the data to proper higher layer processing units _2130 or the control unit _2110. The control message processing unit _2135 processes a control message transmitted from the MeNB to perform a necessary operation.

The scheduler allocates a transmission resource to the UE at an appropriate time point in consideration of a buffer status, a channel status and the like of the UE. The scheduler processes a signal transmitted from the UE to the transmitting and receiving unit, or processes to enable for the UE to transmit the signal.

The control unit also manages all procedures related to the SCell configuration, and the like. More specifically, the control unit performs a control operation required in an operation which is should be performed by the SeNB in FIGS. 5 to 31.

Embodiments of the present invention disclosed in the specification and the drawings are only particular examples to easily describe the technical matters of the present invention and assist in the understanding of the present invention, and do not limit the scope of the present invention. It is apparent to those skilled in the art that other modified examples based on the technical idea of the present invention can be implemented as well as the embodiments disclosed herein.

What is claimed is:

1. A method for reporting a power headroom report (PHR) by a user equipment (UE), the method comprising:
   determining whether a PHR format for dual connectivity is configured to the UE; and
   when the PHR format for the dual connectivity is configured to the UE, transmitting, to a base station, a PHR including a type 1 power headroom (PH) for a primary secondary cell (PSCell) and a type 2 PH for the PSCell,
   wherein the type 2 PH for the PSCell is located at a predetermined position in the PHR and the type 1 PH for the PSCell is located at a location specified by a cell index in the PHR.

2. The method of claim 1, wherein the transmitting the PHR comprises:
   reporting a type 2 PH for primary cell (PCell) in a first octet;
   reporting the type 2 PH for the PSCell in a second octet;
   reporting a type 1 PH for the PCell in a third octet; and reporting the type 1 PH for the PSCell in a fourth octet based on the cell index.

3. The method of claim 2, when the type 2 PH for the PSCell is reported, the second octet containing a type 2 PH field is included followed by an octet containing a maximum power field ($P_{CMAX}$) of the UE in the PSCell.

4. The method of claim 2, further comprising:
reporting a PH for at least two serving cells in ascending order based on the cell index.

5. The method of claim 1, wherein the type 1 PH is associated with a physical uplink shared channel (PUSCH) transmission for the UE and the type 2 PH is associated with a physical uplink control channel (PUCCH) transmission for the UE.

6. A method for receiving a power headroom report (PHR) by a base station, the method comprising:
determining whether a PHR format for dual connectivity is configured to a user equipment (UE); and
when the PHR format for the dual connectivity is configured to the UE, receiving, from the UE, a PHR including a type 1 power headroom (PH) for a primary secondary cell (PSCell) and a type 2 PH for the PSCell,
wherein the type 2 PH for the PSCell is located at a predetermined position in the PHR and the type 1 PH for the PSCell is located at a location specified by a cell index in the PHR.

7. The method of claim 6, wherein the receiving the PHR comprises:
receiving a type 2 PH for primary cell (PCell) in a first octet;
receiving the type 2 PH for the PSCell in a second octet;
receiving a type 1 PH for the PCell in a third octet; and
receiving the type 1 PH for the PSCell in a fourth octet based on the cell index.

8. The method of claim 7, when the type 2 PH for the PSCell is received, the second octet containing a type 2 PH field is included followed by an octet containing a maximum power field ($P_{CMAX}$) of the UE in the PSCell.

9. The method of claim 7, further comprising:
receiving a PH for at least two serving cells in ascending order based on the cell index.

10. The method of claim 6, wherein the type 1 PH is associated with a physical uplink shared channel (PUSCH) transmission for the UE and the type 2 PH is associated with a physical uplink control channel (PUCCH) transmission for the UE.

11. A user equipment (UE) for reporting a power headroom report (PHR), the UE comprising:
a transceiver; and
a controller coupled with the transceiver and configured to control to:
determine whether a PHR format for dual connectivity is configured to the UE; and
when the PHR format for the dual connectivity is configured to the UE, transmit, to a base station, a PHR including a type 1 power headroom (PH) for a primary secondary cell (PSCell) and a type 2 PH for the PSCell,
wherein the type 2 PH for the PSCell is located at a predetermined position in the PHR and the type 1 PH for the PSCell is located at a location specified by a cell index in the PHR.

12. The UE of claim 11, wherein the controller is configured to:
report a type 2 PH for primary cell (PCell) in a first octet;
report the type 2 PH for the PSCell in a second octet;
report a type 1 PH for the PCell in a third octet; and
report the type 1 PH for the PSCell in a fourth octet based on the cell index.

13. The UE of claim 12, when the type 2 PH for the PSCell is reported, the second octet containing a type 2 PH field is included followed by an octet containing a maximum power field ($P_{CMAX}$) of the UE in the PSCell.

14. The UE of claim 12, wherein the controller is configured to:
report a PH for at least two serving cells in ascending order based on the cell index.

15. The UE of claim 11, wherein the type 1 PH is associated with a physical uplink shared channel (PUSCH) transmission for the UE and the type 2 PH is associated with a physical uplink control channel (PUCCH) transmission for the UE.

16. A base station for receiving a power headroom report (PHR), the base station comprising:
a transceiver; and
a controller coupled with the transceiver and configured to control to:
determine whether a PHR format for dual connectivity is configured to a user equipment (UE); and
when the PHR format for the dual connectivity is configured to the UE, receive, from the UE, a PHR including a type 1 power headroom (PH) for a primary secondary cell (PSCell) and a type 2 PH for the PSCell,
wherein the type 2 PH for the PSCell is located at a predetermined position in the PHR and the type 1 PH for the PSCell is located at a location specified by a cell index in the PHR.

17. The base station of claim 16, wherein the controller is configured to:
receive a type 2 PH for primary cell (PCell) in a first octet;
receive the type 2 PH for the PSCell in a second octet;
receive a type 1 PH for the PCell in a third octet; and
receive the type 1 PH for the PSCell in a fourth octet based on the cell index.

18. The base station of claim 17, when the type 2 PH for the PSCell is received, the second octet containing a type 2 PH field is included followed by an octet containing a maximum power field ($P_{CMAX}$) of the UE in the PSCell.

19. The base station of claim 17, wherein the controller is configured to:
receive a PH for at least two serving cells in ascending order based on the cell index.

20. The base station of claim 16, wherein the type 1 PH is associated with a physical uplink shared channel (PUSCH) transmission for the UE and the type 2 PH is associated with a physical uplink control channel (PUCCH) transmission for the UE.

* * * * *